(12) United States Patent
Miki et al.

(10) Patent No.: US 8,488,534 B2
(45) Date of Patent: Jul. 16, 2013

(54) BASE STATION, USER DEVICE, TRANSMISSION METHOD, AND RECEPTION METHOD

(75) Inventors: Nobuhiko Miki, Yokohama (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 885 days.

(21) Appl. No.: 12/531,661

(22) PCT Filed: Mar. 14, 2008

(86) PCT No.: PCT/JP2008/054738
§ 371 (c)(1),
(2), (4) Date: Dec. 3, 2009

(87) PCT Pub. No.: WO2008/120557
PCT Pub. Date: Oct. 9, 2008

(65) Prior Publication Data
US 2010/0067465 A1    Mar. 18, 2010

(30) Foreign Application Priority Data

Mar. 20, 2007    (JP) ................................. 2007-073734

(51) Int. Cl.
*H04W 4/00*    (2009.01)
*H04J 9/00*    (2006.01)

(52) U.S. Cl.
USPC ........................... 370/329; 370/328; 370/208

(58) Field of Classification Search
USPC ........................................................ 370/329
See application file for complete search history.

(56) References Cited

U.S. PATENT DOCUMENTS

2007/0189199 A1*    8/2007    Nishio .......................... 370/328
2007/0201350 A1*    8/2007    Papasakellariou ............ 370/208

FOREIGN PATENT DOCUMENTS

| EP | 1 976 317 A1 | 10/2008 |
|---|---|---|
| EP | 2 034 759 A1 | 3/2009 |
| EP | 2 034 761 A1 | 3/2009 |
| WO | 2007/083569 A1 | 7/2007 |
| WO | 2007/148610 A1 | 12/2007 |
| WO | 2007/148613 A1 | 12/2007 |

OTHER PUBLICATIONS

3GPP TSH RAN WG1 Meeting #45—L1/L2 Control Channel Structure for E-UTRA Downlink by NTT DoCoMo, Fujitsu, Mitsubishi Electric, NEC, Panasonic, Sharp, Toshiba Corporation, Published: May 2006.*
International Search Report for PCT/JP2008/054738 mailed Jun. 17, 2008 (9 pages).

(Continued)

*Primary Examiner* — Noel Beharry
(74) *Attorney, Agent, or Firm* — Osha Liang LLP

(57) ABSTRACT

A base station includes a scheduler determining allocation of radio resources for each subframe; a control channel generating unit generating a control channel including common control information mapped across a system frequency band and specific control information mapped to one or more resource blocks allocated to a selected user device; and a transmission signal generating unit generating a transmission signal by time-division-multiplexing the common control information and the specific control information. The common control information is transmitted every subframe and includes information units with a predetermined data size, a format indicator representing one of preset options indicating the number of symbols occupied by the common control information, and information indicating the maximum number of the information units. The information indicating the maximum number of the information units is transmitted as a part of the common control information at a predetermined interval longer than or equal to one subframe.

13 Claims, 53 Drawing Sheets

OTHER PUBLICATIONS

Written Opinion of ISA for PCT/JP2008/054738 mailed Jun. 17, 2008 (3 pages).

3GPP TSG RAN WG1 Meeting #47bis; R1-070516 Sorrento, Italy, Jan. 15-19, 2007 (Original R1-063349) Source: KDDI, NTT DoCoMo Title: "L1/L2 Control Channel Structure with CDM Based Multiplexing in E-UTRA Downlink".

3GPP TSG RAN WG1 Meeting #47bis; R1-070517 Sorrento, Italy, Jan. 15-19, 2007 Source: KDDI, NTT DoCoMo Title: "Category 0 Information for TDM Based Multiplexing of L1/L2 Control Signaling in E-UTRA Downlink" (4 pages).

3GPP TSG RAN WG1 Meeting #49bis; R1-072943 Orlando, USA, Jun. 25-29, 2007 Source: NTT DoCoMo, et al. Title: "BCH Structure for E-UTRA Downlink" (8 pages).

3GPP TSG RAN WG1 Meeting #50bis; R1-073685 Athens, Greece, Aug. 20-24, 2007 Source: NTT DoCoMo et al. Title: "Usage of Remaining Resource Elements in Resource Blocks Multiplexed with PBCH and SCH" (2 pages).

3GPP TR 25.896 V6.0.0 (Mar. 2004); Technical Report 3rd Generation Partnership Project; Technical Specification Group Radio Access Network; Feasibility Study for Enhanced Uplink for UTRA FDD (Release 6) (179 pages).

3GPP TR 25.848 V4.0.0 (Mar. 2001); Technical Report 3rd Generation Partnership Project; Technical Specification Group Radio Access Network; Physical Layer Aspects of UTRA High Speed Downlink Packet Access (Release 4) (89 pages).

* cited by examiner

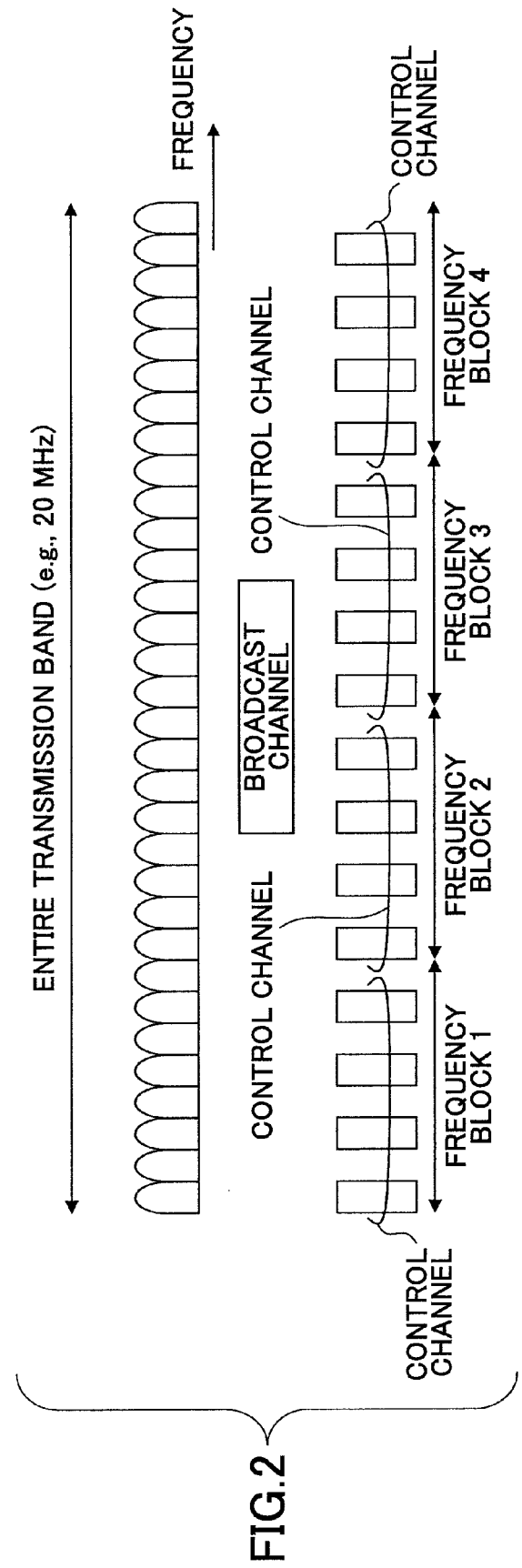

FIG.5A

| CHANNEL TYPE | | | INFORMATION ITEM | |
|---|---|---|---|---|
| BROADCAST CHANNEL | | | TRANSPORT FORMAT OF L1/L2 CONTROL CHANNEL<br>MAXIMUM NUMBER OF MULTIPLEXED USERS<br>RESOURCE BLOCK ALLOCATION<br>MIMO SCHEME | |
| DEDICATED L3 SIGNALING CHANNEL | | | TYPE OF FDM SCHEME<br>PERSISTENT SCHEDULING INFORMATION | SPECIFIC CONTROL CHANNEL |
| L1/L2 CONTROL CHANNEL | PART 0 | | TRANSPORT FORMAT OF L1/L2 CONTROL CHANNEL<br>NUMBER OF MULTIPLEXED USERS | GENERAL CONTROL CHANNEL |
| | DOWNLINK DATA TRANSMISSION INFORMATION | PART 1 | PAGING INDICATOR | GENERAL CONTROL CHANNEL |
| | | PART 2a | DOWNLINK RESOURCE ALLOCATION<br>ALLOCATION FREQUENCY<br>MIMO INFORMATION (NO. OF STREAMS, ETC.) | |
| | | PART 2b | MIMO PRECODING INFORMATION<br>MODULATION SCHEME<br>PAYLOAD SIZE<br>HARQ INFORMATION<br>CRC INFORMATION | SPECIFIC CONTROL CHANNEL |
| | UPLINK DATA TRANSMISSION INFORMATION | PART 1 | ACK/NACK | SPECIFIC OR GENERAL CONTROL CHANNEL |
| | | PART 2 | UPLINK RESOURCE ALLOCATION<br>MODULATION SCHEME<br>PAYLOAD SIZE<br>TRANSMISSION POWER<br>CRC INFORMATION | |
| | | PART 3 | TRANSMISSION TIMING CONTROL BITS | |
| | | PART 4 | TRANSMISSION POWER CONTROL BIT | |

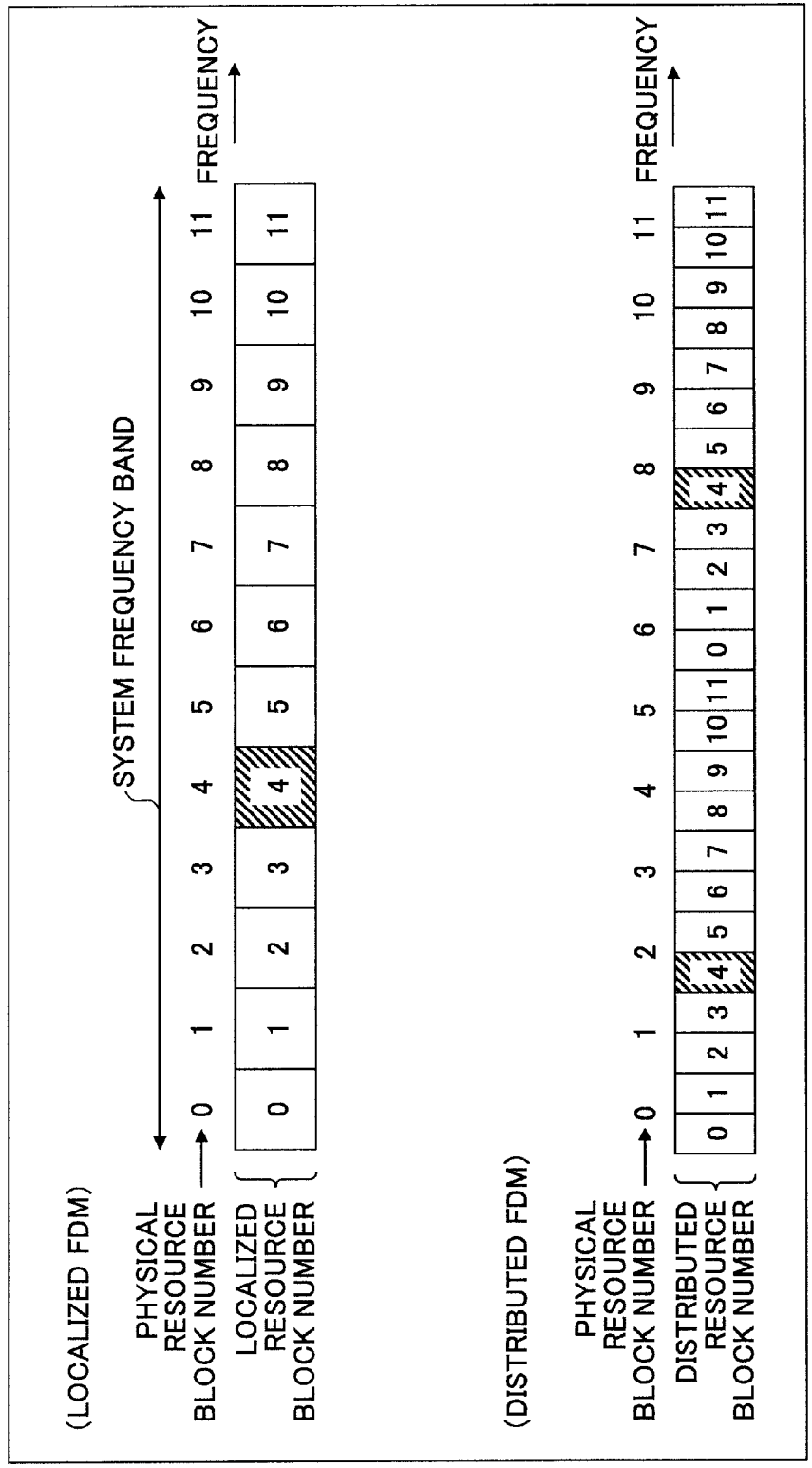

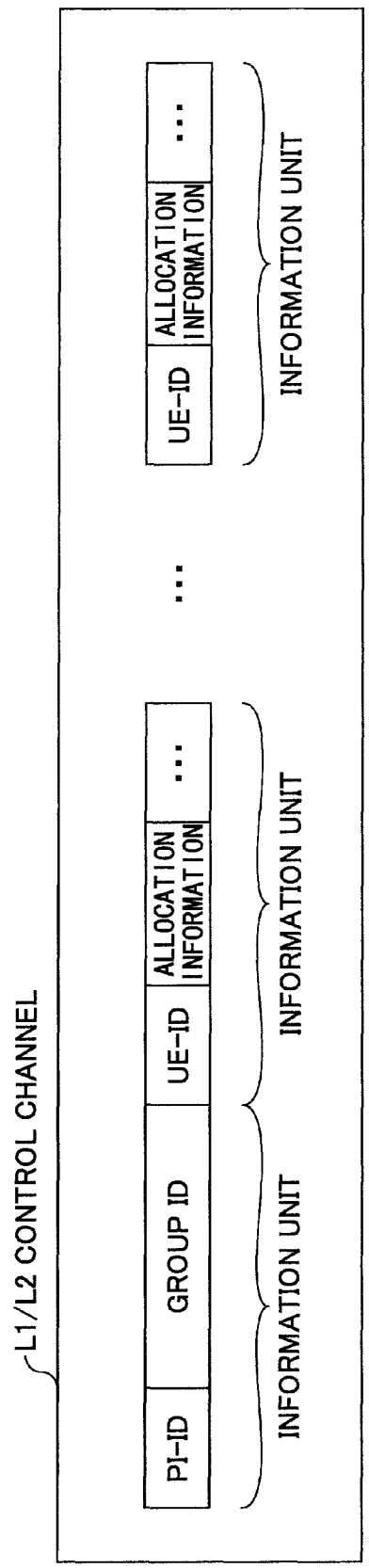

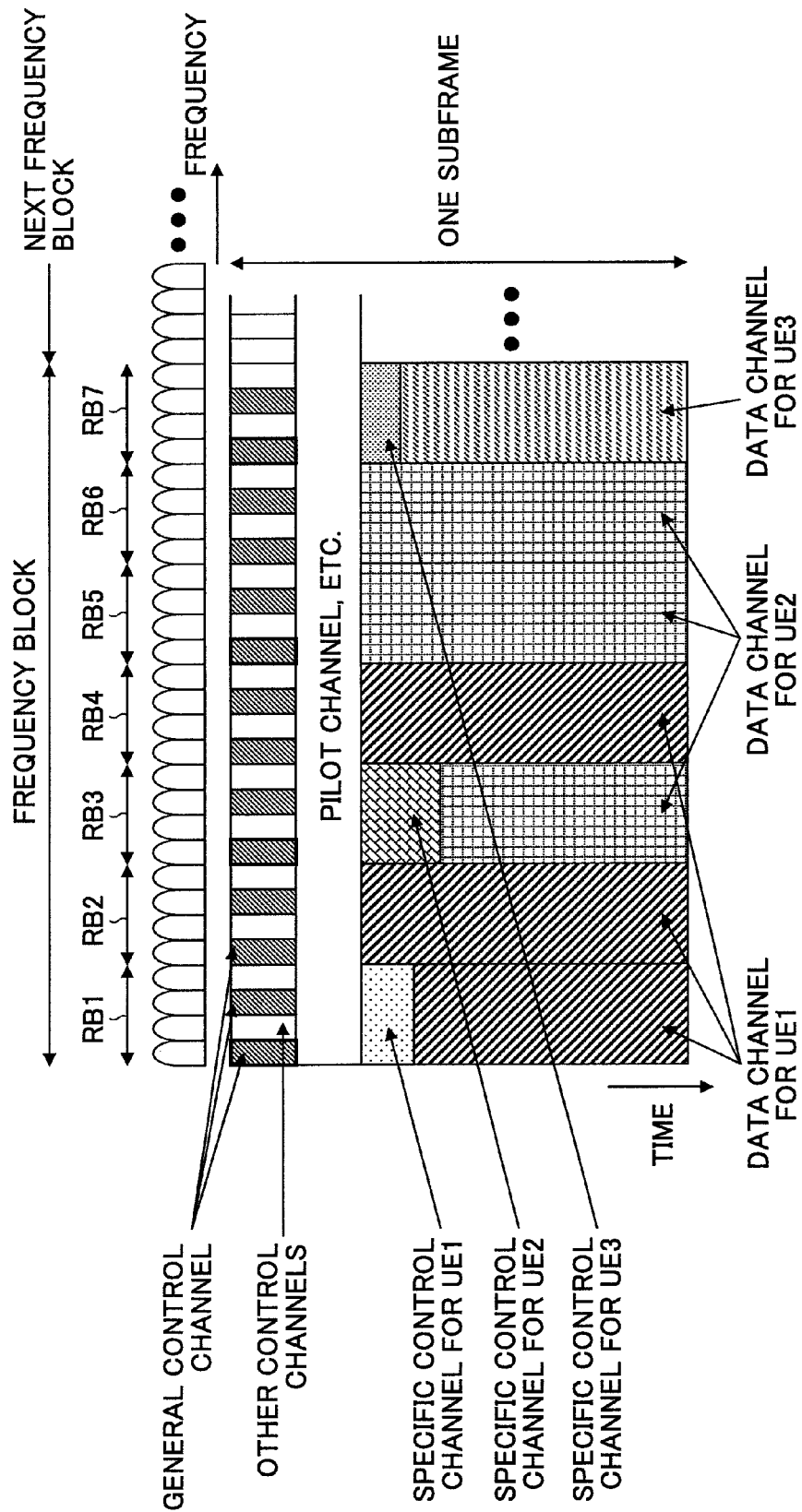

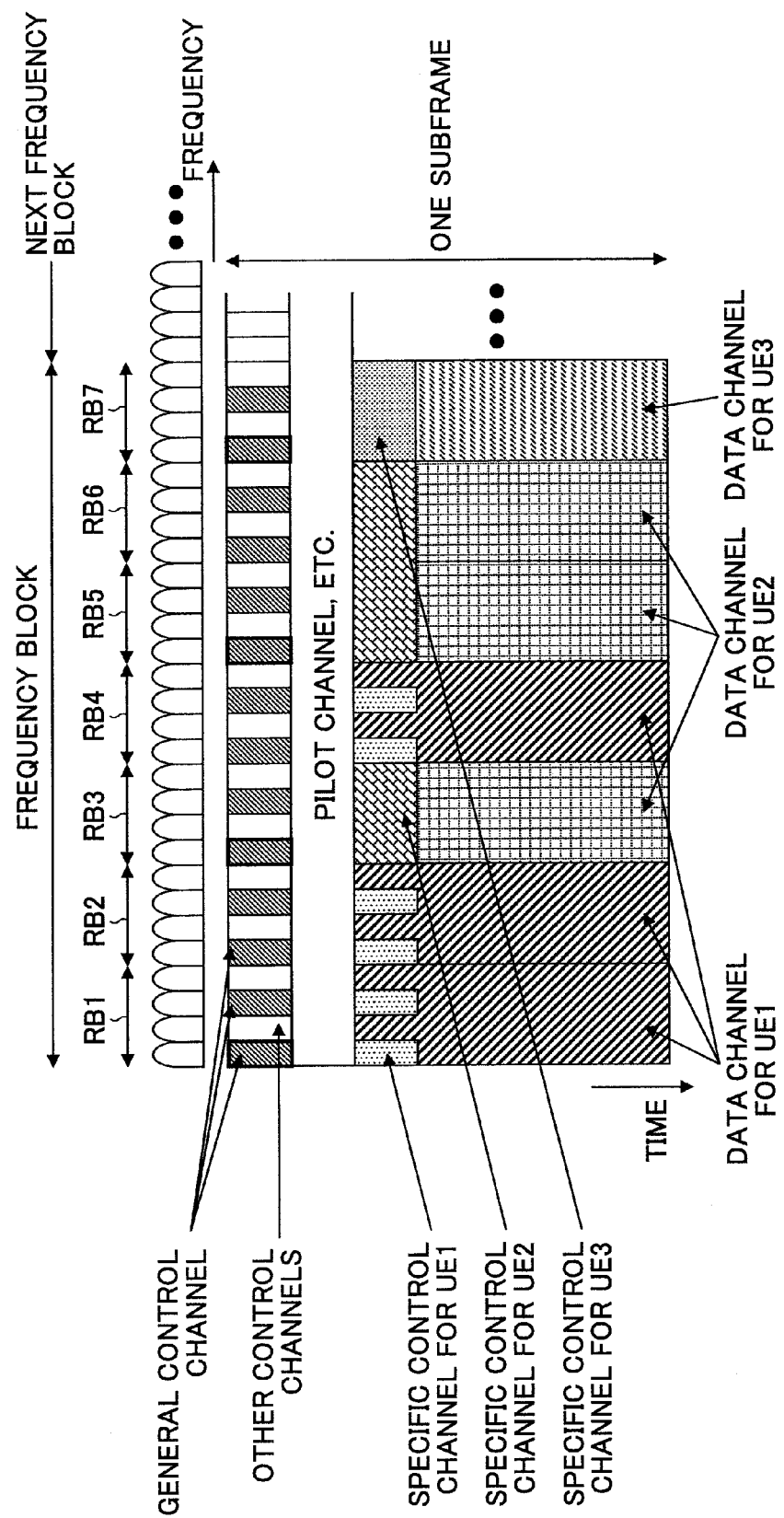

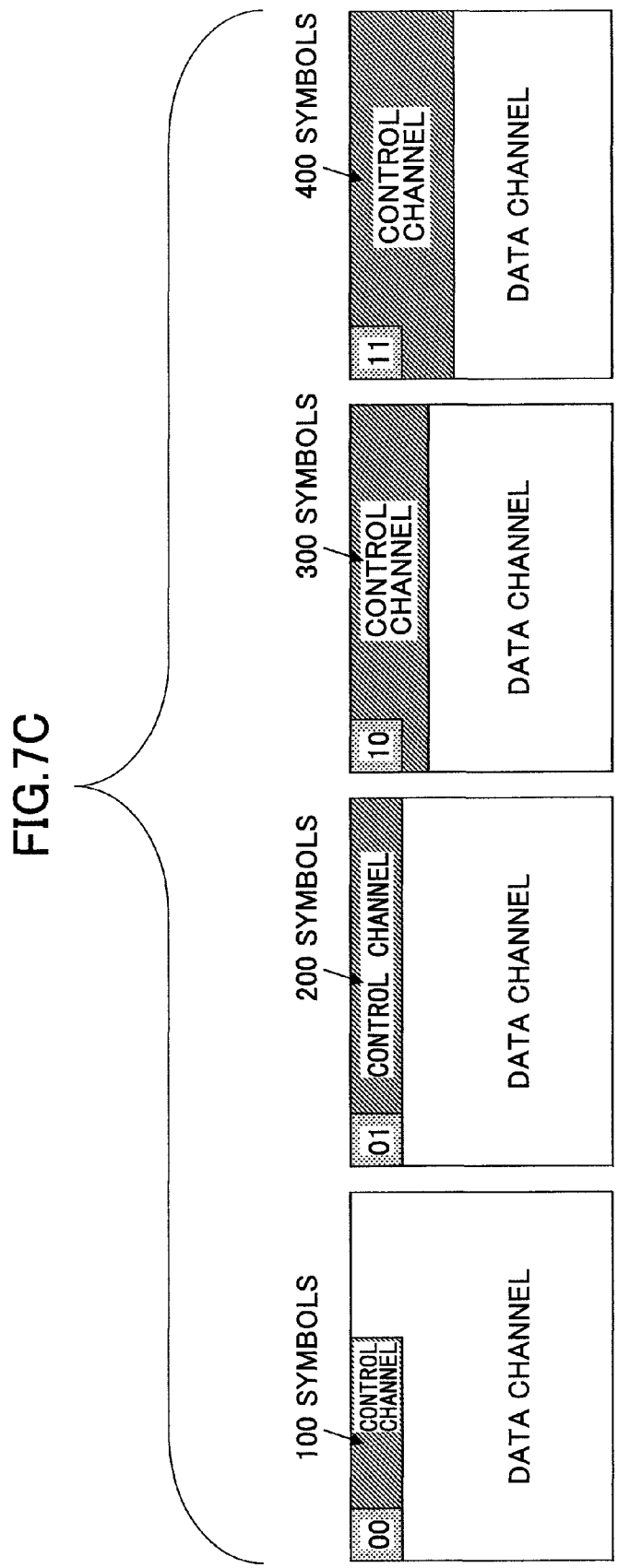

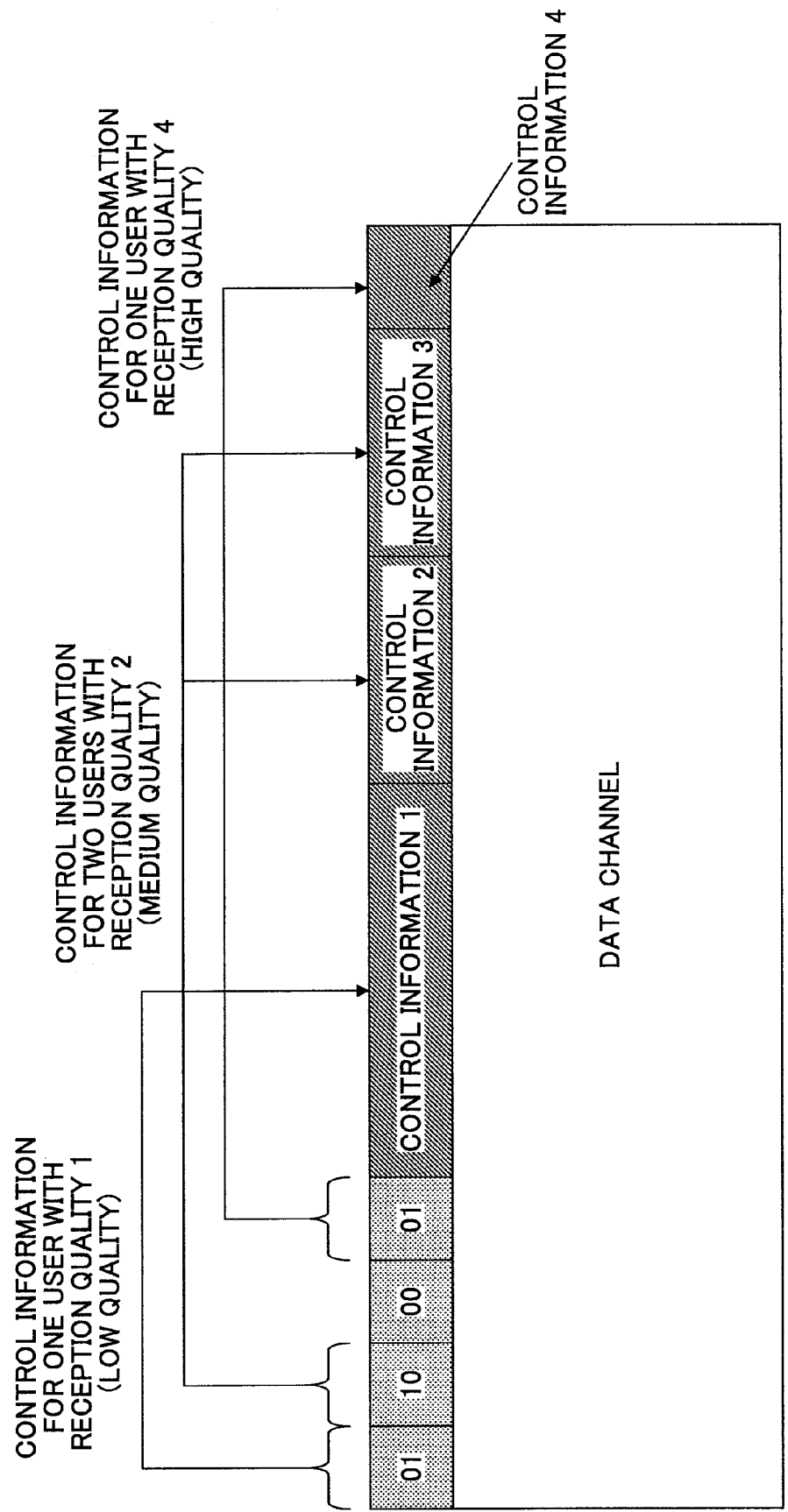

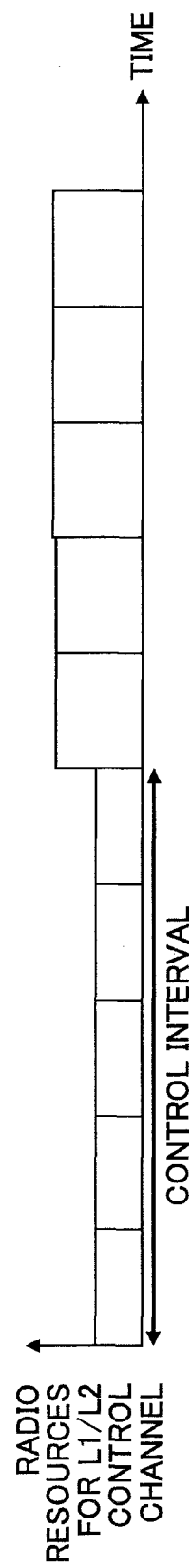

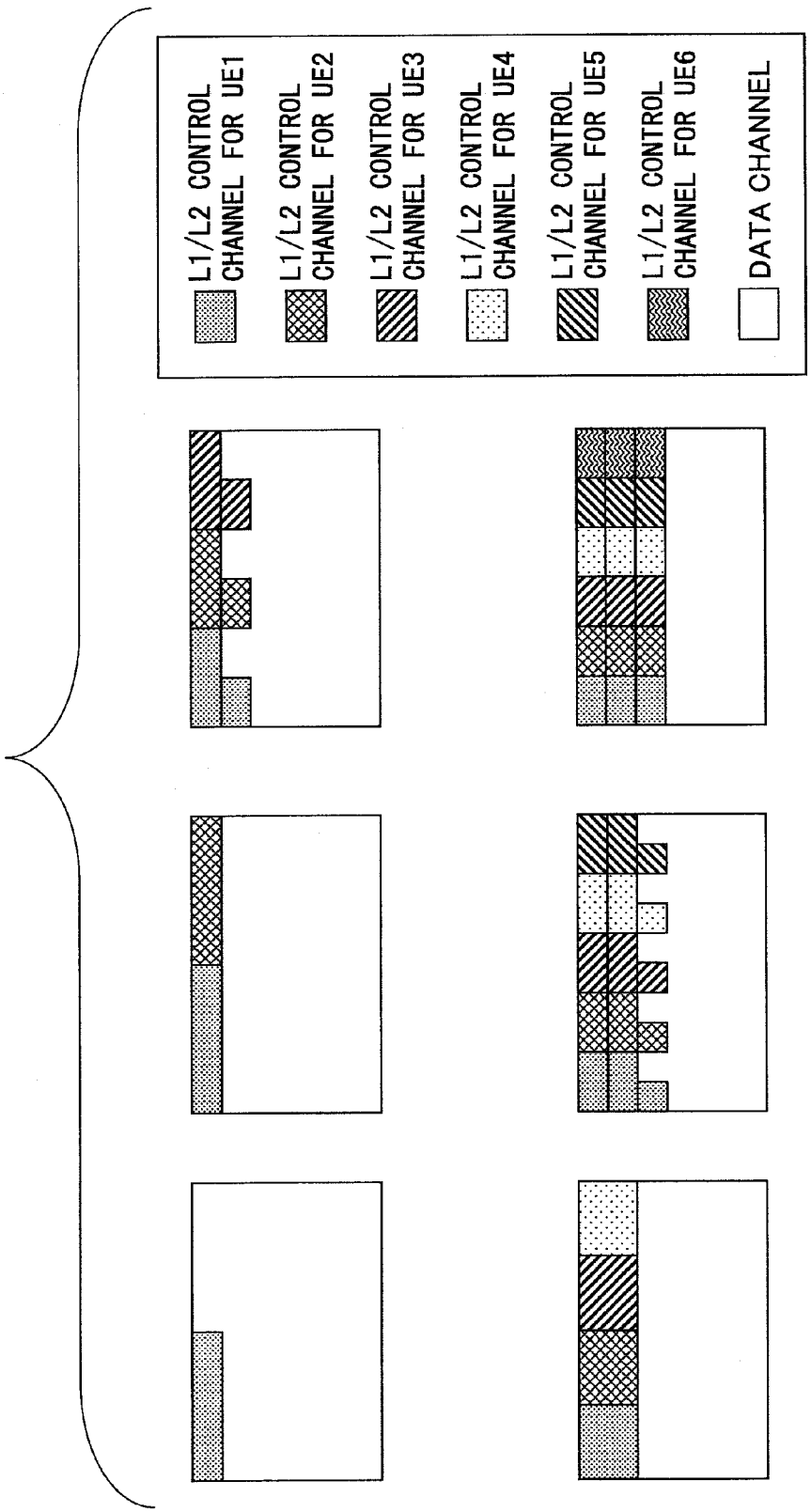

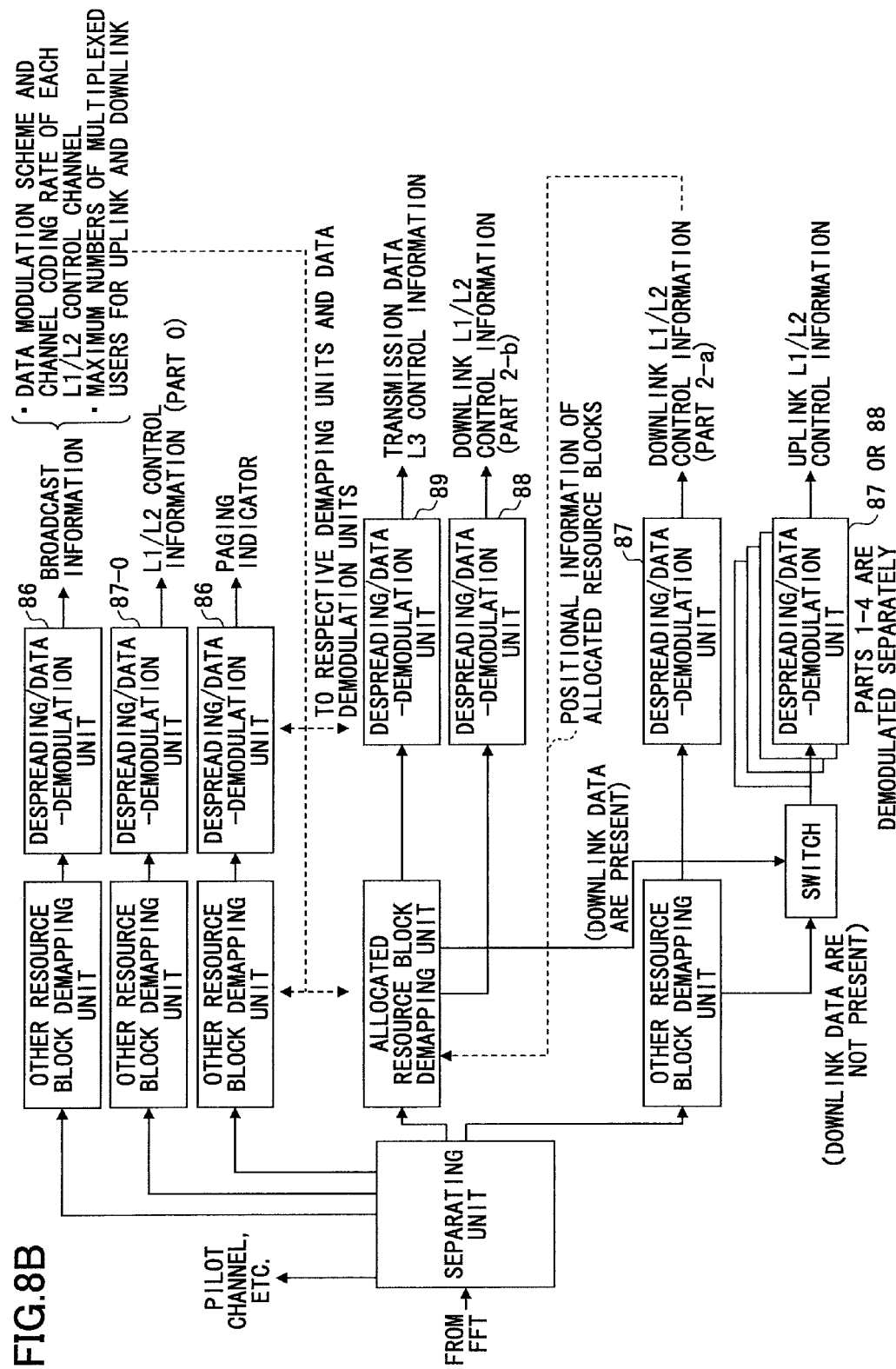

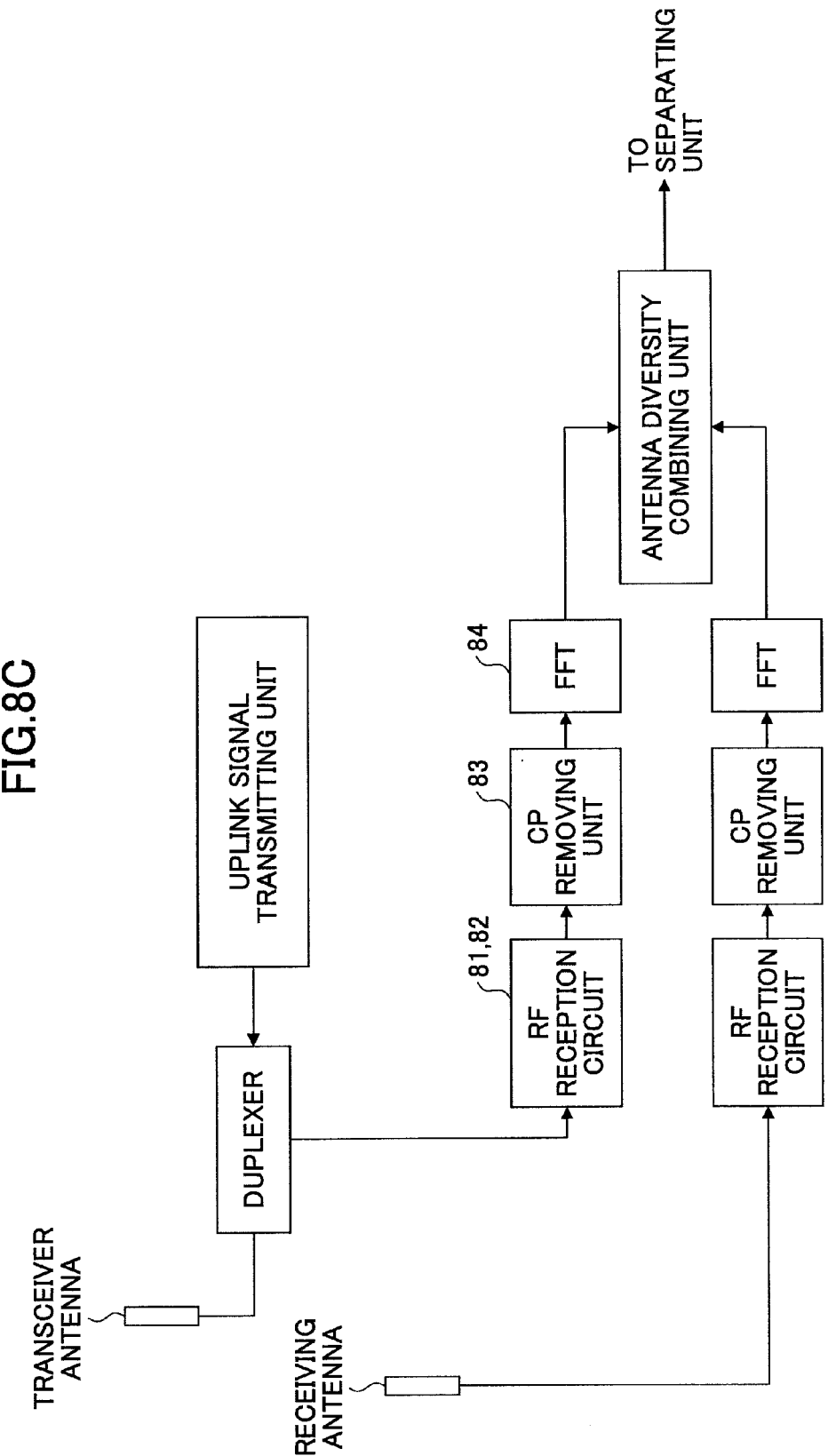

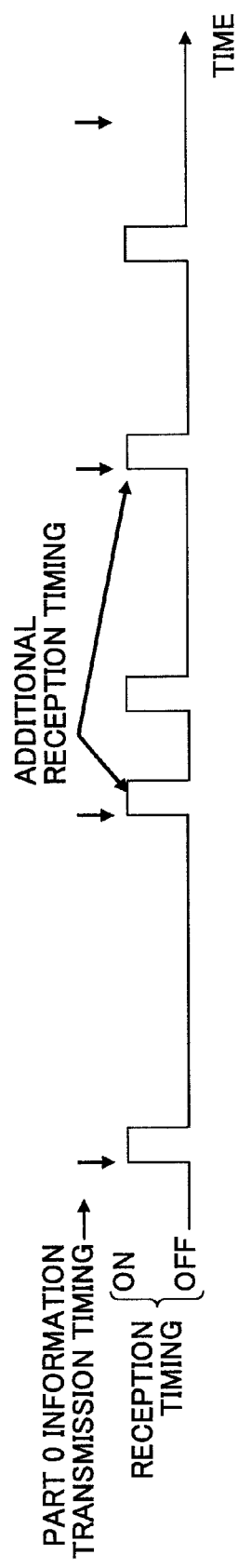

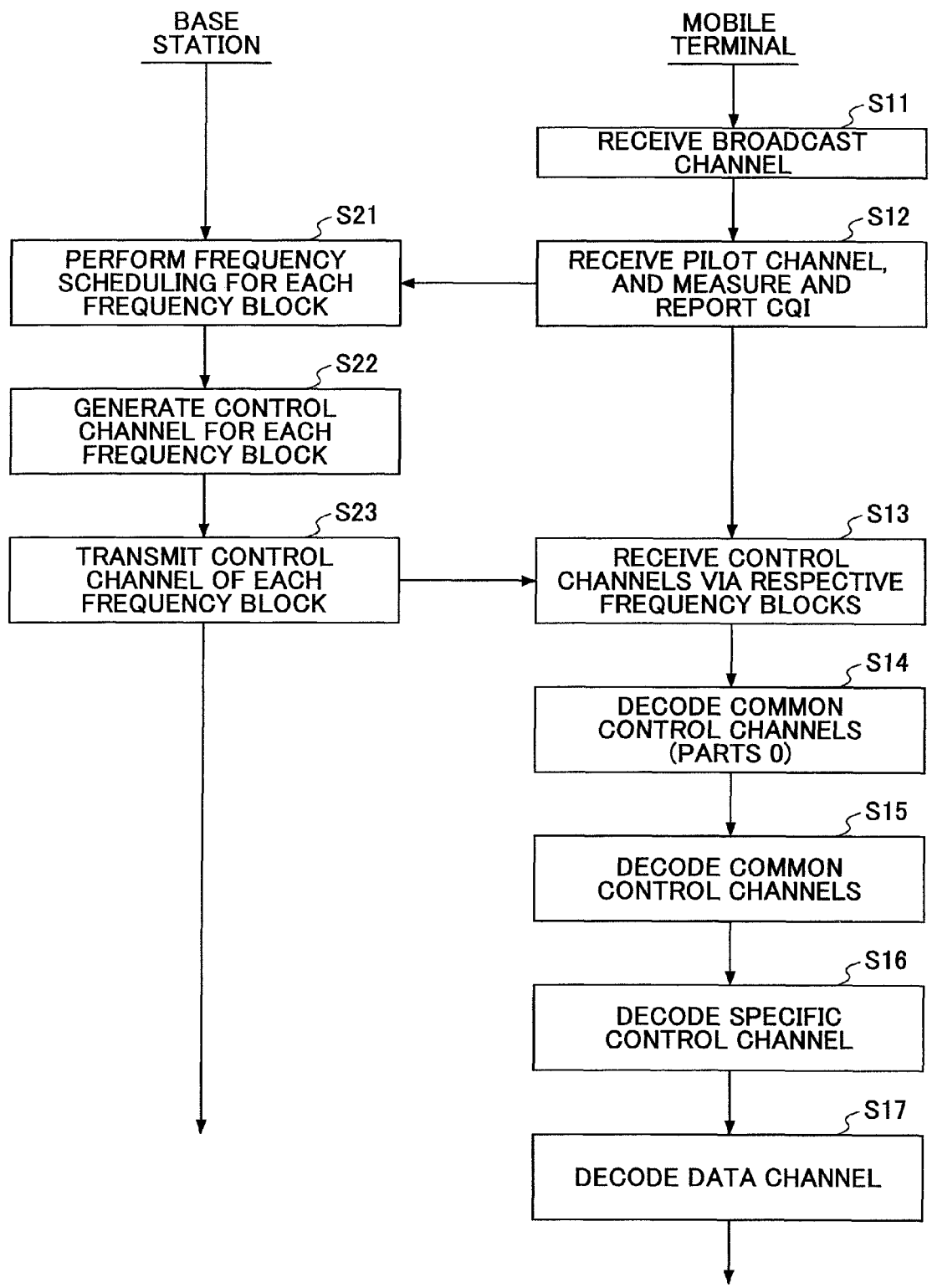

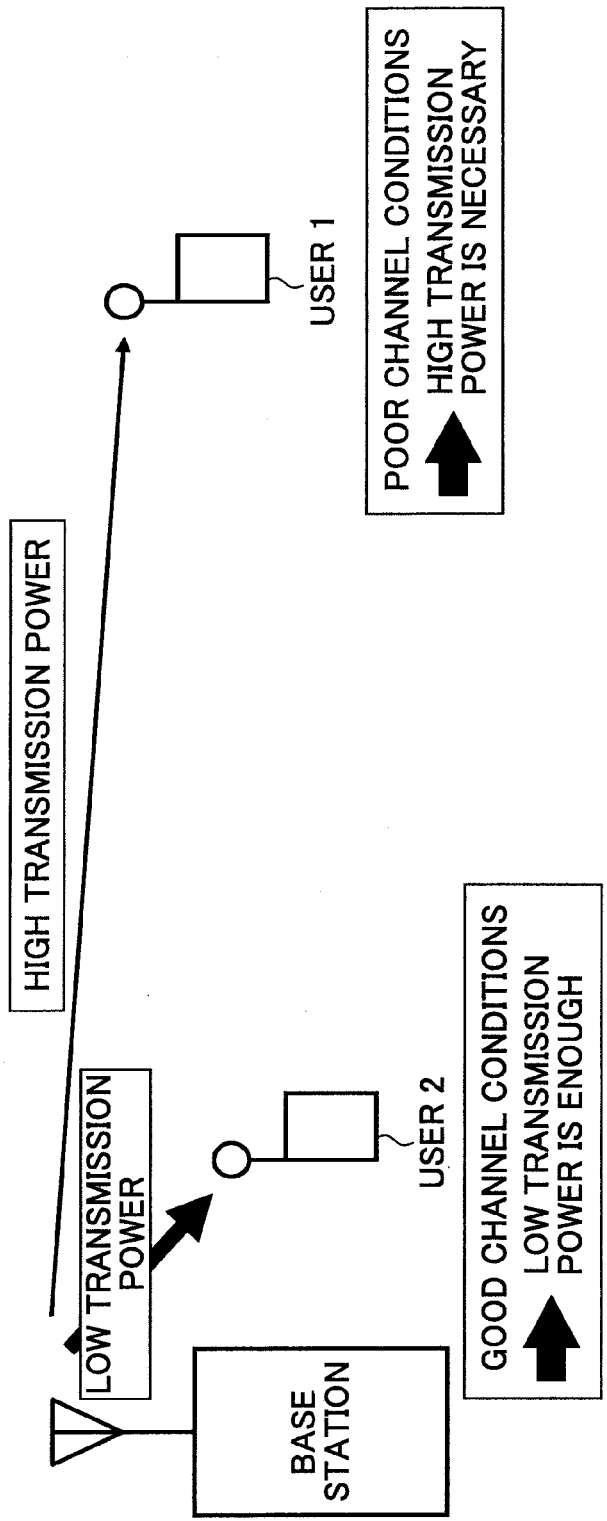

| | $N_{L1/L2(max)}$ | $N_{UE,D}$ | | $N_{UE,U}$ | | $N_D$ | $N'_D$ | $N_U$ | $N'_U$ |
|---|---|---|---|---|---|---|---|---|---|
| | | MCS1 | MCS2 | MCS1 | MCS2 | | | | |
| TTI-1 | 9 | 1 | 2 | 2 | 1 | 3 | 5 | 3 | 4 |
| TTI-2 | 5 | 1 | 2 | 2 | 0 | 2 | 3 | 2 | 2 |
| TTI-3 | 7 | 0 | 3 | 1 | 0 | 3 | 6 | 1 | 1 |
| TTI-4 | 7 | 6 | 0 | 1 | 0 | 6 | 6 | 1 | 1 |

FIG.17

| | METHOD 1 | METHOD 2 | METHOD 3 | METHOD 4 | METHOD 5 | METHOD 6 | METHOD 7 |
|---|---|---|---|---|---|---|---|
| L1/L2 CONTROL INFORMATION (EVERY TTI) | $N_{UE,D}(m)$, $N_{UE,U}(m)$ | $N'_D, N'_U$ | $N'_D + N'_U$ | $N'_D, N'_U$ | $N'_D + N'_U$ | $N'_D + N'_U$ | $N'_D + N'_U$ |
| L3 CONTROL INFORMATION (LONGER INTERVAL) | — | — | — | MCS | MCS | MCS | — |
| BCH (LONGER INTERVAL) | — | — | — | — | — | $N_{Dmax}, N_{Umax}$ | $N_{Dmax}, N_{Umax}$ |
| NUMBER OF BLIND DETECTION STEPS | $N_D + N_U$ | $N_{MCS} \times (N'_D + N'_U)$ | $2 \times N_{MCS} \times (N'_D + N'_U)$ | $N'_D + N'_U$ | $2 \times (N'_D + N'_U)$ | $N_{Dmax} + N_{Umax}$ | $N_{Dmax} + N_{Umax}$ |
| RADIO RESOURCE EFFICIENCY | ◎ | ◎ | ◎ | ○ | ○ | ○ | △ |

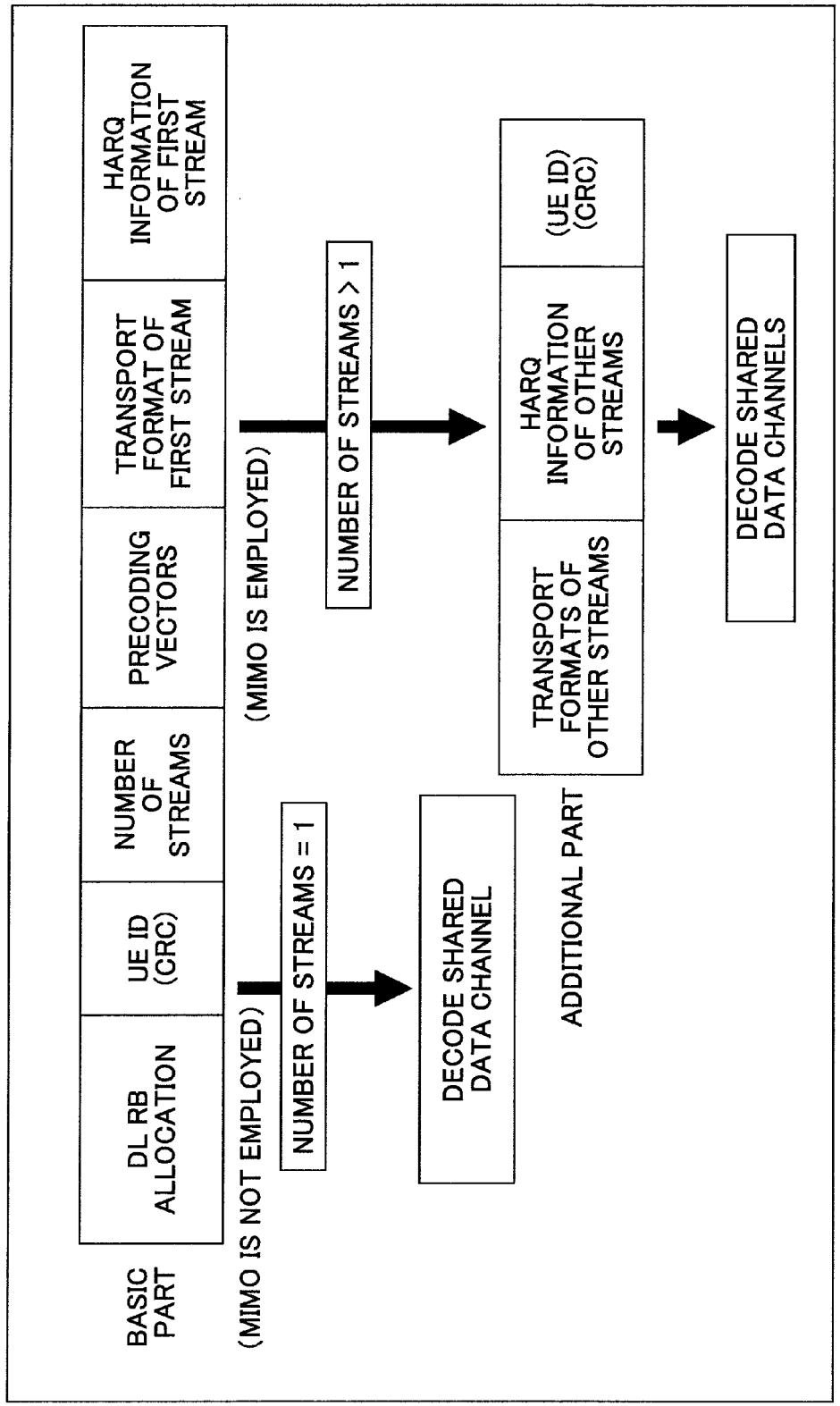

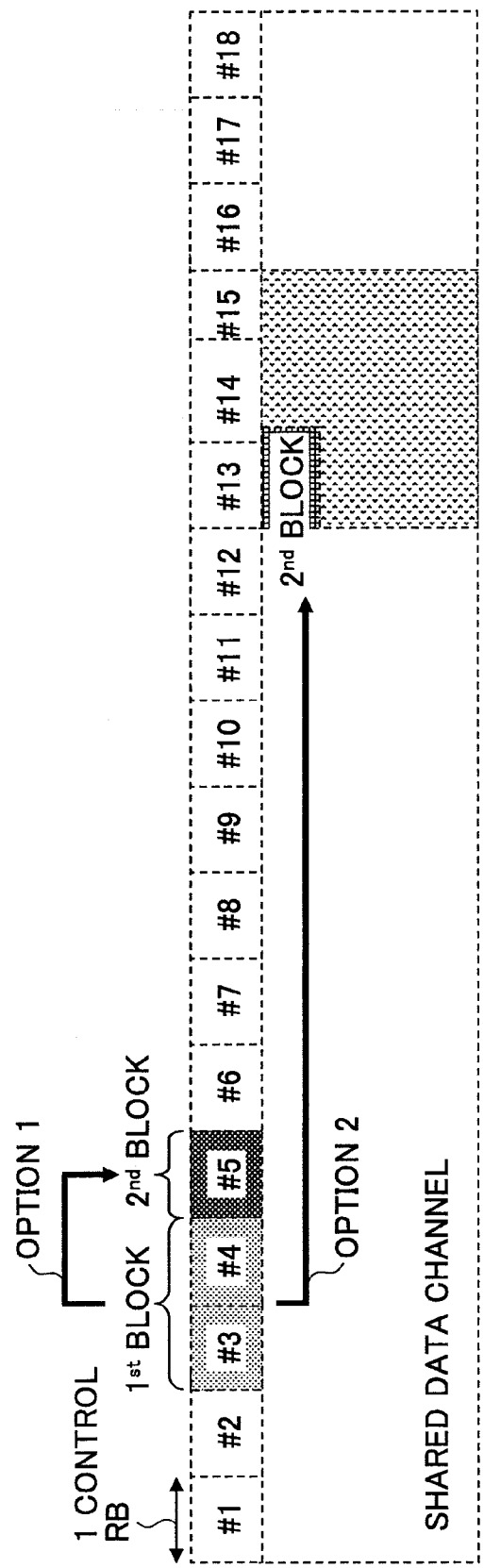

FIG.20

| DL RB ALLOCATION | UE ID (CRC) | NUMBER OF STREAMS | PRECODING VECTORS | TRANSPORT FORMATS OF ALL STREAMS | HARQ INFORMATION OF ALL STREAMS |

FIG.21

|  | FIRST METHOD BASIC PART AND ADDITIONAL PART ARE CODED SEPARATELY | SECOND METHOD FIXED-LENGTH PART AND VARIABLE-LENGTH PART ARE CODED SEPARATELY | THIRD METHOD ALL CONTROL INFORMATION ITEMS ARE CODED COLLECTIVELY |
|---|---|---|---|
| CHANNEL CODING GAIN | CODING GAIN OF BASIC PART IS HIGH AND CODING GAIN OF ADDITIONAL PART IS LOW | MEDIUM | HIGH |
| DECODING DELAY | DECODING DELAY OF NON-MIMO USER IS SMALL BECAUSE DECODING PROCESS IS REPEATED ONLY ONCE, AND DECODING DELAY OF MIMO USER IS LARGE BECAUSE DECODING PROCESS IS REPEATED MULTIPLE TIMES | DECODING DELAY IS LARGE BECAUSE DECODING PROCESS IS REPEATED MULTIPLE TIMES | DECODING DELAY IS SMALL BECAUSE DECODING PROCESS IS REPEATED ONLY ONCE |
| NUMBER OF BLIND DETECTION STEPS (WHEN PRECODING INFORMATION, TRANSPORT FORMAT INFORMATION, AND HARQ INFORMATION ARE NOT FIXED) | NUMBER OF BLIND DETECTION STEPS FOR BASIC PART MAY BECOME LARGE | NUMBER OF BLIND DETECTION STEPS IS SMALL BECAUSE DATA SIZES OF ALL PARTS ARE KNOWN | NUMBER OF BLIND DETECTION STEPS MAY BECOME LARGE |
| OVERHEAD (WHEN PRECODING INFORMATION, TRANSPORT FORMAT INFORMATION, AND HARQ INFORMATION ARE FIXED TO REDUCE THE NUMBER OF BLIND DETECTION STEPS) | OVERHEAD MAY BECOME SLIGHTLY LARGER BECAUSE OF DUMMY BITS USED TO FIX SIZE OF PRECODING INFORMATION | SMALL | OVERHEAD MAY BECOME LARGER BECAUSE OF DUMMY BITS USED TO FIX SIZES OF PRECODING INFORMATION, TRANSPORT FORMAT INFORMATION, AND HARQ INFORMATION |

FIG.22

| CONTROL SIGNALING INFORMATION | NUMBER OF BITS | DESCRIPTIONS (ASSUMPTIONS) |
|---|---|---|
| DOWNLINK RESOURCE ALLOCATION INFORMATION | $N_{RB}/2$ | BIT MAPPING FOR EACH PAIR OF ADJACENT TWO RBs IS USED |
| UE ID | 16 | =CRC |
| NUMBER OF SPATIAL STREAMS | 2 | FOUR STREAMS |
| PRECODING VECTOR INFORMATION | $[3]N_{precoding}$ (2 ANTENNAS) $[4-6]N_{precoding}$ (4 ANTENNAS) | PRELIMINARY VALUE |
| TRANSPORT FORMAT INFORMATION | $8N_{codeword}$ | FFS |
|  |  | TWO BITS ARE PROVIDED FOR MODULATION SCHEME AND SIX BITS ARE PROVIDED FOR PAYLOAD SIZE FOR EACH CODE WORD CONTROL (FFS) |
| HARQ INFORMATION | $5N_{codeword}$ | THREE BITS ARE PROVIDED FOR PROCESS NUMBER, AND TWO BITS ARE PROVIDED FOR REDUNDANCY VERSION AND NEW DATA INDICATOR |
| UPLINK RESOURCE ALLOCATION INFORMATION | $\log_2(N_{RB}(N_{RB}+1)/2)$ | TREE MAPPING |
| UE ID | 16 | =CRC |
| TRANSPORT FORMAT INFORMATION | 8 | TWO BITS ARE PROVIDED FOR MODULATION SCHEME AND SIX BITS ARE PROVIDED FOR PAYLOAD SIZE |
| TRANSMISSION POWER | [1-4] | SELECTED FROM 2-16 POWER OFFSET VALUES (FFS) |
| REFERENCE SIGNAL FORMAT INFORMATION FOR DECODING | [2] | SELECTED FROM FOUR CYCLIC SHIFT VALUES (FFS) |

$N_{RB}$ : NUMBER OF RESOURCE BLOCKS IN SYSTEM FREQUENCY BAND (e.g., 50 RESOURCE BLOCKS IN 10 MHz BAND)
$N_{precoding}$ : NUMBER OF FREQUENCY BLOCKS OF PRECODING CONTROL UNIT TO WHICH ALLOCATED RBs BELONG
$N_{codeword}$ : NUMBER OF CODE WORDS (ONE FOR ONE STREAM, AND TWO FOR 2-4 STREAMS)

FIG.23

NUMBER OF SYMBOLS PER DL SCHEDULING GRANT INFORMATION
(IT IS ASSUMED THAT DUMMY BITS ARE ADDED TO FIX CODE BLOCK
SIZE OF BASIC PART (FIXED PART) IN FIRST AND SECOND METHODS)

| CONDITIONS | 5 MHz BAND | | | 10 MHz BAND | | | 20 MHz BAND | | |
|---|---|---|---|---|---|---|---|---|---|
| | FIRST METHOD | SECOND METHOD | THIRD METHOD | FIRST METHOD | SECOND METHOD | THIRD METHOD | FIRST METHOD | SECOND METHOD | THIRD METHOD |
| CASE A<br>Min/Max B = 3 / 4<br>Min/Max $N_{codeword}$ = 1 / 2 | BASIC:47-48<br>ADDITIONAL: 0-13<br>(1.14-1.45%) | FIXED:15<br>VARIABLE: 32-46<br>(1.12-1.45%) | 47-61<br>(1.45%) | BASIC:59-60<br>ADDITIONAL: 0-13<br>(0.71-0.87%) | FIXED:27<br>VARIABLE: 32-46<br>(0.70-0.87%) | 59-73<br>(0.87%) | BASIC:84-85<br>ADDITIONAL: 0-13<br>(0.51-0.58%) | FIXED:52<br>VARIABLE: 32-46<br>(0.50-0.58%) | 84-98<br>(0.58%) |
| CASE B<br>Min/Max B = 3 / (4 × $N_{RB}$/5)<br>Min/Max $N_{codeword}$ = 1 / 2 | BASIC:47-64<br>ADDITIONAL: 0-13<br>(1.52-1.83%) | FIXED:15<br>VARIABLE: 32-62<br>(1.12-1.83%) | 47-77<br>(1.83%) | BASIC:59-96<br>ADDITIONAL: 0-13<br>(1.14-1.30%) | FIXED:27<br>VARIABLE: 32-82<br>(0.70-1.30%) | 59-109<br>(1.30%) | BASIC:84-161<br>ADDITIONAL: 0-13<br>(0.96-1.04%) | FIXED:52<br>VARIABLE: 32-122<br>(0.50-1.04%) | 84-174<br>(1.04%) |

BASE STATION, USER DEVICE, TRANSMISSION METHOD, AND RECEPTION METHOD

TECHNICAL FIELD

The present invention generally relates to wireless communication technologies. More particularly, the present invention relates to a base station, a user device, a transmission method, and a reception method used in a communication system where frequency scheduling and multicarrier transmission are employed.

BACKGROUND ART

In the field of wireless communication, there is a growing demand for a broadband wireless access system that enables efficient, high-speed, high-volume communications. For downlink in such a system, a multicarrier scheme such as orthogonal frequency division multiplexing (OFDM) is expected to be used to achieve high-speed, high-volume communications while effectively suppressing multipath fading. Also, in next generation systems, use of frequency scheduling is proposed to improve the frequency efficiency and thereby to increase the throughput.

As shown in FIG. 1, in next generation systems, a system frequency band is divided into multiple resource blocks (in this example, three resource blocks) each including one or more subcarriers. The resource blocks may also be called frequency chunks. Each terminal is allocated one or more resource blocks. In a frequency scheduling method, to improve the transmission efficiency or the throughput of the entire system, resource blocks are allocated preferentially to terminals with good channel conditions according to received signal quality or channel quality indicators (CQIs) measured and reported by the terminals based on downlink pilot channels for the respective resource blocks. A pilot channel is a signal known to both sending and receiving ends, and may also be called a reference signal, a known signal, and a training signal. When frequency scheduling is employed, it is necessary to report scheduling information indicating the results of scheduling to the terminals. The scheduling information is reported to the terminals via control channels (may also be called L1/L2 control signaling channels or associated control channels). The control channels are also used to report modulation schemes (e.g., QPSK, 16 QAM, or 64 QAM) and channel coding information (e.g., channel coding rates) used for the scheduled resource blocks as well as information regarding hybrid automatic repeat request (HARQ). For the structure of control channels used in such a mobile communication system, see, for example, 3GPP, TR25.848, "Physical layer aspects of UTRA High Speed Downlink Packet Access" and 3GPP, TR25.896, "Feasibility study of enhanced uplink for UTRA FDD".

Here, when a resource block common to all terminals is statically allocated for control channels, some terminals cannot receive the control channels with good quality because channel conditions of a resource block differ from terminal to terminal. Meanwhile, distributing control channels to all resource blocks may make it possible for all terminals to receive the control channels with certain reception quality. However, with this method, it is difficult to further improve the reception quality. For these reasons, there is a demand for a method of transmitting control channels with higher quality to terminals.

In a system where adaptive modulation and coding (AMC) is employed, i.e., where the modulation scheme and the channel coding rate are adaptively changed, the number of symbols used to transmit a control channel varies from terminal to terminal. This is because the amount of information transmitted per symbol varies depending on the combination of the modulation scheme and the channel coding rate. For a next generation system, it is also being discussed to send and receive different signals by multiple antennas provided at the sending and receiving ends. In this case, control information such as scheduling information as described above may be necessary for each of the signals transmitted by the multiple antennas. In other words, in such a system, the number of symbols necessary to transmit a control channel may vary from terminal to terminal and also vary depending on the number of antennas used by the terminal. When the amount of information to be transmitted via a control channel varies from terminal to terminal, it is necessary to use a variable format that can flexibly accommodate various amounts of control information to improve resource use efficiency. However, using a variable format may increase the signal processing workload at the sending and receiving ends. Meanwhile, when a fixed format is used, it is necessary to provide a dedicated control channel field that can accommodate the maximum amount of control information. In this case, even if a control channel occupies only a part of the control channel field, the resources for the remaining part of the control channel field cannot be used for data transmission and as a result, the resource use efficiency is reduced. For these reasons, there is a demand for a method to transmit control channels in a simple and highly efficient manner.

However, related-art methods of transmitting control channels still cannot meet the above demands.

DISCLOSURE OF INVENTION

Problems to be Solved by the Invention

One object of the present invention is to efficiently transmit control channels to user devices (communication terminals) in a communication system where a frequency band allocated to the communication system includes multiple resource blocks each including one or more subcarriers and each communication terminal communicates using one or more of the resource blocks.

Means for Solving the Problems

An aspect of the present invention provides a base station used in a mobile communication system employing OFDM for downlink. The base station includes a scheduler configured to determine allocation of radio resources for each subframe such that one or more resource blocks are allocated to a selected one of user devices for communications; a control channel generating unit configured to generate a control channel including common control information to be mapped to frequency components distributed across a system frequency band and specific control information to be mapped to the one or more resource blocks allocated to the selected one of the user devices; and a transmission signal generating unit configured to generate a transmission signal by time-division-multiplexing the common control information and the specific control information according to scheduling information from the scheduler. The common control information is transmitted every subframe as lower-layer control information and includes information units with a predetermined data size the number of which information units is less than or equal to a specified multiplicity, a format indicator representing one of preset options that indicates the number of symbols occupied by the common control information in a corresponding subframe, and information indicating the maximum number of the information units. The information indicating the maximum number of the information units is transmitted as a part of the common control information at a predetermined interval longer than or equal to one subframe.

An aspect of the present invention provides a transmission method performed by a base station in a mobile communication system employing OFDM for downlink. The method includes the steps of determining, by a scheduler, allocation of radio resources for each subframe such that one or more resource blocks are allocated to a selected one of user devices for communications; generating a control channel including common control information to be mapped to frequency components distributed across a system frequency band and specific control information to be mapped to the one or more resource blocks allocated to the selected one of the user devices; and generating a transmission signal by time-division-multiplexing the common control information and the specific control information according to scheduling information from the scheduler. The common control information is transmitted every subframe as lower-layer control information and includes information units with a predetermined data size the number of which information units is less than or equal to a specified multiplicity, a format indicator representing one of preset options that indicates the number of symbols occupied by the common control information in a corresponding subframe, and information indicating the maximum number of the information units. The information indicating the maximum number of the information units is transmitted as a part of the common control information at a predetermined interval longer than or equal to one subframe.

An aspect of the present invention provides a user device used in a mobile communication system employing OFDM for downlink. The user device includes a receiving unit configured to receive a signal that includes a control channel including common control information mapped to frequency components distributed across a system frequency band and specific control information mapped to one or more resource blocks allocated to a selected one of user devices; a separating unit configured to separate the control channel and other channels from the received signal; and a control channel decoding unit configured to decode the common control information and the specific control information. The common control information is transmitted every subframe as lower-layer control information and includes information units with a predetermined data size, a format indicator, and information indicating the maximum number of the information units. The information indicating the maximum number of the information units is transmitted as a part of the common control information at a predetermined interval longer than or equal to one subframe. The control channel decoding unit is configured to analyze the format indicator and the information indicating the maximum number of the information units in the common control information to identify one of preset options that indicates the number of symbols occupied by the common control information in a corresponding subframe, to determine whether control information for the user device is included in any one of the information units in the common control information by decoding the common control information using a predetermined decoding scheme for up to a number of times indicated by a specified multiplicity, to identify one or more resource blocks allocated to the user device based on the control information if the control information for the user device is included, and to demodulate the identified one or more resource blocks to extract a data channel.

An aspect of the present invention provides a reception method performed by a user device in a mobile communication system employing OFDM for downlink. The method includes the steps of receiving a signal that includes a control channel including common control information mapped to frequency components distributed across a system frequency band and specific control information mapped to one or more resource blocks allocated to a selected one of user devices; separating the control channel and other channels from the received signal; and decoding the common control information and the specific control information. The common control information is transmitted every subframe as lower-layer control information and includes information units with a predetermined data size, a format indicator, and information indicating the maximum number of the information units. The information indicating the maximum number of the information units is provided separately for uplink and downlink and transmitted as a part of the common control information at a predetermined interval longer than or equal to one subframe. The decoding step includes the steps of analyzing the format indicator and the information indicating the maximum number of the information units in the common control information to identify one of preset options that indicates the number of symbols occupied by the common control information in a corresponding subframe, determining whether control information for the user device is included in any one of the information units in the common control information by decoding the common control information using a predetermined decoding scheme for up to a number of times indicated by a specified multiplicity, identifying one or more resource blocks allocated to the user device based on the control information if the control information for the user device is included, and demodulating the identified one or more resource blocks to extract a data channel.

Advantageous Effect of the Invention

An aspect of the present invention makes it possible to efficiently transmit control channels to communication terminals in a communication system where a frequency band allocated to the communication system includes multiple resource blocks each including one or more subcarriers and each communication terminal communicates using one or more of the resource blocks.

BRIEF DESCRIPTION OF THE DRAWINGS

FIG. 2 is a drawing illustrating a frequency band used in an embodiment of the present invention;

FIG. 5A is a table showing exemplary information items of control signaling channels;

FIG. 5B is a drawing illustrating localized FDM and distributed FDM;

FIG. 5E is a drawing illustrating an information unit being used for a paging indicator;

FIG. 7A is a drawing illustrating exemplary mapping of data channels and control channels;

FIG. 7B is a drawing illustrating exemplary mapping of data channels and control channels;

FIG. 7C is a drawing illustrating exemplary formats of an L1/L2 control channel in a case where the number of symbols of the L1/L2 control channel is reported using part 0;

FIG. 7D is a drawing illustrating an exemplary format of an L1/L2 control channel in a case where the number of multiplexed users is reported for each MCS using part 0;

FIG. 7J is a drawing illustrating a method of reporting part 0 information;

FIG. 7M is a drawing illustrating a method of mapping L1/L2 control channels for multiple users;

FIG. 7O is a drawing illustrating transmission start timings of a broadcast channel and a shared data channel;

FIG. 8B is a partial block diagram of a mobile terminal according to an embodiment of the present invention;

FIG. 8C is a block diagram illustrating a receiving unit of a mobile terminal;

FIG. 8F is a timing chart showing part 0 information transmission timings and reception timings;

FIG. 9A is a flowchart showing an exemplary process according to an embodiment of the present invention;

FIG. 11 is a drawing illustrating an example of transmission power control (TPC);

FIG. 17 is a table comparing methods 1 through 7;

FIG. 18 is a drawing (1) illustrating an example where a part of a control signal is coded using the same channel coding scheme for all users and another part of the control signal is coded using different channel coding schemes for respective users;

FIG. 19B is a drawing used to describe methods of decoding a downlink scheduling grant;

FIG. 20 is a drawing used to describe a case where the channel coding scheme for a control signal is varied from user to user;

FIG. 21 is a table comparing first through third methods;

FIG. 22 is a table showing exemplary data sizes of respective information items; and FIG. 23 is a table comparing first through third methods.

EXPLANATION OF REFERENCES

Figure 1:
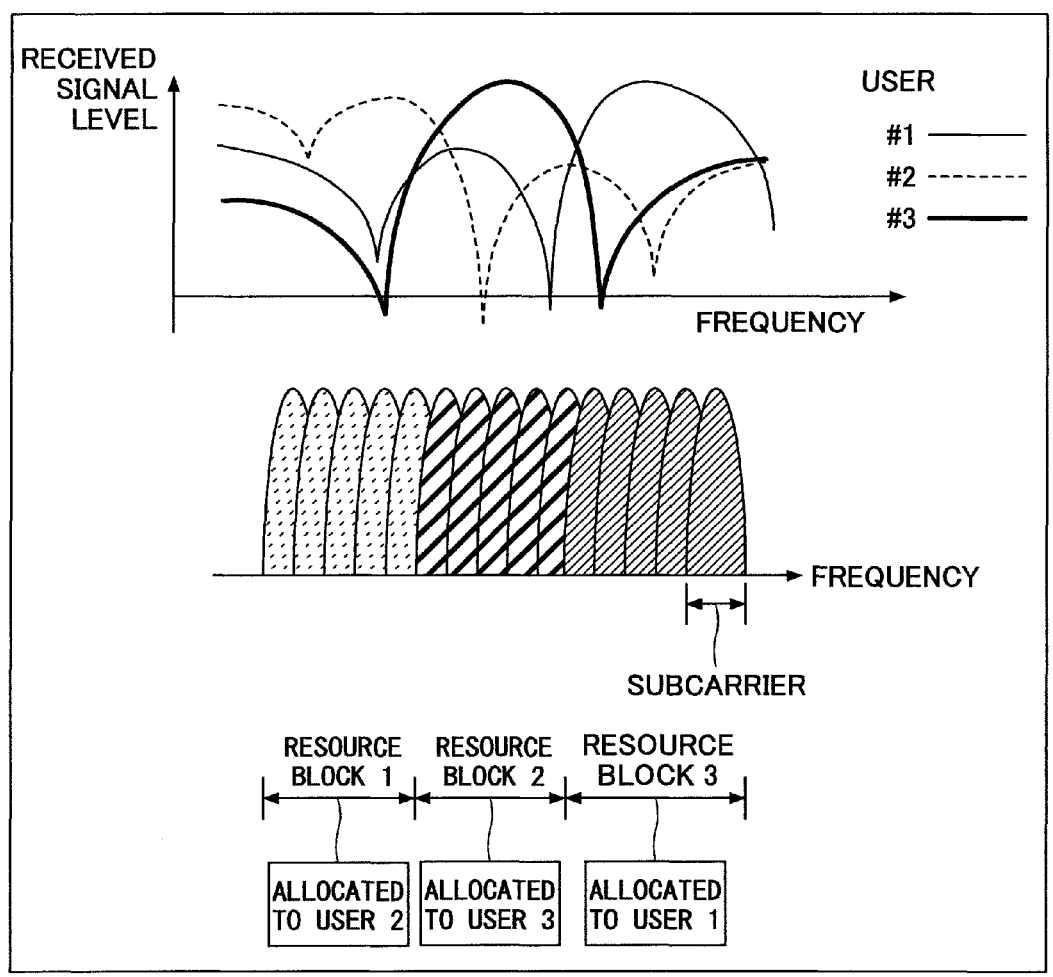
FIG. 1 is a drawing illustrating exemplary frequency scheduling.

31 Frequency block allocation control unit
32 Frequency scheduling unit
33-*x* Control signaling channel generating unit for frequency block x
34-*x* Data channel generating unit for frequency block
35 Broadcast channel (or paging channel) generating unit
1-*x* First multiplexing unit for frequency block
37 Second multiplexing unit
38 Third multiplexing unit
39 Other channels generating unit
40 Inverse fast Fourier transform unit
41 Cyclic prefix adding unit
41 General control channel generating unit
42 Specific control channel generating unit
43 Multiplexing unit
81 Carrier frequency tuning unit
82 Filtering unit
83 Cyclic prefix removing unit
84 Fast Fourier transform unit (FFT)
85 CQI measuring unit
86 Broadcast channel decoding unit
87-0 General control channel (part 0) decoding unit
87 General control channel decoding unit
88 Specific control channel decoding unit
89 Data channel decoding unit

BEST MODE FOR CARRYING OUT THE INVENTION

According to an embodiment of the present invention, a control channel includes general control information (common control information) to be decoded by communication terminals in general and specific control information to be decoded by specific communication terminals that are allocated one or more resource blocks, and the general control information and the specific control information are encoded and modulated separately. The control channel is generated by time-division-multiplexing the general control information and the specific control information according to scheduling information and is transmitted using a multicarrier scheme. This method makes it possible to efficiently transmit a control channel using a fixed format without wasting resources even when the amount of control information varies from communication terminal to communication terminal.

The general control information may be mapped so as to be distributed across the entire system frequency band and the specific control information for specific communication terminals may be mapped only to resource blocks allocated to the specific communication terminals. In this case, the specific control information is mapped to resource blocks that provide good channel conditions for the respective specific communication terminals. Thus, this method makes it possible to improve the quality of the specific control information while achieving a certain level of quality of the general control information for all users.

A downlink pilot channel may also be mapped so as to be distributed across multiple resource blocks allocated to multiple communication terminals. Mapping a pilot channel across a wide band, for example, makes it possible to improve the accuracy of channel estimation.

According to an embodiment of the present invention, to maintain or improve the reception quality of control channels including a general control channel and a specific control channel, transmission power control is performed for the general control channel and one or both of transmission power control and adaptive modulation and coding are performed for the specific control channel.

Transmission power control may be performed for the general control channel such that the reception quality of the general control channel at specific communication terminals that are allocated resource blocks is improved. That is, although all users or communication terminals receiving a general control channel try to demodulate the general control channel, it is enough if users who are allocated resource blocks can successfully demodulate the general control channel.

The general control channel may include information on a modulation scheme and/or a coding scheme applied to the specific control channel. Since the combination of a modulation scheme and a coding scheme for the general control channel is fixed (or is at least selected from a limited number of combinations), this method enables users who are allocated resource blocks to obtain information on the modulation scheme and the coding scheme for the specific control channel by demodulating the general control channel. In other words, this method makes it possible to perform adaptive modulation and coding on the specific control channel and thereby to improve the reception quality of the specific control channel.

When both transmission power control and adaptive modulation and coding are performed on the specific control channel, the total number of combinations of modulation schemes and coding schemes for the specific control channel may be less than the total number of combinations of modulation schemes and coding schemes for a shared data channel. This is because even if the required quality of the specific control channel is not achieved solely by adaptive modulation and coding, there is no problem as long as the required quality can be achieved by additionally performing transmission power control.

First Embodiment

FIG. 2 is a drawing illustrating a frequency band used in an embodiment of the present invention. Values used in the descriptions below are just examples and different values may be used. In the example described below, a frequency band (entire transmission band) allocated to a communication system has a bandwidth of 20 MHz. The entire transmission band includes four frequency blocks 1 through 4. Each of the frequency blocks includes multiple resource blocks each including one or more subcarriers. FIG. 2 schematically shows frequency blocks each including multiple subcarriers. In this embodiment, it is assumed that four different communication bandwidths of 5 MHz, 10 MHz, 15 MHz, and 20 MHz are defined. A user device (e.g., a communication terminal, a mobile terminal, or a fixed terminal) performs communications in one of the four bandwidths using one or more frequency blocks. A communication terminal in the communication system may support all of the four bandwidths or support only part of the four bandwidths. Still, each communication terminal at least supports the 5 MHz bandwidth. Alternatively, no communication bandwidth may be defined and each communication terminal may be configured to perform communications using the entire system frequency band. Although the above four communication bandwidths are defined in this embodiment for descriptive purposes, the present invention may also be applied to a case where communication bandwidths are not defined In this embodiment, a control channel (an L1/L2 control signaling channel or a lower-layer control channel) for reporting scheduling information of a data channel (shared data channel) to terminals is transmitted using the minimum bandwidth (5 MHz) and is provided for each frequency block. For example, when a terminal supporting the 5 MHz bandwidth performs communications using frequency block 1, the terminal receives a control channel provided for frequency block and thereby obtains scheduling information. Information indicating which terminals can use which frequency blocks may be reported in advance to the terminals, for example, via a broadcast channel. Also, frequency blocks used by the terminals may be changed after communications are started. When a terminal supporting the 10 MHz bandwidth performs communications using adjacent frequency blocks 1 and 2, the terminal receives control channels provided for frequency blocks 1 and 2 and thereby obtains scheduling information for the 10 MHz bandwidth. When a terminal supporting the 15 MHz bandwidth performs communications using adjacent frequency blocks 1, 2, and 3, the terminal receives control channels provided for frequency blocks 1, 2, and 3 and thereby obtains scheduling information for the 15 MHz bandwidth. When a terminal supporting the 20 MHz bandwidth performs communications, the terminal receives all control channels provided for the frequency blocks and thereby obtains scheduling information for the 20 MHz bandwidth.

In FIG. 2, four discrete blocks labeled "control channel" are shown in each frequency block. This indicates that a control channel is mapped (distributed) across multiple resource blocks in the frequency block. Details of control channel mapping are described later.

Figure 3A:
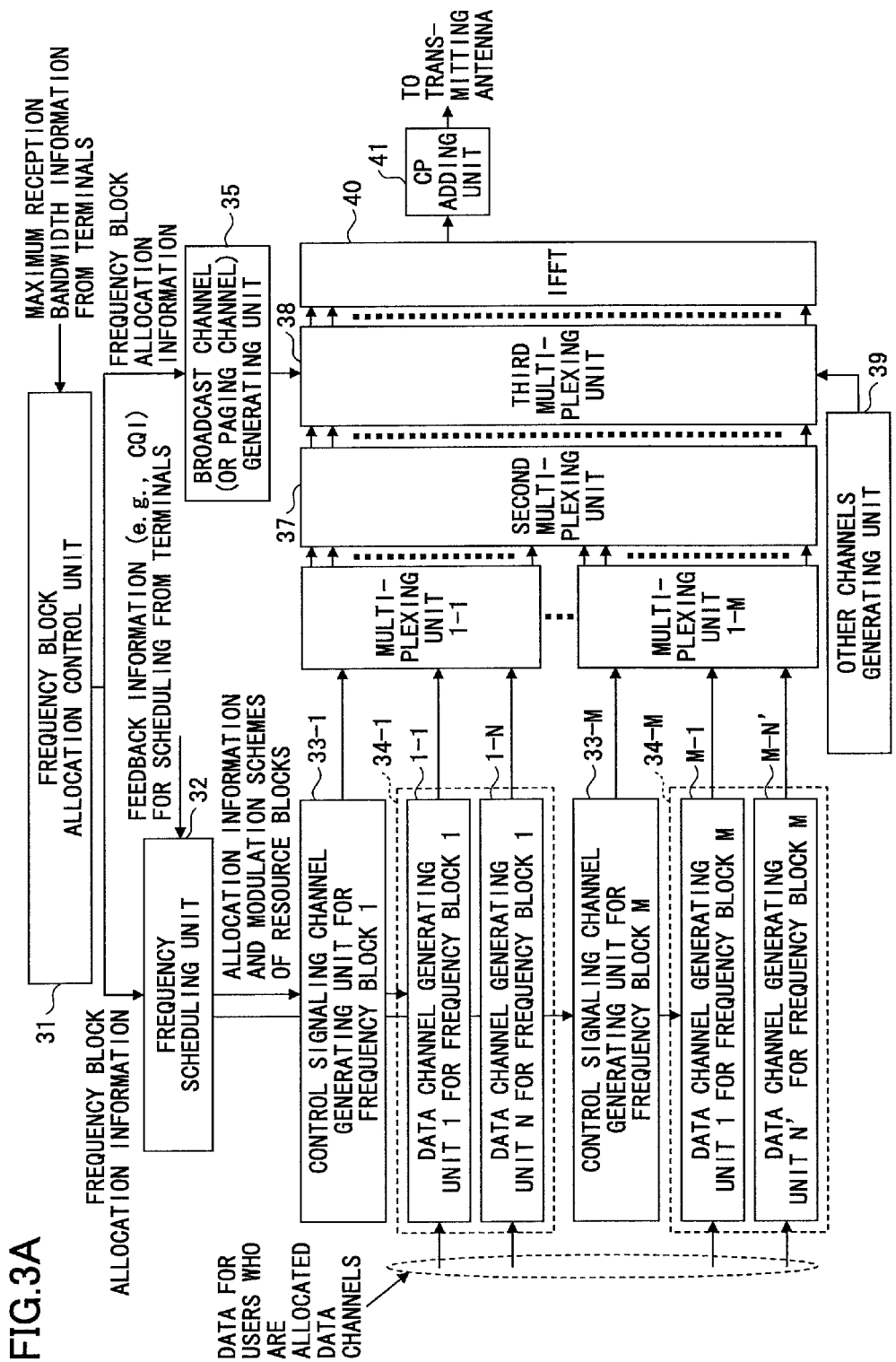
FIG. 3A is a partial block diagram (1) of a base station according to an embodiment of the present invention.

FIG. 3A is a partial block diagram of a base station according to an embodiment of the present invention. The base station shown in FIG. 3A includes a frequency block allocation control unit 31; a frequency scheduling unit 32; a control signaling channel generating unit 33-1 and a data channel generating unit 34-1 for frequency block 1, . . . , and a control signaling channel generating unit 33-M and a data channel generating unit 34-M for frequency block M; a broadcast channel (or paging channel) generating unit 35; a first multiplexing unit 1-1 for frequency block 1, and a first multiplexing unit 1-M for frequency block M; a second multiplexing unit 37; a third multiplexing unit 38; an other channels generating unit 39; an inverse fast Fourier transform unit (IFFT) 40; and a cyclic prefix (CP) adding unit 41.

The frequency block allocation control unit 31 determines a frequency block(s) to be used by a terminal (a mobile terminal or a fixed terminal) based on information regarding the maximum supported bandwidth reported by the terminal. The frequency block allocation control unit 31 manages the correspondence between respective terminals and frequency blocks and sends the correspondence information to the frequency scheduling unit 32. The correspondence between frequency blocks and terminals supporting different bandwidths may be reported in advance to the terminals via a broadcast channel. For example, the frequency block allocation control unit 31 allows a user communicating with the 5 MHz bandwidth to use any one or a specific one of frequency blocks 1 through 4. For a user communicating with the 10 MHz bandwidth, the frequency block allocation control unit 31 allows the use of two adjacent frequency blocks, i.e., frequency blocks "1 and 2", "2 and 3", or "3 and 4". The frequency block allocation control unit 31 may allow the user to use any one or a specific one of the combinations. For a user communicating with the 15 MHz bandwidth, the frequency block allocation control unit 31 allows the use of three adjacent frequency blocks, i.e., frequency blocks "1, 2, and 3" or "2, 3, and 4". The frequency block allocation control unit 31 may allow the user to use any one or a specific one of the combinations. For a user communicating with the 20 MHz bandwidth, the frequency block allocation control unit 31 allows the use of all frequency blocks. Frequency blocks allowed to be used by a user may be changed after communications are started according to a frequency hopping pattern.

The frequency scheduling unit 32 performs frequency scheduling for each of the frequency blocks. The frequency scheduling unit 32 performs frequency scheduling for each frequency block based on channel quality indicators (CQIs) reported by terminals for respective resource blocks such that the resource blocks are allocated preferentially to terminals with good channel conditions, and generates scheduling information based on the scheduling results.

The control signaling channel generating unit 33-1 for frequency block 1 forms a control signaling channel for reporting scheduling information of frequency block 1 to terminals using only resource blocks within frequency block 1. Similarly, each of the control signaling channel generating units 33 for other frequency blocks forms a control signaling channel for reporting scheduling information of the corresponding frequency block to terminals using only resource blocks within the corresponding frequency block.

The data channel generating unit 34-1 for frequency block 1 generates data channels each of which is to be transmitted using one or more resource blocks in frequency block 1. Frequency block 1 may be shared by one or more terminals (users). Therefore, in this example, the data channel generating unit 34-1 for frequency block 1 includes N data channel generating units 1-1 through 1-N. Similarly, each of the data channel generating units 34 for other frequency blocks generates data channels for terminals sharing the corresponding frequency block.

The first multiplexing unit 1-1 for frequency block 1 multiplexes signals to be transmitted using frequency block 1. This multiplexing includes at least frequency division multiplexing. Multiplexing of the control signaling channel and the data channels is described later in more detail. Similarly, each of the first multiplexing units 1 for other frequency blocks multiplexes a control signaling channel and data channels to be transmitted using the corresponding frequency block.

The second multiplexing unit 37 changes positional relationships of the first multiplexing units 1-$x$ ($x$=1, . . . , M) on the frequency axis according to a hopping pattern. Details of this process are described in the second embodiment.

The broadcast channel (or paging channel) generating unit 35 generates broadcast information such as office data to be reported to terminals covered by the base station. The broadcast information may include information indicating the correspondence between maximum supported bandwidths of terminals and usable frequency blocks. If the usable frequency blocks are to be varied, the broadcast information may also include information specifying a hopping pattern indicating how the usable frequency blocks are varied. A paging channel may be transmitted using the same frequency band as that used for the broadcast channel or using frequency blocks used by the respective terminals.

The other channels generating unit 39 generates channels other than control signaling channels and data channels. For example, the other channels generating unit 39 generates a pilot channel.

The third multiplexing unit 38 multiplexes control signaling channels and data channels of all frequency blocks, a broadcast channel, and/or other channels as necessary.

The inverse fast Fourier transform unit 40 inverse-fast-Fourier-transforms a signal output from the third multiplexing unit 38 and thereby modulates the signal according to OFDM.

The cyclic prefix (CP) adding unit 41 generates transmission symbols by attaching guard intervals to the OFDM-modulated symbols. A transmission symbol is, for example, generated by duplicating a series of data at the end (or head) of an OFDM-modulated symbol and attaching the duplicated data to the head (or end) of the OFDM-modulated symbol.

Figure 3B:
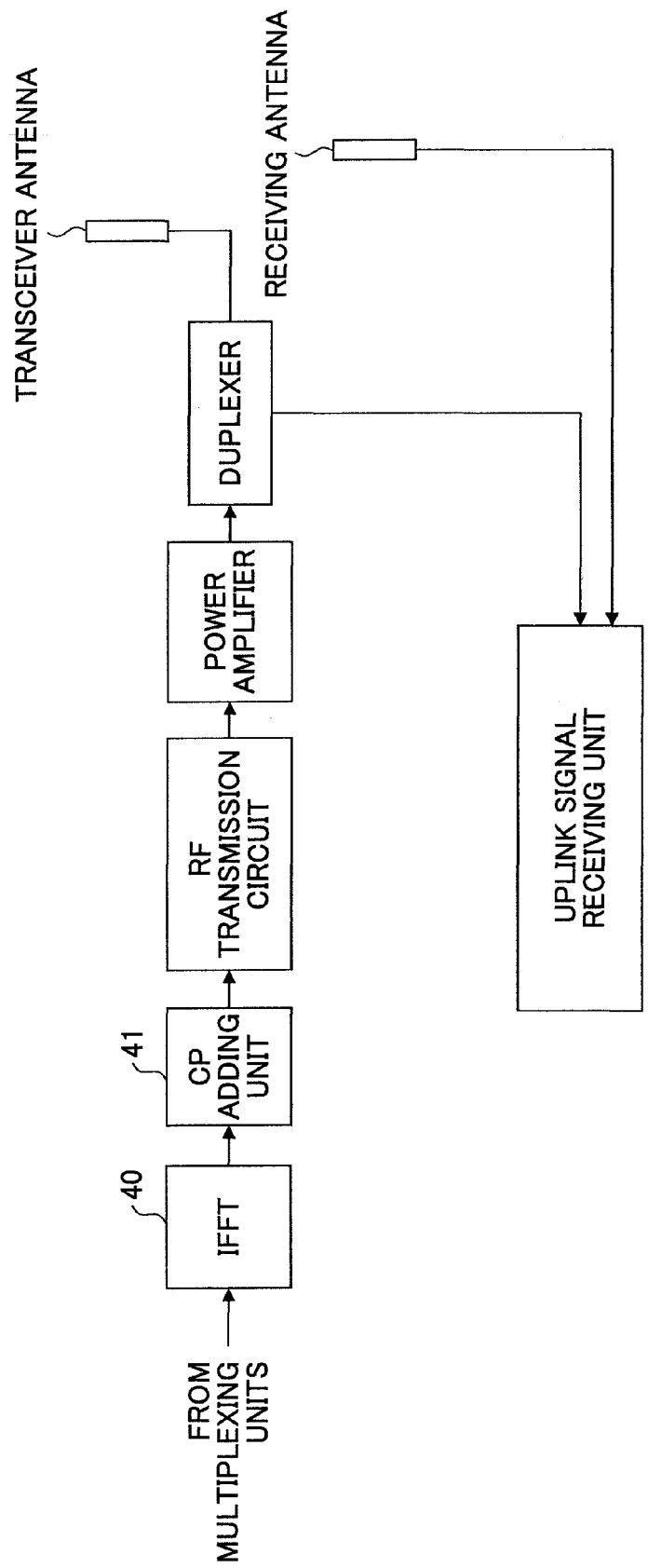
FIG. 3B is a partial block diagram (2) of a base station according to an embodiment of the present invention.

FIG. 3B shows components following the CP adding unit 41 shown in FIG. 3A. As shown in FIG. 3B, an RF transmission circuit performs digital-analog conversion, frequency conversion, and band limitation on the symbols with the guard intervals, and a power amplifier amplifies the symbols to an appropriate power level. Then, the symbols are transmitted via a duplexer and a transceiver antenna.

In this embodiment, it is assumed that the base station performs antenna diversity reception using two antennas, although this feature is not essential for the present invention. An uplink signal received by the two antennas is input to an uplink signal receiving unit.

Figure 4A:
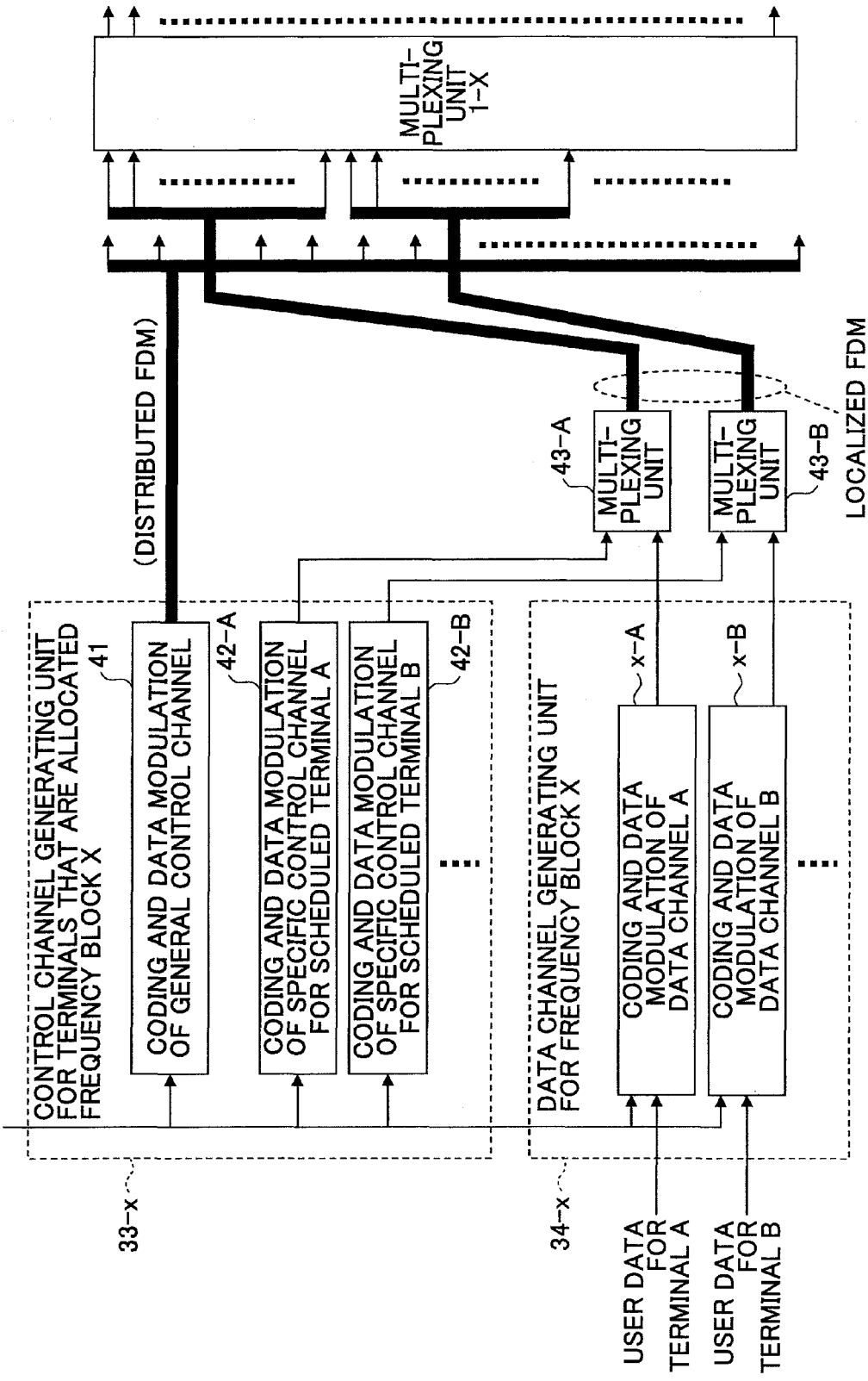
FIG. 4A is a drawing illustrating signal processing components for one frequency block.

FIG. 4A is a drawing illustrating signal processing components for one frequency block ($x$th frequency block). In FIG. 4A, "$x$" indicates an integer greater than or equal to 1 and less than or equal to M. Signal processing components for frequency block x include a control signaling channel generating unit 33-$x$, a data channel generating unit 34-$x$, multiplexing units 43-A, 43-B, . . . , and a multiplexing unit 1-$x$. The control signaling channel generating unit 33-$x$ includes a general control channel generating unit 41 and one or more specific control channel generating units 42-A, 42-B, . . . . .

The general control channel generating unit 41 performs channel coding and multilevel modulation on a general control channel (may also be called general control information or common control information), which is a part of a control signaling channel and is to be decoded and demodulated by all terminals using the corresponding frequency block, and outputs the general control channel.

Each of the specific control channel generating units 42 performs channel coding and multilevel modulation on a specific control channel (may also be called specific control information), which is a part of a control signaling channel and is to be decoded and demodulated by a terminal to which one or more resource blocks in the corresponding frequency block are allocated, and outputs the specific control channel.

The data channel generating unit 34-x includes data channel generating units x-A, x-B, . . . that, respectively, perform channel coding and multilevel modulation on data channels of terminals A, B, . . . . Information regarding the channel coding and the multilevel modulation is included in the specific control channel described above.

The multiplexing units 43 map specific control channels and data channels of respective terminals to resource blocks allocated to the terminals.

Figure 6:
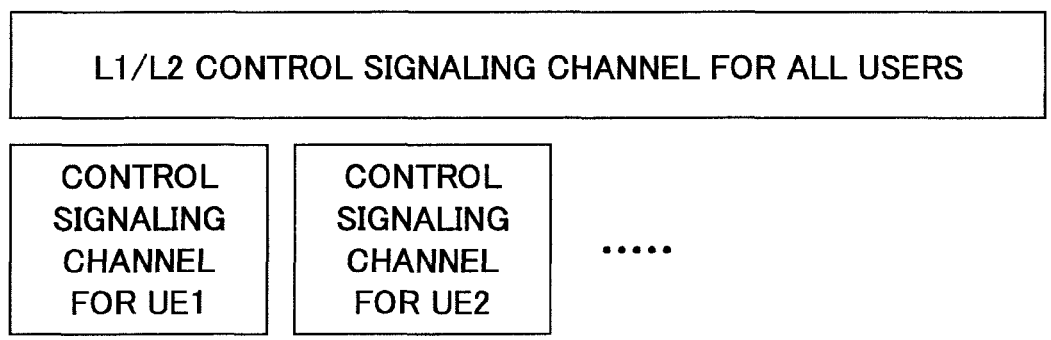
FIG. 6 is a drawing illustrating a unit of error correction coding.

As described above, the general control channel generating unit 41 encodes (and modulates) the general control channel and the specific control channel generating units 42 encode (and modulate) the respective specific control channels. Accordingly, as schematically shown in FIG. 6, the general control channel of this embodiment includes sets of information for all users who are assigned frequency block x and the sets of information may be collectively error-correction-coded.

Alternatively, the general control channel may be error-correction-coded for each user. In this case, a user cannot uniquely identify a block in the error-correction-coded blocks where the information for the user is contained. Therefore, the user has to decode all blocks. With this method, because encoding is performed for each user, it is comparatively easy to add or change users. Each user has to decode and demodulate the general control channel including the sets of information for all users.

Meanwhile, the specific control channels include only information for users to which resource blocks are actually allocated and are therefore error-correction-coded for the respective users. Each user determines whether a resource block(s) has been allocated by decoding and demodulating the general control channel. Accordingly, only users who are allocated resource blocks have to decode the specific control channels. The channel coding rates and modulation schemes for the specific control channels are changed during communications as needed. On the other hand, the channel coding rate and the modulation scheme for the general control channel may be fixed. Still, however, it is preferable to perform transmission power control (TPC) to achieve a certain level of signal quality. Thus, error-correction-coded specific control channels are transmitted using resource blocks providing good channel conditions. Therefore, the amount of downlink data may be reduced to some extent by puncturing.

Figure 5C:
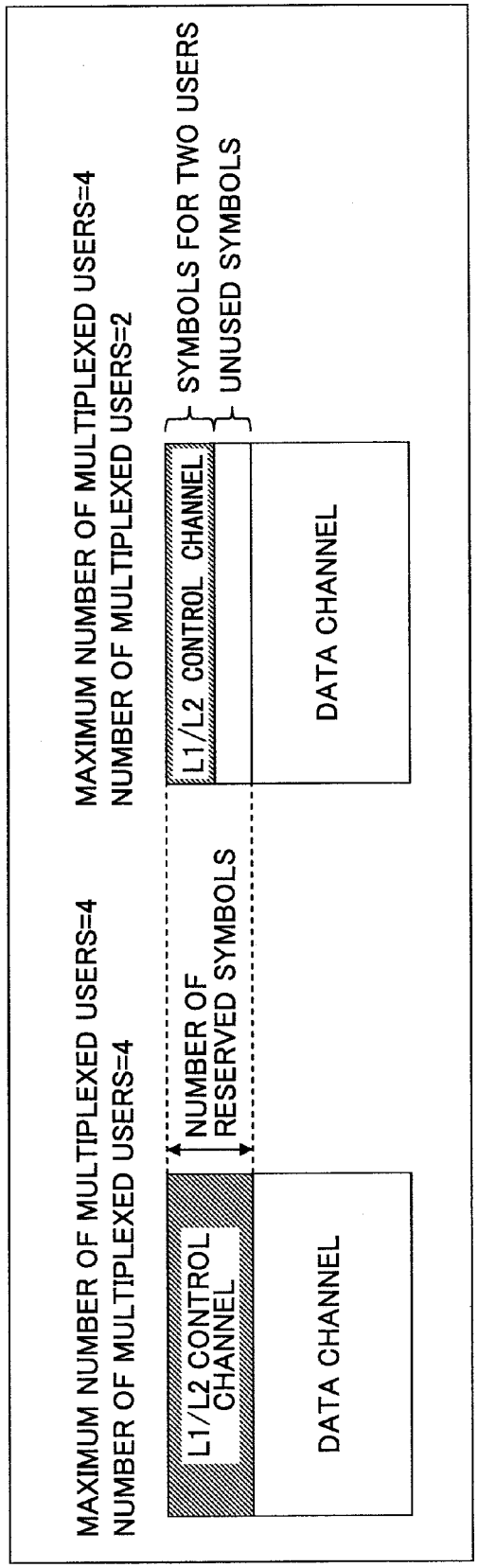
FIG. 5C is a drawing showing the number of symbols of an L1/L2 control channel which changes according to the number of multiplexed users.

FIG. 5A shows types of downlink control signaling channels and exemplary information items of the respective downlink control signaling channels.

Downlink control signaling channels include a broadcast channel (BCH), a dedicated L3 signaling channel (upper-layer control channel or high layer control channel), and an L1/L2 control channel (lower-layer control channel). The L1/L2 control channel may include information for uplink data transmission in addition to information for downlink data transmission. Also, the L1/L2 control channel may include a transport format (e.g., a data modulation scheme, a channel coding rate, and the number of multiplexed users) of the L1/L2 control channel. Information items to be transmitted by the respective channels are described below.

(Broadcast Channel)

The broadcast channel is used to report information that is unique to a cell or information that changes only at long intervals to communication terminals (either mobile terminals or fixed terminals; may also be called user devices). For example, information that changes only at an interval of 1000 ms (1 s) may be reported as broadcast information. Broadcast information may also include a transport format of a downlink L1/L2 control channel, the maximum number of multiplexed users, resource block configuration information, and MIMO scheme information. The maximum number of multiplexed users indicates the number of users whose control information is multiplexed in a downlink L1/L2 control channel in a subframe (i.e., the number of information units). The maximum number of multiplexed users may be specified separately for uplink and downlink ($N_{Umax}$ and $N_{Dmax}$) or may be represented by the total number of multiplexed users for uplink and downlink ($N_{all}$).

The transport format is specified by a data modulation scheme and a channel coding rate. Since a channel coding rate can be uniquely determined based on a data modulation scheme and a data size, the data size may be reported instead of the channel coding rate. Alternatively, the transport format may be included in the L1/L2 control channel as described later.

The maximum number of multiplexed users indicates the number of users that can be multiplexed within one TTI using one or more of FDM, CDM, and TDM. The same maximum number of multiplexed users may be specified for uplink and downlink, or different numbers may be specified for uplink and downlink.

The resource block configuration information indicates positions of resource blocks used in a cell on the frequency and time axes. In this embodiment, two types of frequency division multiplexing (FDM) schemes are used: localized FDM and distributed FDM. In localized FDM, a consecutive frequency band locally-concentrated on the frequency axis is allocated preferentially to each user having good channel conditions. Localized FDM is suitable, for example, for communications of users with low mobility and for high-quality, high-volume data transmission. In distributed FDM, a downlink signal is generated such that it includes multiple intermittent frequency components distributed across a wide frequency band. Distributed FDM is suitable, for example, for communications of users with high mobility and for periodic transmission of small-size data such as voice packets (VoIP). Thus, frequency resources are allocated as a consecutive frequency band or discrete frequency components to each user based on the resource block configuration information according to either of the FDM schemes.

The upper half of FIG. 5B illustrates an example of localized FDM. In this example, when a resource is identified by a localized resource block number "4", it corresponds to physical resource block 4. The lower half of FIG. 5B illustrates an example of distributed FDM. In this example, when a resource is identified by a distributed resource block number "4", it corresponds to left halves of physical resource blocks 2 and 8. In the lower half of FIG. 5B, each physical resource block is divided into two. However, the numbering and the number of divisions of resource blocks in distributed FDM may vary from cell to cell. For this reason, the resource block configuration information is reported via a broadcast channel to communication terminals in each cell.

The MIMO scheme information is reported if the base station is equipped with multiple antennas and indicates whether single-user multi-input multi-output (SU-MIMO) or multi-user MIMO (MU-MIMO) is used. In SU-MIMO, a base station with multiple antennas communicates with one communication terminal with multiple antennas. Meanwhile, in MU-MIMO, a base station with multiple antennas communicates with plural communication terminals.

In downlink MU-MIMO, a signal for a user device $UE_A$ is transmitted from one or more antennas (e.g., a first antenna of two antennas) of the base station and a signal for another user device $UE_B$ is transmitted from other one or more antennas (e.g., a second antenna of the two antennas) of the base station. In uplink MU-MIMO, a signal from a user device $UE_A$ and a signal from another user device $UE_B$ are received at the same time by multiple antennas of the base station. Signals from multiple user devices are, for example, distinguished by reference signals assigned to the respective user devices. As the reference signals, CAZAC code sequences are preferably used. CAZAC code sequences become orthogonal to each other even if they are generated from the same sequence as long as different cyclic shift amounts are applied. Therefore, using CAZAC code sequences makes it possible to easily provide orthogonal sequences.

(Dedicated L3 Signaling Channel)

The dedicated L3 signaling channel is also used to report information that changes at long intervals, for example, at an interval of 1000 ms, to communication terminals. While the broadcast channel is sent to all communication terminals in a cell, the dedicated L3 signaling channel is sent only to specific communication terminals. The dedicated L3 signaling channel includes information on a type of FDM and persistent scheduling information. The dedicated L3 signaling channel may be categorized as a specific control channel.

The type of FDM indicates whether localized FDM or distributed FDM is used for each of selected communication terminals.

The persistent scheduling information is reported when persistent scheduling is performed and includes transport formats (data modulation schemes and channel coding rates) of uplink or downlink data channels and information on resource blocks to be used.

(L1/L2 Control Channel)

The downlink L1/L2 control channel may include information for uplink data transmission in addition to information for downlink data transmission. The L1/L2 control channel may further include information bits (part 0) indicating the transport format of the L1/L2 Control channel. Information for downlink data transmission may be classified into part 1, part 2a, and part 2b. Part 1 and part 2a are categorized as general control channels and part 2b may be categorized as a specific control channel.

(Part 0)

Part 0 information (hereafter simply called "part 0") includes a transport format (a modulation scheme, a channel coding rate, and the number of multiplexed users or a total number of control bits) of the L1/L2 control channel. If the transport format of the L1/L2 control channel is reported by a broadcast channel, part 0 includes the number of multiplexed users (or a total number of control bits).

The number of symbols necessary for the L1/L2 control channel varies depending on the number of multiplexed users and the reception quality of the users to be multiplexed. Typically, as shown in the left side of FIG. 5C, a fairly large number of symbols are reserved for the L1/L2 control channel. When the number of symbols is changed, the change is reported as a part of the transport format of the L1/L2 control channel which is sent via the broadcast channel, for example, at an interval of about 1000 ms (1 s). When the number of multiplexed users is small, the number of symbols necessary for the L1/L2 control channel becomes smaller as shown in the right side of FIG. 5C. Here, if a large amount of resources is continuously reserved for the L1/L2 control channel in an environment where the number of multiplexed users and the reception quality of the multiplexed users change at short intervals, a large part of the resources may be wasted.

To reduce the waste of resources for the L1/L2 control channel, part 0 (a modulation scheme, a channel coding rate, and the number of multiplexed users or a total number of control bits) may be included in the L1/L2 control channel. Reporting the modulation scheme and the channel coding rate using part 0 of the L1/L2 control channel makes it possible to change the modulation scheme and the channel coding rate at shorter intervals compared with a case where they are reported using the broadcast channel. When the number of symbols occupied by the L1/L2 control channel in one subframe is selected from preset options, the transport format can be identified by determining which one of the options is selected. For example, when four types of transport formats are provided as described later, the part 0 information may be represented by two bits.

(Part 1)

Part 1 includes a paging indicator (PI). Each communication terminal can determine whether it is being paged by demodulating the paging indicator. More specifically, each communication terminal determines whether a group number assigned to the communication terminal is present in the paging indicator and demodulates a paging channel (PCH) if the group number is present. The positional relationship between the PI and the PCH is known to the communication terminal. Then, the communication terminal determines whether its identification information (e.g., the phone number of the communication terminal) is present in the PCH and thereby determines whether there is an incoming call.

The PI may be transmitted (1) using parts of the L1/L2 control channel that are dedicated for the PI or (2) using non-dedicated information units in the L1/L2 control channel.

Figure 5D:
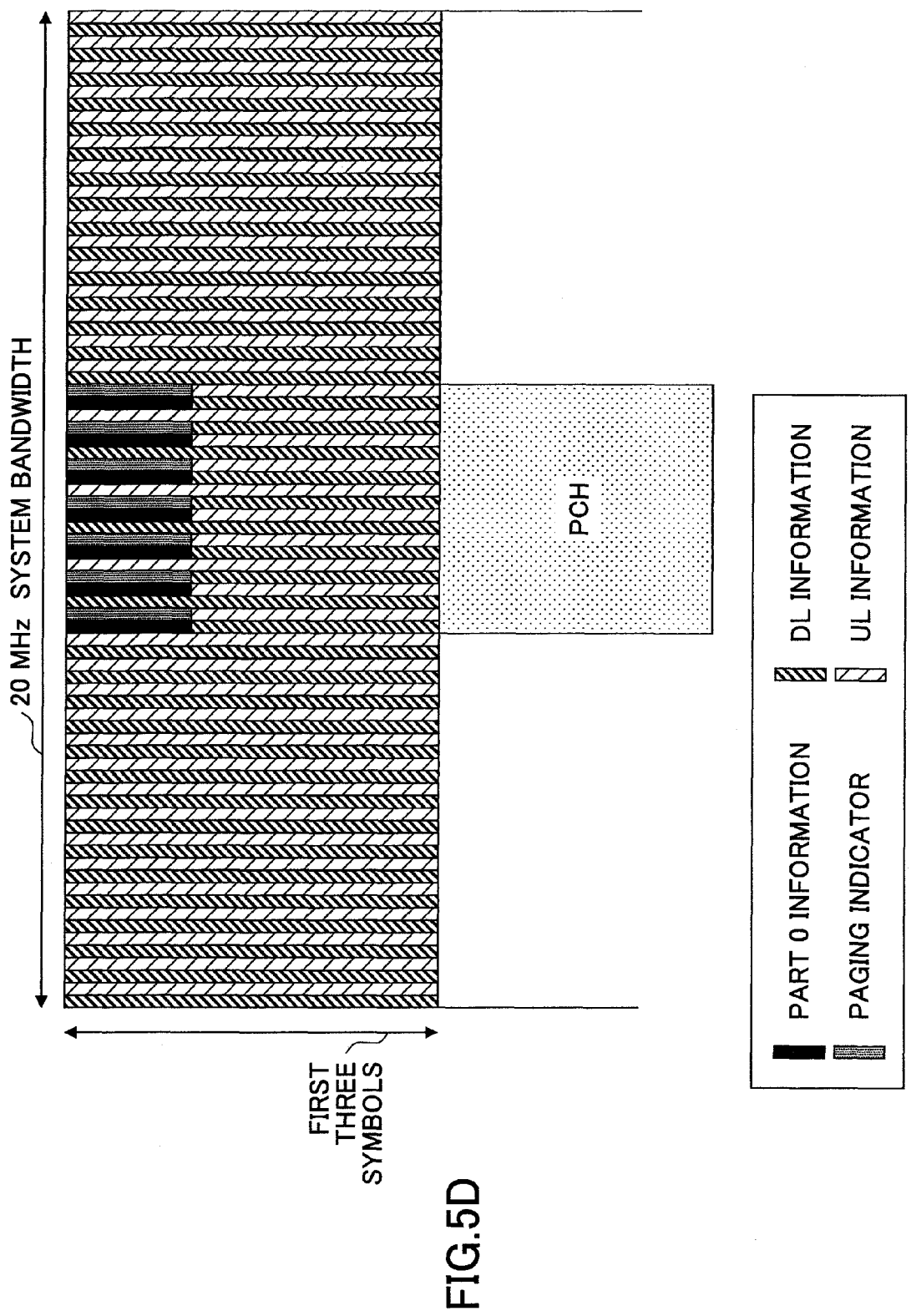
FIG. 5D is a drawing illustrating exemplary mapping of part 0 information and a paging indicator.

FIG. 5D illustrates a case where a paging indicator is transmitted according to the method (1). In the example shown in FIG. 5D, one subframe includes a predetermined number (e.g., 10) of temporally-consecutive OFDM symbols and first three symbols are assigned to common control information. Part 0 information and a paging indicator are mapped to frequency bands near the center frequency of the system frequency band according to distributed FDM. To other parts of the first three symbols, downlink (DL) control information and uplink (UL) control information are mapped according to distributed FDM. A paging channel (PCH) is time-division-multiplexed with the above control information. In this method, dedicated frequency bands are provided at regular or irregular intervals for the paging indicator.

In the method (2), the L1/L2 control channel includes multiple information units with a predetermined size. The number of information units is limited to the maximum number specified by broadcast information. Each of the information units normally contains control information for a selected user device such as user identification information (UE-ID) and resource allocation information. In this method, one or more of the information units are assigned to the paging indicator at regular or irregular intervals. In other words, the paging indicator is transmitted without using dedicated resources. In this case, however, it is necessary to appropriately distinguish an information unit containing the paging indicator from other information units containing control information for user devices. For this purpose, for example, identification information (PI-ID) unique to the paging indicator may be used. In this case, the PI-ID is reported to user devices, for example, by broadcast information.

The respective information units may have the same number of bits or different numbers of bits. For example, when the MCS is variable and determined for each user in the common control information as described later (when the MCS for the L1/L2 control channel is adjusted for each user), the number of bits of an information unit may vary depending on the MCS level.

FIG. 5E illustrates a case where information units are assigned to a paging indicator at regular or irregular intervals. When the user device decodes an information unit and detects a PI-ID, the user device processes the information unit as a paging indicator (the user device determines whether a group ID assigned to itself is present in the information unit and checks the PCH if the group ID is present). A paging indicator is preferably contained in the first information unit so that user devices can quickly determine whether incoming calls for them are present.

(Part 2a)

Part 2a includes resource allocation information for downlink data channels, an allocated time length, and MIMO information.

The resource allocation information for downlink data channels identifies resource blocks containing downlink data channels. For the identification of resource blocks, various methods, such as a bitmap scheme and a tree numbering scheme, known in the relevant technical field may be used.

The allocated time length indicates a period of time for which downlink data channels are transmitted continuously. The resource allocation can be changed as frequently as every TTI. However, to reduce the overhead, data channels may be transmitted according to the same resource allocation for plural TTIs.

The MIMO information is reported when a MIMO scheme is used for communications and indicates, for example, the number of antennas and the number of streams. The number of streams may also be called the number of information sequences. In the descriptions below, it is assumed that both of the number of antennas and the number of streams are "four". However, the number of antennas and the number of streams may take any appropriate value.

Although it is not essential, the whole or a part of 16-bit user identification information may also be included in part 2a.

(Part 2b)

Part 2b includes precoding information for a MIMO scheme, a transport format of a downlink data channel, hybrid automatic repeat request (HARQ) information, and CRC information.

The precoding information for a MIMO scheme indicates weighting factors applied to respective antennas. Directional characteristics of communication signals can be adjusted by adjusting the weighting factors (precoding vectors) to be applied to the respective antennas. At the receiving end (user device), channel estimation is preferably performed according to the directional characteristics.

Figure 5F:
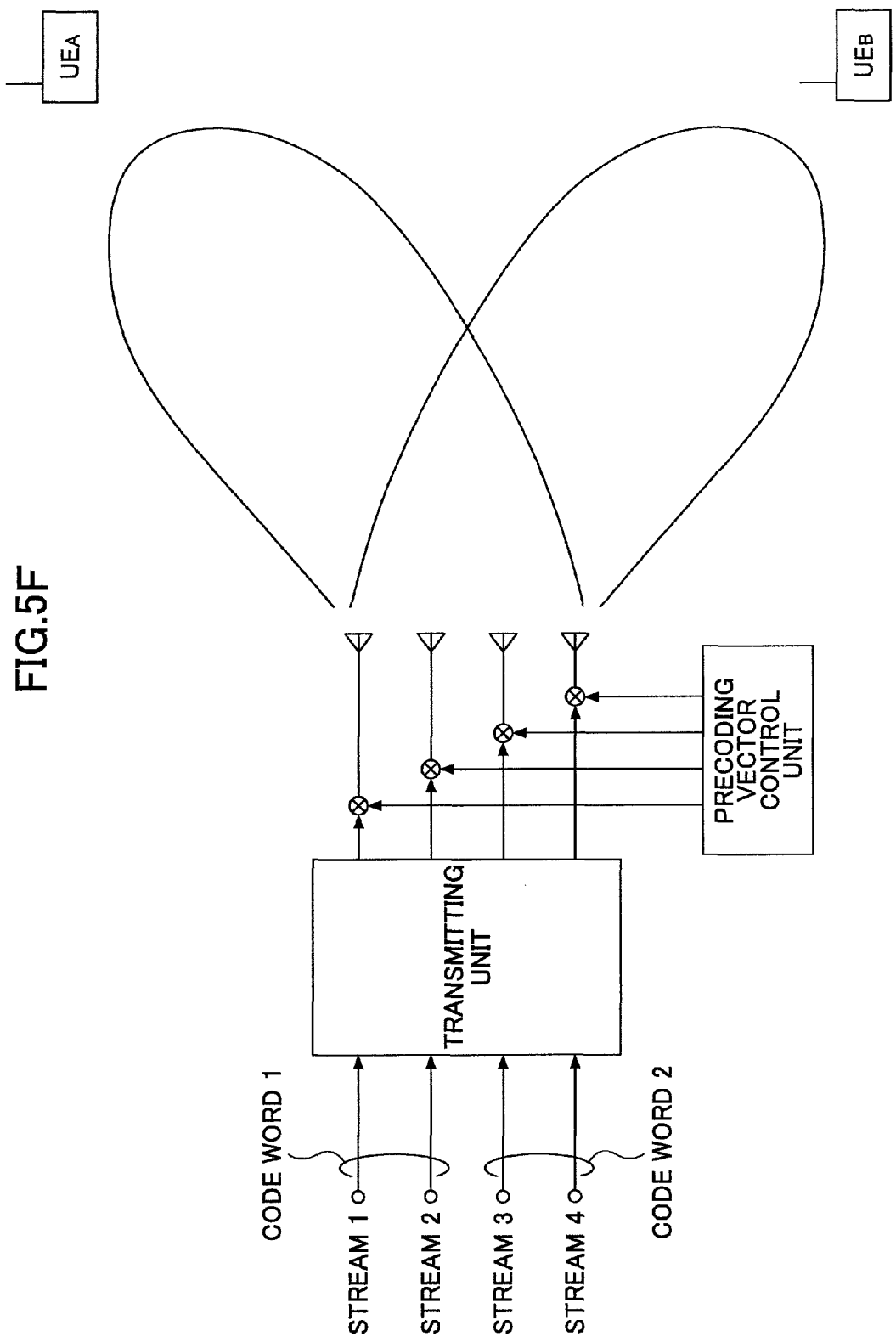
FIG. 5F is a drawing illustrating a case where preceding vectors $W_A$ and $W_B$ are determined such that two of four streams are directed to a user device A ($UE_A$) and the other two of the four streams are directed to a user device B ($UE_B$)

FIG. 5F is a drawing illustrating a case where precoding vectors $W_A$ and $W_B$ are determined such that streams 1 and 2 (a code word 1) of four streams are directed to a user device A ($UE_A$) and streams 3 and 4 (a code word 2) of the four streams are directed to a user device B ($UE_B$). A reference signal is transmitted in a non-directional manner. The precoding vectors $W_A$ and $W_B$, are reported to corresponding user devices A and B. The user device A receives the reference signal taking into account the weighting factor indicated by the precoding vector $W_A$ or applies the weighting factor to the reference signal after it is received. This configuration enables the user device A to appropriately perform channel estimation for a signal directed to itself. Similarly, the user device B receives the reference signal taking into account the weighting factor indicated by the precoding vector $W_B$ or applies the weighting factor to the reference signal after it is received. This configuration enables the user device B to appropriately perform channel estimation for a signal directed to itself.

The transport format of a downlink data channel is specified by a data modulation scheme and a channel coding rate. Since a channel coding rate can be uniquely determined based on a data modulation scheme and a data size, the data size or a payload size may be reported instead of the channel coding rate. For example, the transport format may be represented by 8 bits.

The hybrid automatic repeat request (HARQ) information includes information necessary for retransmission control of downlink packets. More specifically, the HARQ information includes a process number, redundancy version information indicating a packet combination scheme, and a new data indicator indicating whether a packet is a new packet or a retransmission packet. For example, the HARQ information may be represented by 6 bits.

The CRC information is reported when cyclic redundancy checking is employed for error detection and indicates CRC detection bits convolved with user identification information (UE-ID).

Information for uplink data transmission may be classified into part 1 through part 4. Basically, information for uplink data transmission is categorized as a general control channel. However, for communication terminals that are allocated resources for downlink data channels, the information for uplink data transmission may be transmitted as specific control channels.

(Part 1)

Part 1 includes delivery confirmation information for a previous uplink data channel. The delivery confirmation information indicates either acknowledge (ACK) indicating that no error is detected in a packet or a detected error is within an acceptable range, or negative acknowledge (NACK) indicating an error out of the acceptable range is detected in a packet. The delivery confirmation information may be represented by one bit.

(Part 2)

Part 2 includes resource allocation information for a future uplink data channel, and a transport format, transmission power information, and CRC information for the uplink data channel.

The resource allocation information identifies resource blocks usable for the transmission of the uplink data channel. For the identification of resource blocks, various methods, such as a bitmap scheme and a tree numbering scheme, known in the relevant technical field may be used.

The transport format of an uplink data channel is specified by a data modulation scheme and a channel coding rate. Since a channel coding rate can be uniquely determined based on a data modulation scheme and a data size, the data size or a payload size may be reported instead of the channel coding rate. For example, the transport format may be represented by 8 bits.

The transmission power information indicates a transmission power level to be used for the transmission of an uplink data channel. According to an embodiment of the present invention, an uplink pilot channel is repeatedly transmitted from each communication terminal to the base station at a comparatively short interval Tref of, for example, about several milliseconds. A transmission power level Pref of the uplink pilot channel is updated at an interval $T_{TPC}$, which is longer than or equal to the interval Tref, based on transmission power control information (TPC command) from the base station such that the transmission power level Pref becomes greater or less than the transmission power level of a previously-transmitted uplink pilot channel. An uplink L1/L2 control channel is transmitted with a transmission power level obtained by adding a first offset power level $\Delta_{L1L2}$ reported by the base station to the transmission power level Pref of the uplink pilot channel. An uplink data channel is transmitted with a transmission power level obtained by adding a second offset power level $\Delta_{data}$ reported by the base station to the transmission power level Pref of the uplink pilot channel. The second offset power level $\Delta_{data}$ for a data channel is included in the transmission power information of part 2. The first offset power level $\Delta_{L1L2}$ for an L1/L2 control channel is included in transmission power information of part 4 described later. The TPC command for updating the transmission power level of the pilot channel is also included in part 4.

The first offset power level $\Delta_{L1L2}$ may be either a fixed value or a variable. When the first offset power level $\Delta_{L1L2}$ is a variable, it may be reported to the user device as broadcast information (BCH) or layer 3 signaling information. The second offset power level $\Delta_{data}$ may be reported to the user device via an L1/L2 control signal. The first offset power level $\Delta_{L1L2}$ may be increased or decreased according to the amount of information in a control signal. Also, the first offset power level $\Delta_{L1L2}$ may be determined according to the reception quality of a control signal. The second offset power level $\Delta_{data}$ may be determined according to the reception quality of a data signal. An uplink data channel may be transmitted with a transmission power level that is less than the sum of the transmission power level Pref of the uplink pilot channel and the second offset power level $\Delta_{data}$ to comply with a request (overload indicator) to reduce power consumption which is sent from a cell around the serving cell of the communication terminal.

The CRC information is reported when cyclic redundancy checking is employed for error detection and indicates CRC detection bits convolved with user identification information (UE-ID). In a response signal (downlink L1/L2 control channel) to a random access channel (RACH), a random ID of the RACH preamble may be used as a UE-ID.

(Part 3)

Part 3 includes transmission timing control bits for uplink signals. The transmission timing control bits are used to synchronize communication terminals in a cell. The transmission timing control bits may be reported as specific control information when resource blocks are allocated to a downlink data channel or may be reported as general control information.

(Part 4)

Part 4 includes transmission power information indicating a transmission power level of a communication terminal. Specifically, the transmission power information indicates a transmission power level to be used by a communication terminal, which is not allocated resources for uplink data channel transmission, to transmit an uplink control channel to report a downlink CQI. The offset power level $\Delta_{L1L2}$ and the TPC command described above are included in part 4.

Figure 4B:
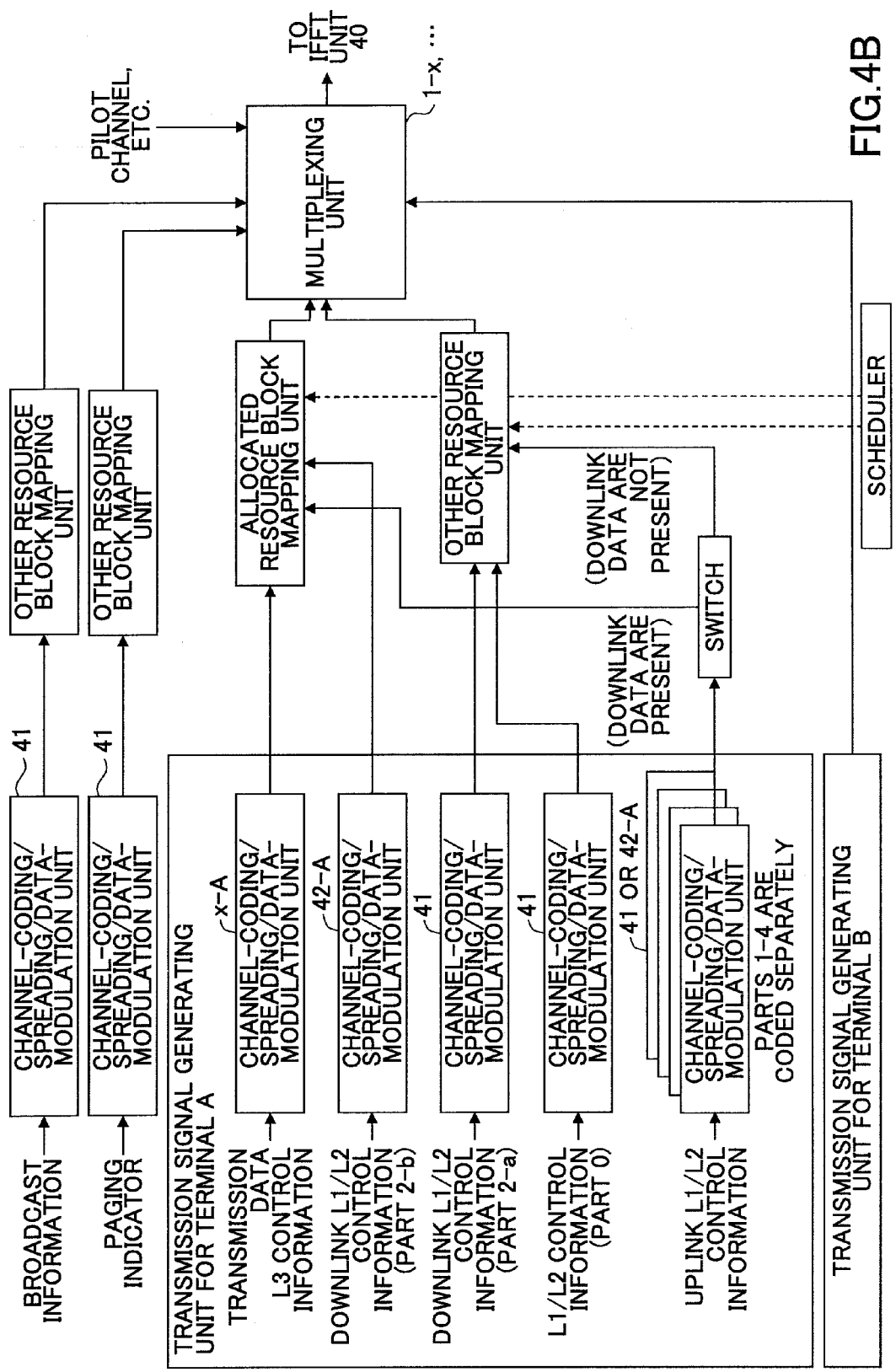
FIG. 4B is a drawing illustrating signal processing components for one frequency block.

FIG. 4B, like FIG. 4A, shows signal processing components for one frequency block. FIG. 4B is different from FIG. 4A in that examples of control information are provided. In FIG. 4B, the same reference numbers are used for components corresponding to those in FIG. 4A. "Allocated resource block mapping" in FIG. 4B indicates that channels are mapped to one or more resource blocks allocated to a selected communication terminal. "Other resource block mapping" indicates that channels are mapped to resource blocks across the entire frequency block. Part 0 of the L1/L2 control channel is transmitted as a general control channel using the entire frequency block. Information regarding uplink data transmission (parts 1 through 4) in the L1/L2 control channel is transmitted as a specific control channel using resources allocated for a downlink data channel if available or transmitted as a general control channel using the entire frequency block if no resource is allocated for a downlink data channel.

Figure 4C:
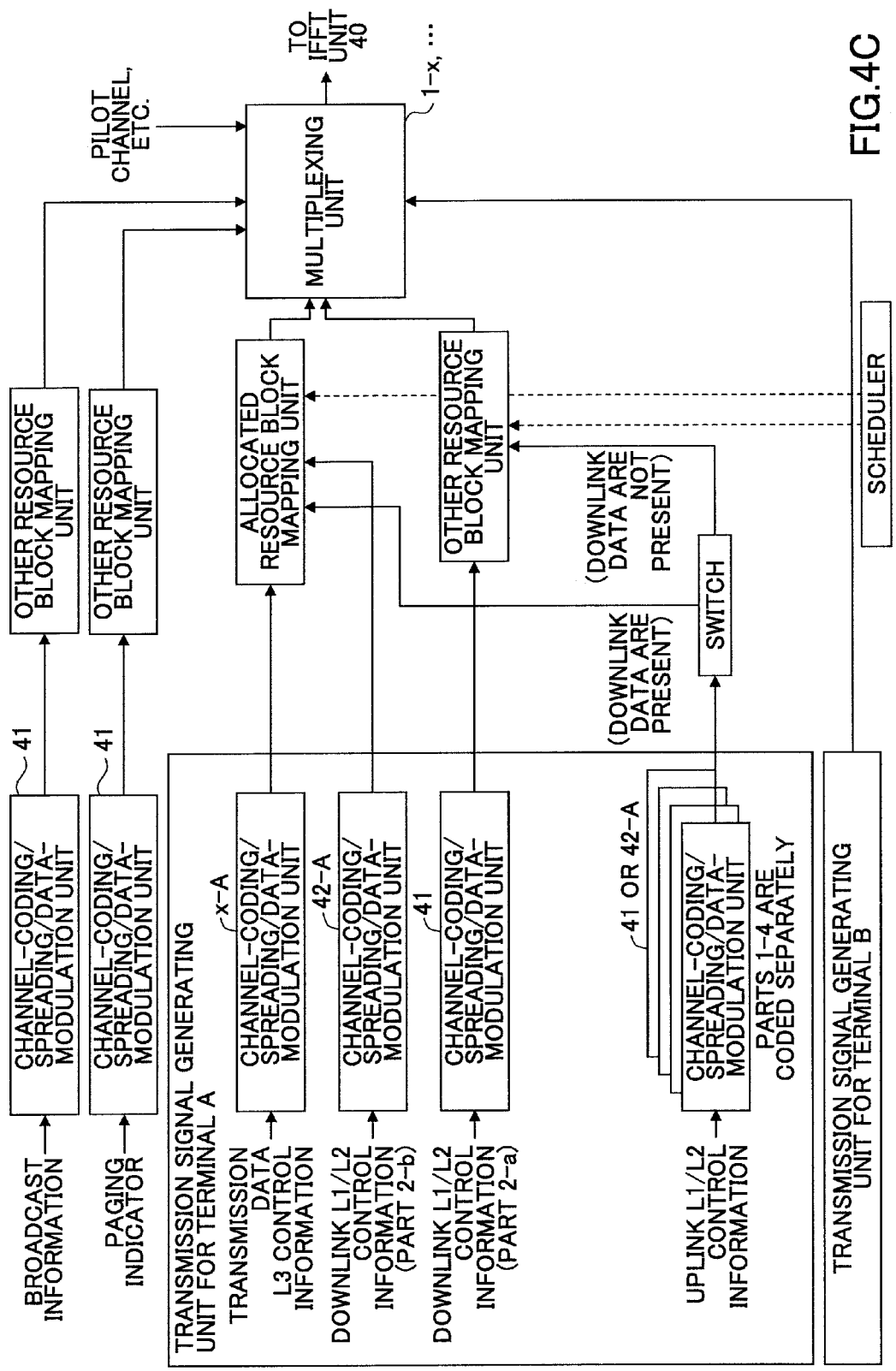
FIG. 4C is a drawing illustrating signal processing components for one frequency block.

FIG. 4C is different from FIG. 4B in that part 0 of the L1/L2 control channel is transmitted as broadcast information.

FIG. 7A is a drawing illustrating exemplary mapping of data channels and control channels. This example shows mapping of channels within one frequency block and one subframe and roughly corresponds to an output from the first multiplexing unit 1-$x$ (except that channels such as a pilot channel are multiplexed by the third multiplexing unit 38). One subframe may correspond to one transmission time interval (TTI) or to multiple TTIs. In this example, a frequency block includes seven resource blocks RB1 through RB7. The seven resource blocks are allocated to terminals with good channel conditions by the frequency scheduling unit 32 shown in FIG. 3A.

Normally, a general control channel, a pilot channel, and data channels are time-division-multiplexed. The general control channel (including part 0 of the L1/L2 control channel) is mapped to frequency components distributed across the entire frequency block. In other words, the general control channel is distributed across a frequency band composed of seven resource blocks. In FIG. 7A, the general control channel (including part 0 of the L1/L2 control channel) and other control channels (excluding specific control channels) are frequency-division-multiplexed. The other control channels may include a synchronization channel (such distinction of channels are not essential for the present invention and a synchronization channel may be included in the general control channel). Part 0 of the L1/L2 control channel is preferably mapped to the first OFDM symbol to reduce delay time. In the example shown in FIG. 7A, the general control channel and the other control channels are frequency-division-multiplexed such that each of the channels is mapped to multiple frequency components arranged at intervals. Such a multiplexing scheme is called distributed frequency division multiplexing (FDM). Distributed FDM is preferable to achieve frequency diversity gain. The frequency components allocated to the respective channels may be arranged at the same intervals or at different intervals. In either case, it is necessary to distribute the general control channel across all resource blocks (in this embodiment, the entire frequency block). CDM may also be used as an additional multiplexing scheme to cope with the increase in the number of multiplexed users. CDM makes it possible to further increase the frequency diversity gain. On the other hand, however, CDM may disrupt the orthogonality and reduce the reception quality.

In this example, the pilot channel is also mapped to frequency components distributed across the entire frequency block. Mapping a pilot channel to a wide frequency range as shown in FIG. 7A is preferable to accurately perform channel estimation for various frequency components.

In FIG. 7A, resource blocks RB1, RB2, and RB4 are allocated to user 1 (UE1), resource blocks RB3, RB5, and RB6 are allocated to user 2 (UE2), and resource block RB7 is allocated to user 3 (UE3). As described above, resource block allocation information is included in the general control channel. A specific control channel for user 1 is mapped to the beginning of resource block RB1 allocated to user 1. A specific control channel for user 2 is mapped to the beginning of resource block RB3 allocated to user 2. A specific control channel for user 3 is mapped to the beginning of resource block RB7 allocated to user 3. Note that, in FIG. 7A, the sizes of the portions occupied by the respective specific control channels of users 1, 2, and are not equal. This indicates that the amount of information of the specific control channel may vary depending on the user. The specific control channel is mapped locally to resources within a resource block allocated to a data channel. In contrast with distributed FDM where a channel is mapped to frequency components distributed across multiple resource blocks, this mapping scheme is called localized frequency division multiplexing (FDM).

FIG. 7B shows another exemplary mapping of specific control channels. In FIG. 7A, the specific control channel for user 1 (UE1) is mapped only to resource block RB1. In FIG. 7B, the specific control channel for user 1 is mapped to resources discretely distributed across resource blocks RB1, RB2, and RB4 (across all the resource blocks allocated to user 1) by distributed FDM. The specific control channel for user 2 (UE2) is also mapped to frequency components distributed across resource blocks RB3, RB5, and RB6 in a manner different from that shown in FIG. 7A. The specific control channel and the shared data channel of user 2 are time-division-multiplexed. Thus, a specific control channel and a shared data channel of a user may be multiplexed in the whole or a part of one or more resource blocks allocated to the user by time division multiplexing and/or frequency division multiplexing (localized FDM or distributed FDM). Mapping a specific control channel to frequency components distributed across two or more resource blocks makes it possible to achieve frequency diversity gain also for the specific control channel and thereby to improve the reception quality of the specific control channel.

Exemplary formats of part 0 information of the L1L2 control channel are described below.

FIG. 7C shows exemplary formats of the L1/L2 control channel. In FIG. 7C, four exemplary formats of the L1/L2 control channel are provided. The number of symbols (or the number of multiplexed users) of the L1/L2 control channel differs from format to format. Information indicating which one of the four formats is used is reported by the part 0 information. When modulation and coding schemes (MCS) reported by a broadcast channel to communication terminals are used for the L1/L2 control channel, the number of symbols necessary for the L1/L2 control channel varies depending on the number of multiplexed users and the MCS level. To report the number of symbols, control bits (two bits in FIG. 7C) are provided as part 0 information of the L1/L2 control channel. For example, when control bits 00 are reported as part 0 information, the communication terminal decodes the control bits and determines that the number of symbols of the L1/L2 control channel is 100. In FIG. 7C, the first two bits of each format corresponds to part 0 and a control channel with a variable length corresponds to the general control channel (part 1 and part 2a for downlink). Instead of reporting the MCS via a broadcast channel as in FIG. 7C, the MCS may be reported via an L3 signaling channel.

FIG. 7D is a drawing illustrating an exemplary format of the L1/L2 control channel in a case where the number of multiplexed users is reported for each MCS using part 0. In a case where an appropriate MCS is selected from predetermined MCSs according to the reception quality of each communication terminal, the number of symbols necessary for the L1/L2 control channel varies depending on the reception quality of the communication terminal. To identify the reception quality, control bits (8 bits in FIG. 7D) are provided as part 0 information of the L1/L2 control channel. In FIG. 7D, it is assumed that four types of MCSs are provided and the maximum number of multiplexed users is three. The number of multiplexed users 0 to 3 can be represented by two bits (00=0 users, 01=1 user, 10=2 users, and 11=3 users). In this case, since two bits are necessary for each MCS, a total of 8 bits are necessary for part 0. For example, when control bits 01100001 are reported as part 0 information, each communication terminal determines control information (e.g., part 2a for downlink) corresponding to its reception quality based on the control bits. In the example shown in FIG. 7D, 01100001 indicates numbers of multiplexed users 1, 2, 0, and 1. In other words, assuming that the reception quality is expressed by four levels (lowest, low, middle, and high), 01100001 indicates reception quality levels of low, middle, lowest, and high, and MCSs corresponding to the reception quality levels are selected (a higher MCS level is selected and the number of multiplexed users increases as the reception quality level increases).

Figure 7E:
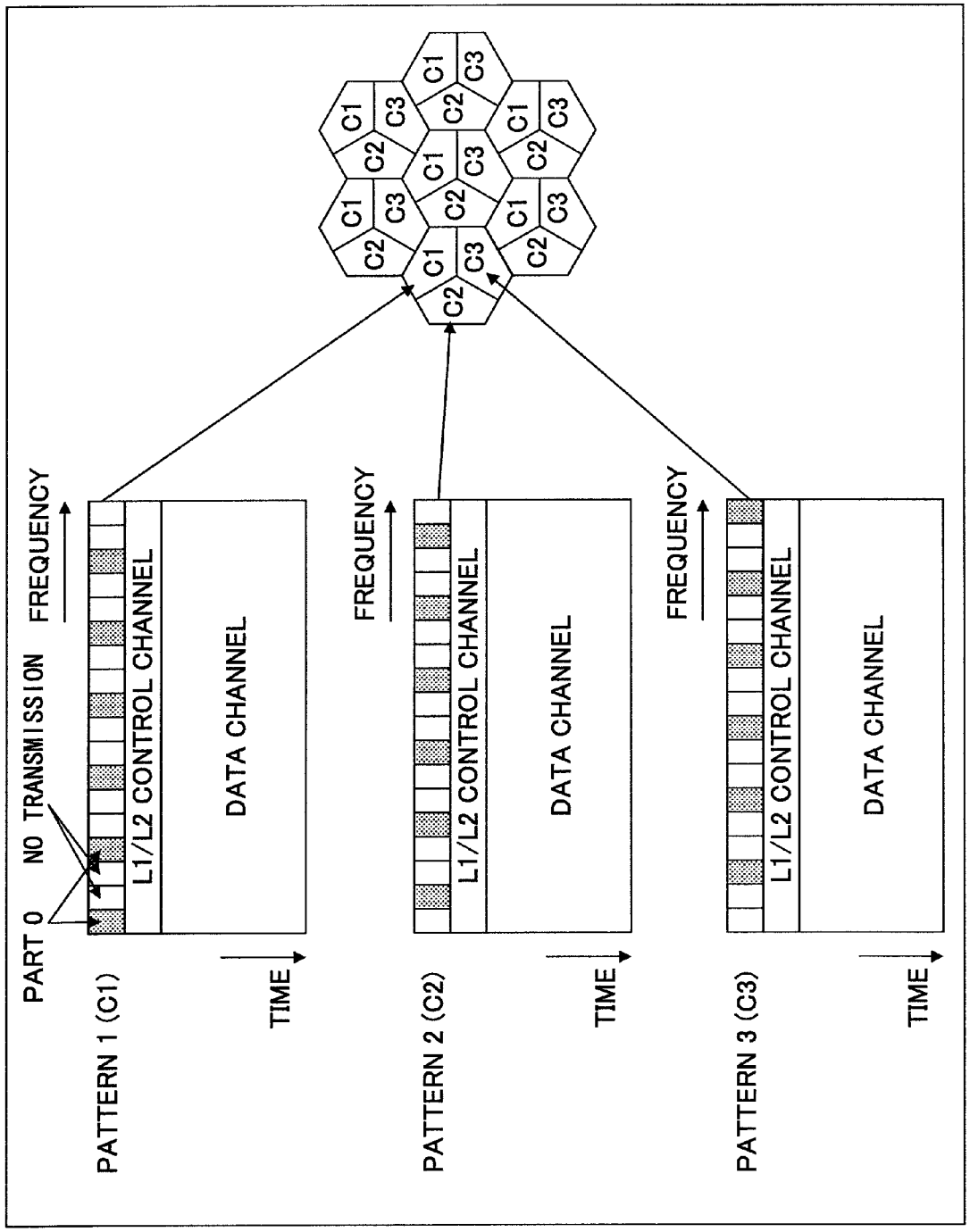
FIG. 7E is a drawing illustrating exemplary mapping of part 0 of an L1/L2 control channel in a three-sector configuration.

FIG. 7E shows exemplary mapping of information bits (part 0) of the L1/L2 control channel in a three-sector configuration. In a three-sector configuration, three mapping patterns may be provided to transmit information bits (part 0) indicating transport formats of the L1/L2 control channel, and the mapping patterns may be assigned to the respective sectors such that those patterns do not overlap with each other in the frequency domain. Selecting different mapping patterns for adjacent sectors (or cells) makes it possible to achieve interference coordination.

Figure 7F:
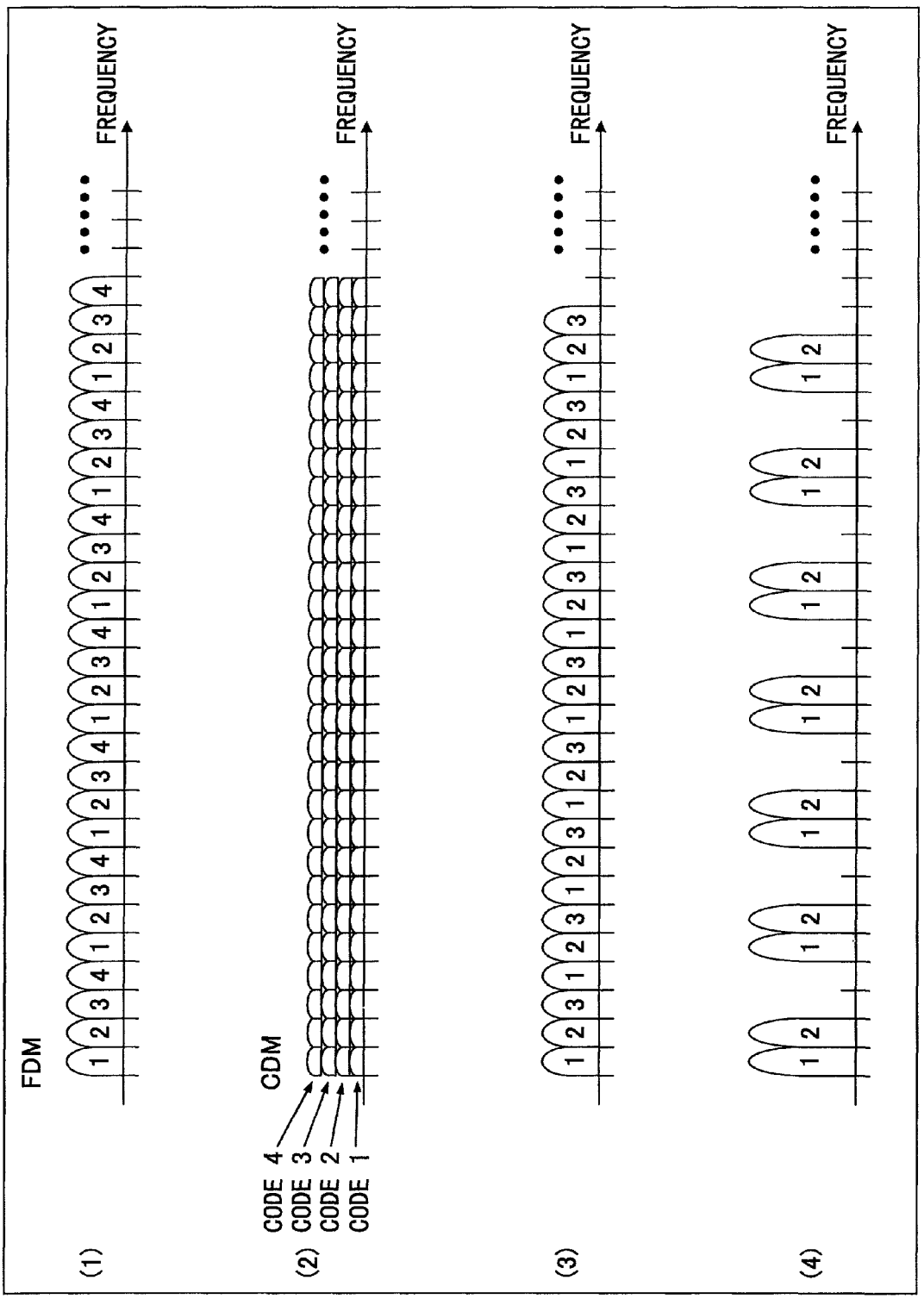
FIG. 7F is a drawing illustrating exemplary multiplexing schemes for general control channels.

FIG. 7F shows exemplary multiplexing schemes. In the above example, various general control channels are multiplexed by distributed FDM. However, any appropriate multiplexing scheme such as code division multiplexing (CDM) or time division multiplexing (TDM) may be used. FIG. 7F (1) shows an example of distributed FDM. In FIG. 7F (1), discrete frequency components identified by numbers 1, 2, 3, and 4 are used to properly orthogonalize user signals. Discrete frequency components may be arranged at regular intervals as exemplified or at irregular intervals. Also, different arrangement rules may be used for adjacent cells to randomize the interference when transmission power control is performed. FIG. 7F (2) shows an example of code division multiplexing (CDM). In FIG. 7F (2), codes 1, 2, 3, and 4 are used to properly orthogonalize user signals. CDM makes it possible to effectively reduce other cell interference. FIG. 7F (3) shows an example of distributed FDM where the number of multiplexed users is three. In FIG. 7F (3), discrete frequency components are redefined by numbers 1, 2, and 3 to properly orthogonalize user signals. If the number of multiplexed users is less than the maximum number, the base station may be configured to increase the transmission power of downlink control channels as shown in FIG. 7F (4). This method is preferable to increase the received signal quality, but may increase the other cell interference if transmission is performed at a cell edge. A hybrid multiplexing scheme of CDM and FDM may also be used.

Meanwhile, for transmission of the part 0 information, both of the MCS (a combination of a modulation scheme and a channel coding rate) and the transmission power level may be fixed, or only the MCS may be fixed while the transmission power is varied. Also, the same part 0 information may be used for all users in a cell or the transport format of the L1/L2 control channel may be changed from user to user. For example, a transport format for users located near the base station may be optimized by appropriately changing the part 0 information and a fixed transport format may be used for users located near the cell edge. In this case, it is necessary to send information indicating whether users belong to a cell edge group to the users via, for example, a downlink L1/L2 control channel. For a user not belonging to the cell edge group, a transport format changed at intervals (e.g., every TTI) is reported by the part 0 information; and for a user belonging to the cell edge group, a fixed transport format is used to send the L1/L2 control information.

Figure 7G:
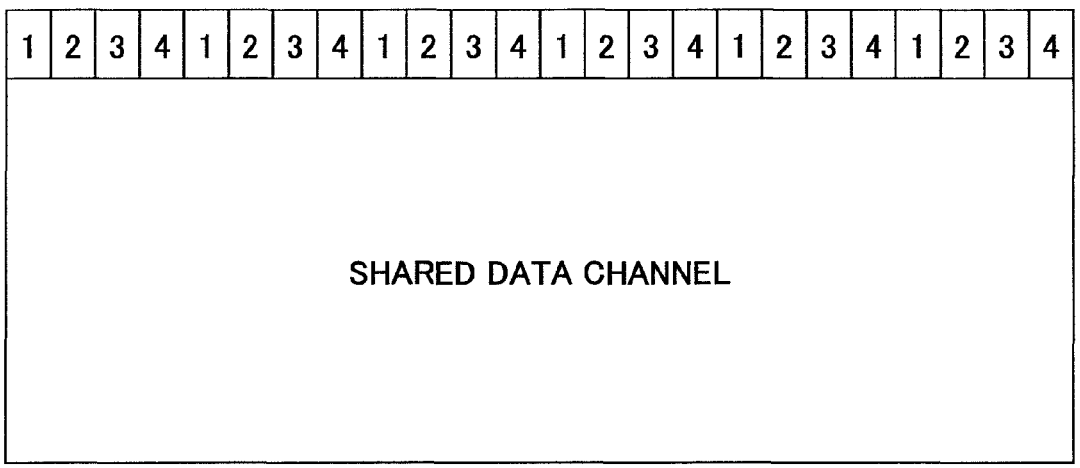
FIG. 7G is a drawing illustrating exemplary mapping of common control information for users other than cell-edge users.
Figure 7H:
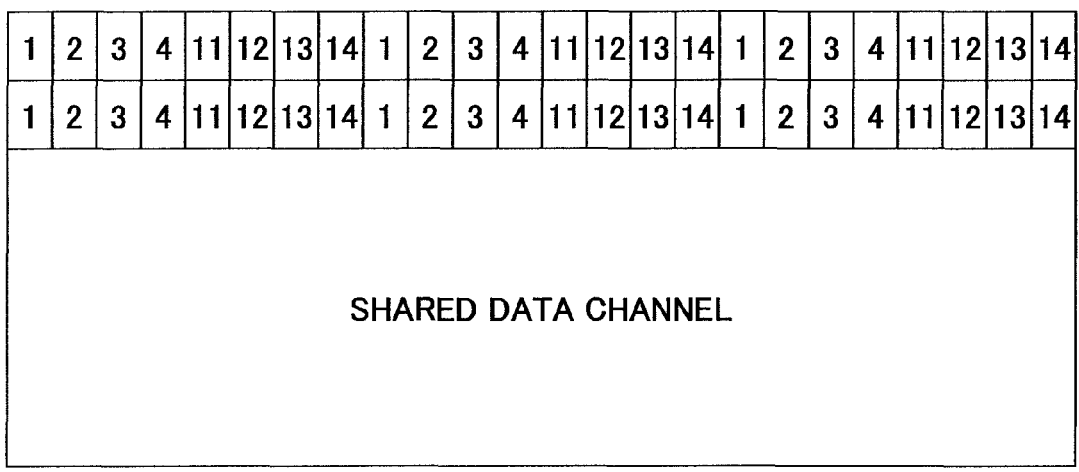
FIG. 7H is a drawing illustrating exemplary mapping of common control information for users including cell-edge users.

FIG. 7G shows exemplary mapping of the L1/L2 control channel in a case where only users 1 through 4 located near the base station are in the cell. Numbers in FIG. 7G correspond to the respective users. For example, "1" corresponds to user 1. In this case, a transport format is reported, for example, for each TTI to users 1 through 4 by the part 0 information. FIG. 7H shows exemplary mapping of the L1/L2 control channel in a case where users 1 through 4 located near the base station and users 11 through 14 located at the cell edge are in the cell. A predetermined transport format is used for users 11 through 14, and the transport format is not explicitly reported to users 11 through 14. Meanwhile, a transport format that is the same as the predetermined transport format is reported to users 1 through 4 by the part 0 information.

Here, the part 0 information may be transmitted every TTI as a part of the L1/L2 control channel as described above or may be transmitted at a predetermined interval longer than the TTI, e.g., every 10 ms, as a part of the L1/L2 control channel.

Figure 7I:
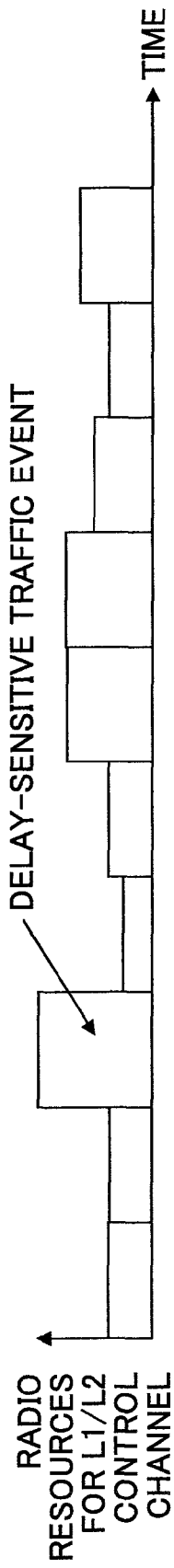
FIG. 7I is a drawing illustrating a method of reporting part 0 information.

When the part 0 information is transmitted every TTI as a part of the L1/L2 control channel, radio resources for the L1/L2 control channel can be adjusted every TTI as shown in FIG. 7I. This method makes it possible to smoothly transmit the L1/L2 control channel even when there are multiple delay-sensitive traffic events. In FIG. 7I, the horizontal axis indicates time and the vertical axis indicates radio resources for the L1/L2 control channel.

Meanwhile, the part 0 information may be transmitted at a predetermined interval (control interval) longer than the TTI as a part of the L1/L2 control channel as shown in FIG. 7J. With this method, since it is not necessary to transmit the part 0 information every TTI, it is possible to reduce the overhead and increase the transmission efficiency. However, with this method, since radio resources for the L1/L2 control channel can be adjusted only at the predetermined interval, delay may be caused when, for example, multiple delay-sensitive traffic events occur.

For this reason, if a transmission timing of a channel that requires much of the radio resources of the L1/L2 control channel, e.g., a channel that is control information that must always be allocated radio resources and that must be correctly decoded even by a cell-edge user, is known, an amount of radio resources greater than normal is allocated to the corresponding TTI beforehand. Examples of such a channel include a broadcast channel, a paging channel, and a RACH response.

Figure 7K:
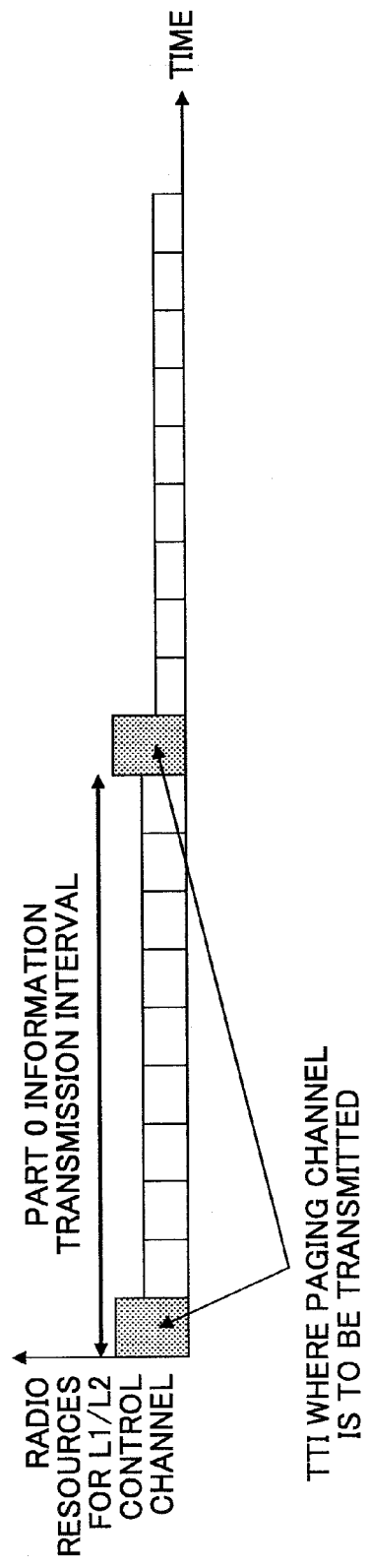
FIG. 7K is a drawing illustrating a method of reporting part 0 information.
Figure 7L:
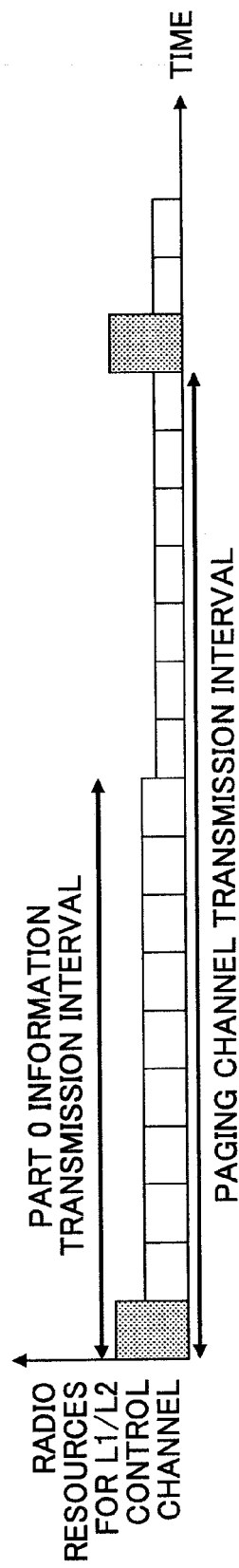
FIG. 7L is a drawing illustrating a method of reporting part 0 information.

For example, as shown in FIG. 7K, if a TTI where a paging channel, which is control information that must always be allocated radio resources and that must be correctly decoded even by a cell-edge user, is to be transmitted is known, the L1/L2 control channel including the part 0 information is transmitted in or before the TTI. FIG. 7K shows a case where the transmission timing (TTI) of the L1/L2 control channel including the part 0 information and the transmission timing (TTI) of the paging channel are the same. FIG. 7L shows a case where the transmission timing (TTI) of the L1/L2 control channel including the part 0 information and the transmission timing (TTI) of the paging channel are different. In this case, the L1/L2 control channel including the part 0 information is transmitted in or before the TTI where the paging channel is to be transmitted.

Meanwhile, the L1/L2 control channel is mapped within first three OFDM symbols in a TTI. Here, the L1/L2 control channel may be mapped such that each user is multiplexed across all the first three OFDM symbols. For example, as shown in FIG. 7M, L1/L2 control channels of users 1 through 6 may be mapped such that each of users 1 through 6 is multiplexed across all the first three OFDM symbols. In this example, when the number of users is 5 or 6, the L1/L2 control channel of each user is mapped across all the first three OFDM symbols. This method makes it easier to share transmission power according to the reception quality levels. With this method, however, since the arrangement (mapping) of the L1/L2 control channels varies depending on the number of users, demodulation of the part 0 information is essential for the demodulation of the L1/L2 control information.

Figure 7N:
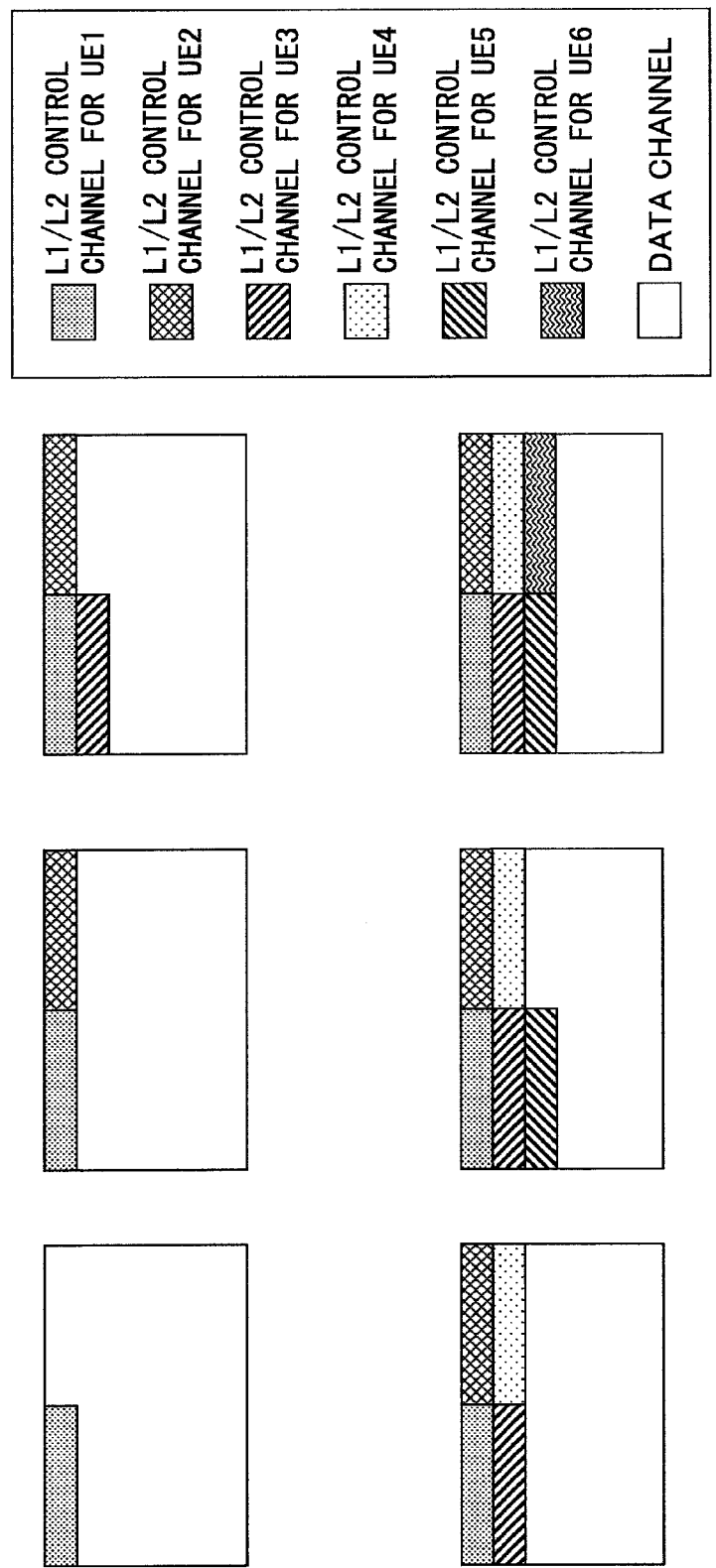
FIG. 7N is a drawing illustrating a method of mapping L1/L2 control channels for multiple users.
Figure 70:
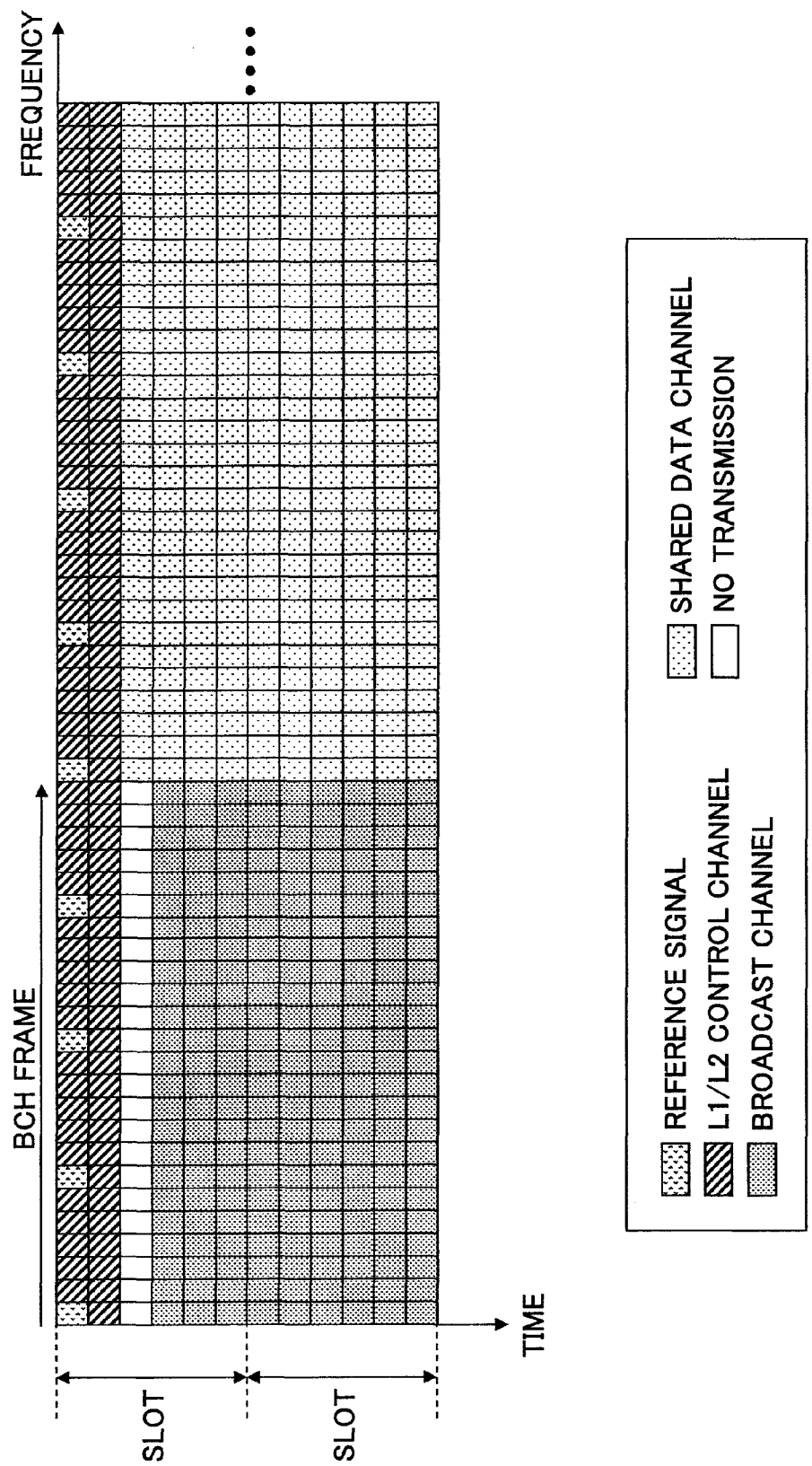

To enable demodulation of the L1/L2 control information without the demodulation of the part 0 information, each user may be mapped to one OFDM symbol. FIG. 7N shows an example where each user is mapped to one OFDM symbol. With the arrangement of L1/L2 control channels as shown in FIG. 7N, mapping locations of the L1/L2 control channels of the respective users do not change even when the number of users increases. Therefore, this method enables the user to demodulate the L1/L2 control channel even when the number of multiplexed users is unknown. In this case, however, transmission power can be shared between users multiplexed in the same symbol.

The broadcast channel is the first channel to be transmitted to the mobile terminal after a cell search. Therefore, the mobile terminal cannot determine the amount of radio resources of the L1/L2 control channel in advance. For this reason, the transmission start timing of the broadcast channel may be fixed. For example, as shown in FIG. 7O, the broadcast channel may be mapped to the fourth and later OFDM symbols, i.e., OFDM symbols following the first three OFDM symbols where the L1/L2 control channel is mapped. In this case, as a radio resource control method for the L1/L2 control channel for controlling other channels multiplexed in the same TTI, the transmission of the other channels may be started at the same start timing as that of the broadcast channel. Alternatively, the other channels may be controlled based on the part 0 information.

When transmission of the other channels is started at the same start timing as that of the broadcast channel, the start timing is always fixed. In this case, for example, the other channels may be mapped to the fourth and later OFDM symbols, i.e., OFDM symbols following the first three OFDM symbols where the L1/L2 control channel is mapped. Meanwhile, when the other channels are controlled based on the part 0 information and the L1/L2 control channel is mapped within the first two OFDM symbols, the other channels may be mapped to the third and later OFDM symbols as shown in FIG. 7O.

When a mobile terminal employs an intermittent reception scheme, it is difficult for the mobile terminal to determine the boundary between the L1/L2 control channel and the shared data channel. In such a case, the shared data channel may be always mapped to the fourth and later OFDM symbols.

Figure 8A:
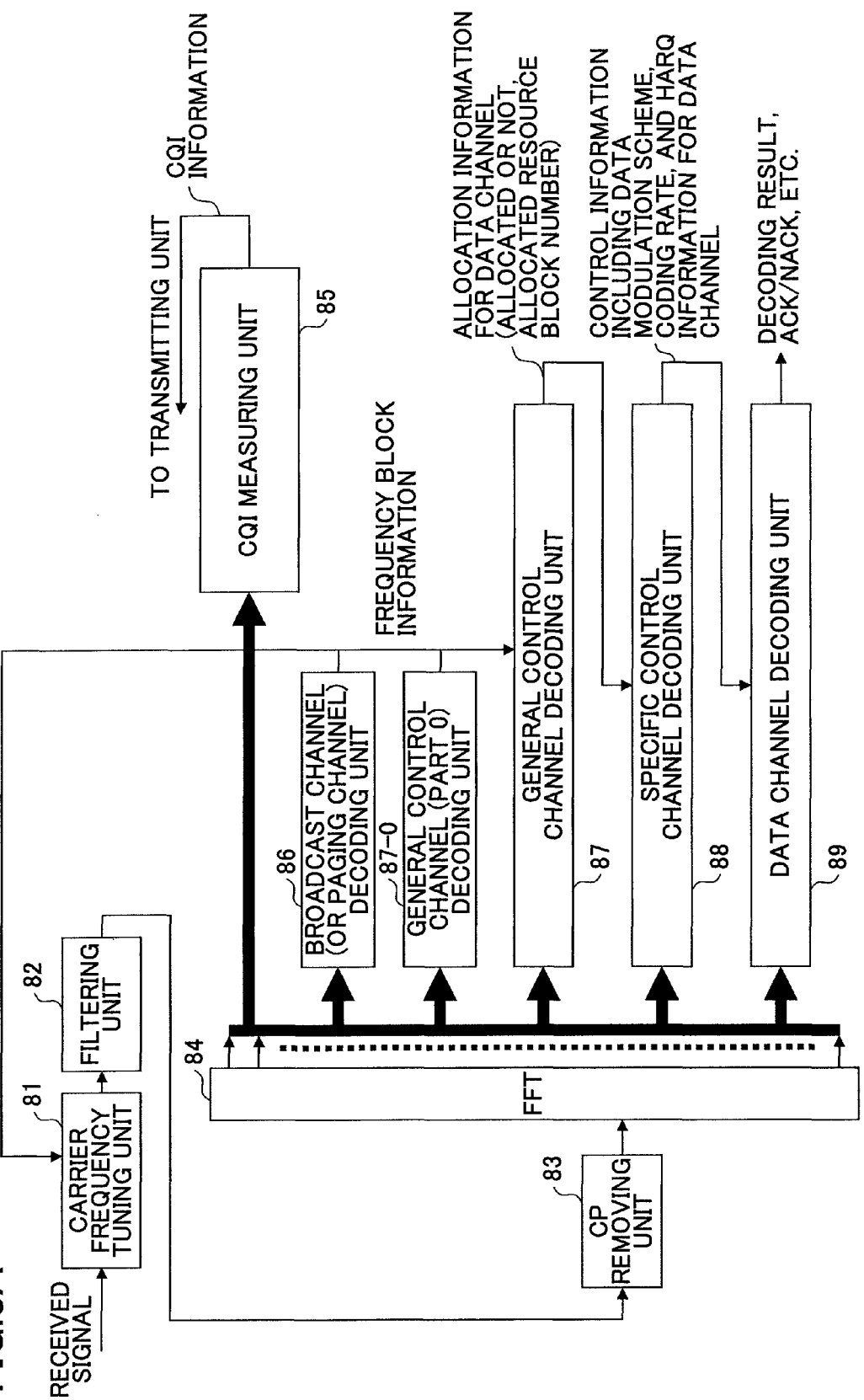
FIG. 8A is a partial block diagram of a mobile terminal according to an embodiment of the present invention.

FIG. 8A is a partial block diagram of a mobile terminal according to an embodiment of the present invention. The mobile terminal shown in FIG. 8A includes a carrier frequency tuning unit 81, a filtering unit 82, a cyclic prefix (CP) removing unit 83, a fast Fourier transform unit (FFT) 84, a CQI measuring unit 85, a broadcast channel (or paging channel) decoding unit 86, a general control channel (part 0) decoding unit 87-0, a general control channel decoding unit 87, a specific control channel decoding unit 88, and a data channel decoding unit 89.

The carrier frequency tuning unit 81 appropriately adjusts the center frequency of the reception band so as to be able to receive a signal in a frequency block allocated to the terminal.

The filtering unit 82 filters the received signal.

The cyclic prefix removing unit 83 removes guard intervals from the received signal and thereby extracts effective symbols from received symbols.

The fast Fourier transform unit (FFT) 84 fast-Fourier-transforms information in the effective symbols and demodulates the information according to OFDM.

The CQI measuring unit 85 measures the received power level of a pilot channel in the received signal and feeds back the measurement as a channel quality indicator (CQI) to the base station. The CQI is measured for each resource block in the frequency block and all measured CQIs are reported to the base station.

The broadcast channel (or paging channel) decoding unit 86 decodes a broadcast channel. The broadcast channel decoding unit 86 also decodes a paging channel if it is included.

The general control channel (part 0) decoding unit 87-0 decodes part 0 information in an L1/L2 control channel. Part 0 indicates the transport format of a general control channel.

The general control channel decoding unit 87 decodes a general control channel in the received signal and thereby extracts scheduling information. The scheduling information includes information indicating whether resource blocks are allocated to a shared data channel for the terminal and if resource blocks are allocated, also includes information indicating the corresponding resource block numbers.

The specific control channel decoding unit 88 decodes a specific control channel in the received signal. The specific control channel includes a data modulation scheme, a channel coding rate, and HARQ information for the shared data channel.

The data channel decoding unit 89 decodes the shared data channel in the received signal based on information extracted from the specific control channel. The terminal may be configured to report acknowledge (ACK) or negative acknowledge (NACK) to the base station according to the result of decoding.

FIG. 8B is also a partial block diagram of the mobile terminal of this embodiment. FIG. 8B is different from FIG. 8A in that examples of control information are provided. In FIG. 8B, the same reference numbers are used for components corresponding to those in FIG. 8A. "Allocated resource block demapping" in FIG. 8B indicates that information mapped to one or more resource blocks allocated to the terminal is extracted. "Other resource block demapping" indicates that information mapped to resource blocks distributed across the entire frequency block is extracted.

FIG. 8C shows components related to a receiving unit of the mobile terminal shown in FIG. 8A. In this embodiment, it is assumed that the mobile terminal performs antenna diversity reception using two antennas, although this feature is not essential for the present invention. Downlink signals received by the two antennas are input to RF reception circuits 81 and 82. Cyclic prefix removing units 83 remove guard intervals (cyclic prefixes) from the signals, and fast Fourier transform (FFT) units 84 fast-Fourier-transform the signals. Then, the signals are combined by an antenna diversity combining unit. The combined signal is input to the respective decoding units shown in FIG. 8A or to a separating unit shown in FIG. 8B.

The mobile terminal may be configured to perform reception processing only at selected reception timings while there are no reception data to reduce the energy consumed by the receiver. This function is also employed, for example, in W-CDMA.

Figure 8D:
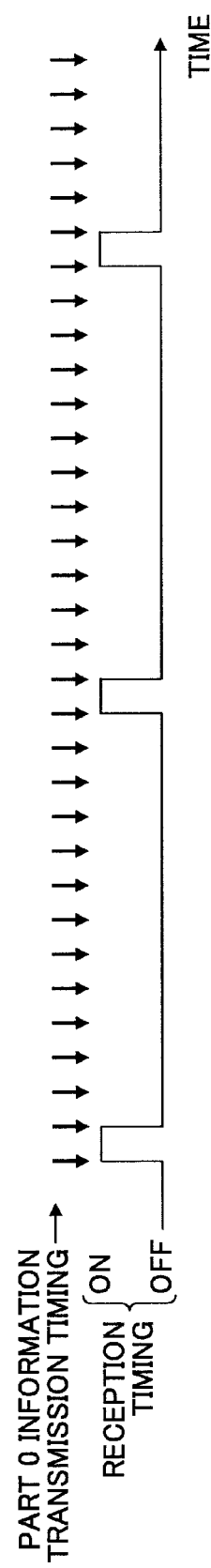
FIG. 8D is a timing chart showing part 0 information transmission timings and reception timings.

When the L1/L2 control channel including the part 0 information is transmitted from the base station every TTI, the mobile terminal decodes the part 0 information at the reception timings as shown in FIG. 8D to determine the amount of radio resources of the L1/L2 control channel.

Figure 8E:
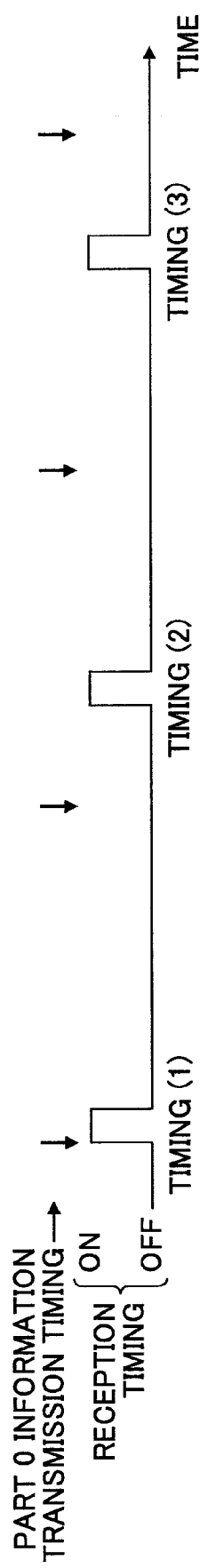
FIG. 8E is a timing chart showing part 0 information transmission timings and reception timings.

Meanwhile, when the part 0 information is transmitted from the base station at a predetermined interval longer than the TTI as a part of the L1/L2 control channel, the reception timings of the mobile terminal may not match the transmission timings of the L1/L2 control channel including the part 0 information. In other words, TTIs where the mobile terminal performs reception processing may not match TTIs where the base station transmits the L1/L2 control channel including the part 0 information. In this case, as shown in FIG. 8E, the mobile terminal can determine the amount of radio resources of the L1/L2 control channel at timing (1) when the reception processing by the mobile terminal and the transmission of the part 0 information by the base station coincide. However, the mobile terminal cannot determine the amount of radio resources of the L1/L2 control channel at timings (2) and (3) when the reception processing by the mobile terminal and the transmission of the part 0 information by the base station do not coincide.

To prevent this problem, the mobile station may be configured to perform reception processing in TTIs where the L1/L2 control channel including the part 0 information is transmitted. The timings when the L1/L2 control channel including the part 0 information is transmitted is reported from the base station to the mobile terminal, for example, via a broadcast channel.

FIG. 9A is a flowchart showing an exemplary process according to an embodiment of the present invention. In the descriptions below, it is assumed that a user carrying a mobile terminal UE1 supporting a 10 MHz bandwidth has entered a cell or a sector using a 20 MHz bandwidth for communications. It is also assumed that the minimum frequency band of the communication system is 5 MHz and the entire system frequency band is divided into four frequency blocks 1 through 4 as shown in FIG. 2.

In step S11, the terminal UE1 receives a broadcast channel from the base station and determines frequency blocks that the terminal UE1 is allowed to use. The broadcast channel is, for example, transmitted using a 5 MHz band including the center frequency of the 20 MHz band. This enables terminals supporting different bandwidths to easily receive the broadcast channel. For example, the base station allows a user communicating with a 10 MHz bandwidth to use a combination of two adjacent frequency blocks, i.e., frequency blocks 1 and 2, 2 and 3, or 3 and 4. The base station may allow the user to use any one or a specific one of the combinations. In this example, it is assumed that the terminal UE1 is allowed to use frequency blocks 2 and 3.

In step S12, the terminal UE1 receives a downlink pilot channel and measures the received signal quality for respective frequency blocks 2 and 3. The received signal quality is measured for each resource block in the respective frequency blocks and all measurements are reported as channel quality indicators (CQIs) to the base station.

In step S21, the base station performs frequency scheduling for each frequency block based on CQIs reported by the terminal UE1 and other terminals. In this example, a data channel for the terminal UE1 is transmitted using frequency blocks 2 and 3. This information is being managed by the frequency block allocation control unit 31 (see FIG. 3).

In step S22, the base station generates a control signaling channel for each frequency block according to scheduling information. The control signaling channel includes a common control channel (general control channel) and specific control channels.

In step S23, the base station transmits control channels and shared data channels of the respective frequency blocks according to the scheduling information.

In step S13, the terminal UE1 receives signals transmitted via frequency blocks 2 and 3.

In step S14, the terminal UE1 determines transport formats of common control channels based on parts 0 of control channels received via frequency blocks 2 and 3.

In step S15, the terminal UE1 separates the common control channel from the control channel received via frequency block 2, decodes the common control channel, and thereby extracts scheduling information. Similarly, the terminal UE1 separates the common control channel from the control channel received via frequency block 3, decodes the common control channel, and thereby extracts scheduling information. The scheduling information of each of frequency blocks 2 and 3 includes information indicating whether resource blocks are allocated to a shared data channel for the terminal UE1 and if resource blocks are allocated, also includes information indicating the corresponding resource block numbers. If no resource block is allocated to the shared data channel for the terminal UE1, the terminal UE1 returns to the standby mode and waits for the next control channels. If resource blocks are allocated to the shared data channel for the terminal UE1, the terminal UE1 separates a specific control channel from the received signal and decodes the specific control channel in step S16. The specific control channel includes a data modulation scheme, a channel coding rate, and HARQ information for the shared data channel.

In step S17, the terminal UE1 decodes the shared data channel in the received signal based on information extracted from the specific control channel. The terminal UE1 may be configured to report acknowledge (ACK) or negative acknowledge (NACK) to the base station according to the result of decoding. Thereafter, the above steps are repeated.

Figure 9B:
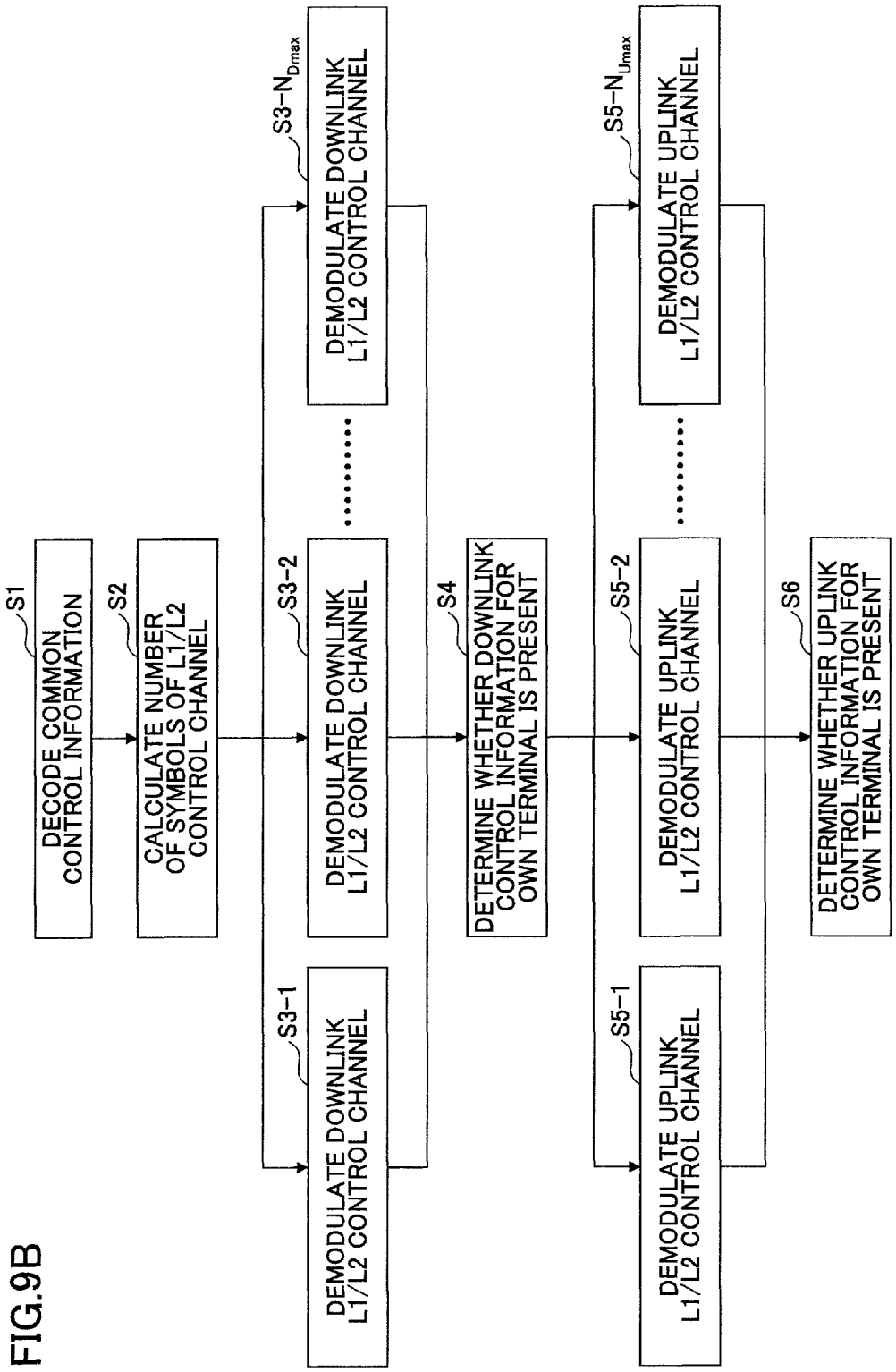
FIG. 9B is a flowchart showing an exemplary parallel reception process.
Figure 9C:
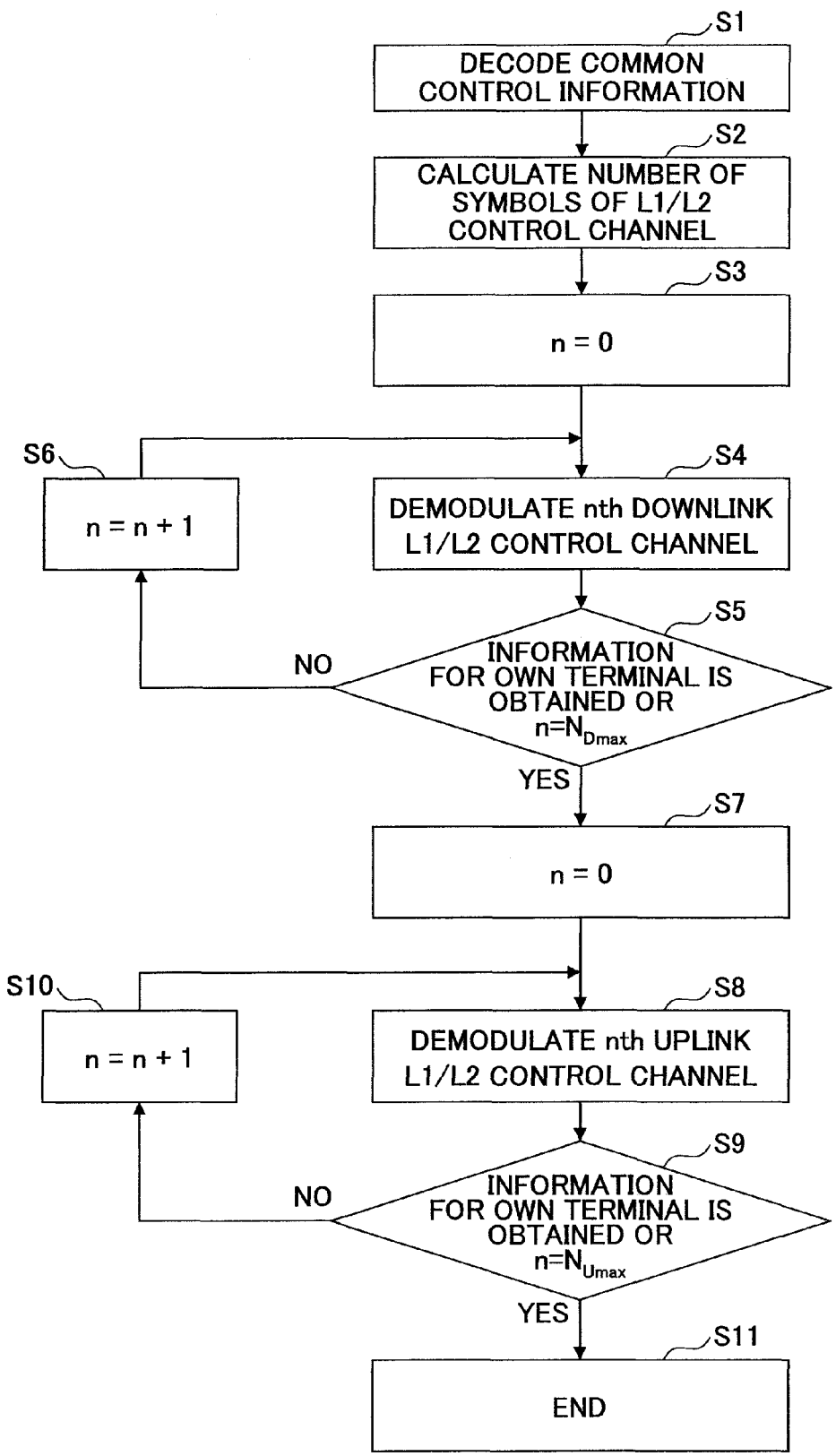
FIG. 9C is a flowchart showing an exemplary serial reception process.

FIGS. 9B and 9C show details of steps S14 through S16 in FIG. 9A. FIG. 9B is a flowchart showing an exemplary parallel reception process. In step S1, the terminal UE1 checks part 0 information in the common control information. For example, the terminal UE1 checks the value of two bits representing the part 0 information and determines which one of predefined formats is selected for the L1/L2 control channel.

In step S2, the terminal UE1 determines, for example, the number of symbols of the L1/L2 control channel in one subframe based on the determined format. Here, it is assumed that maximum numbers of multiplexed users $N_{Umax}$ and $N_{Dmax}$ determined, respectively, for uplink and downlink have been reported to the terminal by broadcast information. The terminal UE1 calculates a data size per user based on the number of symbols of the L1/L2 control channel in one subframe and the maximum number of multiplexed users.

In each of steps S3-1 through S3-$N_{Dmax}$, the terminal UE1 demodulates an information unit having the data size per user calculated in step S2. Each information unit having the data size per user corresponds to the information unit mentioned in the descriptions of the paging indicator (with reference to FIG. 5E). In steps S3-1 through S3-$N_{Dmax}$, the terminal UE1 demodulates information units regarding downlink control information. In practice, the number of communicating users may be less than the maximum number of multiplexed users $N_{Dmax}$. In this example, steps S3-1 through S3-$N_{Dmax}$ are performed in parallel, and therefore the time necessary to perform the steps equals the time necessary to demodulate one information unit.

In step S4, the terminal UE1 determines whether downlink control information for itself is present.

In each of steps S5-1 through S5-$N_{Umax}$, the terminal UE1 demodulates an information unit having the data size per user calculated in step S2. In steps S5-1 through S5-$N_{Umax}$, unlike steps S3-1 through S3-$N_{Dmax}$ the terminal UE1 demodulates information units regarding uplink control information. The information units regarding downlink control information and the information units regarding uplink control information may have the same data size or different data sizes. Also in these steps, the number of communicating users may be less than the maximum number of multiplexed users $N_{Umax}$. In this example, steps S5-1 through S5-$N_{Umax}$ are performed in parallel, and therefore the time necessary to perform the steps equals the time necessary to demodulate one information unit.

In step S6, the terminal UE1 determines whether uplink control information for itself is present.

In the above example, it is assumed that the maximum number of multiplexed users is specified separately for uplink and downlink. Meanwhile, there is a case where only a total number of multiplexed users Nall for uplink and downlink is reported by broadcast information. In this case, the number for uplink and the number for downlink constituting the total number Nall are unknown. Therefore, steps S3 for downlink must be performed for the total number Nall, and steps S5 for uplink must be performed for the total number Nall. Thus, this approach increases the number of demodulation steps at the communication terminal. On the other hand, however, this approach makes it possible to reduce the amount of broadcast information necessary to report the number of multiplexed users (the amount of information necessary to report Nall is less than the amount of information necessary to report $N_{Dmax}$ and $N_{Umax}$).

FIG. 9C is a flowchart showing an exemplary serial reception process. In step S1, as in FIG. 9B, the terminal UE1 checks part 0 information in the common control information. In step S2, the terminal UE1 determines, for example, the number of symbols of the L1/L2 control channel in one subframe based on a format determined in step S1. The terminal UE1 calculates a data size per user based on the number of symbols of the L1/L2 control channel in one subframe and the maximum number of multiplexed users.

In step S3, the terminal UE1 initializes a parameter n indicating the number of calculations (n=0).

In step S4, the terminal UE1 demodulates an information unit having the data size per user calculated in step S2. In this step, the terminal UE1 demodulates an information unit regarding downlink control information.

In step S5, the terminal UE1 determines whether downlink control information for itself has been obtained. If downlink control information for the terminal UE1 has not been obtained, the terminal UE1 proceeds to step S6 and increments the parameter n by 1. Then, the terminal UE1 repeats step S4 to demodulate another information unit. The terminal UE1 repeats steps S4 through S6 until downlink control information for itself is obtained or the parameter n reaches the maximum number $N_{Dmax}$.

In step S7, the terminal UE1 reinitializes the parameter n indicating the number of calculations (n=0).

In step S8, the terminal UE1 demodulates an information unit having the data size per user calculated in step S2. In this step, the terminal UE1 demodulates an information unit regarding uplink control information.

In step S9, the terminal UE1 determines whether uplink control information for itself has been obtained. If the uplink control information for the terminal UE1 has not been obtained, the terminal UE1 proceeds to step S10 and increments the parameter n by 1. Then, the terminal UE1 repeats step S8 to demodulate another information unit. The terminal UE1 repeats steps S8 through S10 until uplink control information for itself is obtained or the parameter n reaches the maximum number $N_{Umax}$ and then terminates the process.

In this example, demodulation of information units is performed serially. Therefore, the minimum time necessary for the demodulation substantially equals the time necessary to demodulate one downlink information unit and one uplink information unit; and the maximum time necessary for the demodulation substantially equals the time necessary to demodulate $N_{Dmax}$ downlink information units and $N_{Umax}$ uplink information units.

Meanwhile, there is a case where only a total number of multiplexed users $N_{all}$ for uplink and downlink is reported by broadcast information. In this case, the number for uplink and the number for downlink constituting the total number Nall are unknown. Therefore, steps S4 through S6 for downlink must be repeated for up to the total number Nall, and steps S8 through S10 for uplink must be repeated for up to the total number Nall. Thus, this approach increases the number of demodulation steps at the communication terminal. On the other hand, however, this approach makes it possible to reduce the amount of broadcast information necessary to report the number of multiplexed users (the amount of information necessary to report Nall is less than the amount of information necessary to report $N_{Dmax}$ and $N_{Umax}$).

Second Embodiment

Since the general control channel (including part 0) is information necessary for all users and is used to decode data channels, error detection (CRC) coding and channel coding are performed on the general control channel. In a second embodiment of the present invention, exemplary methods of error detection coding and channel coding are described. In the configuration of FIG. 4B, it is assumed that L1/L2 control information (part 0) and L1/L2 control information (parts 2a and 2b) are channel-coded separately (i.e., channel-coding/spreading/data-modulation units 41 and 42-A are provided, respectively, for part 0, part 2a, and part 2b). Variations of this configuration are described below.

Figure 10A:
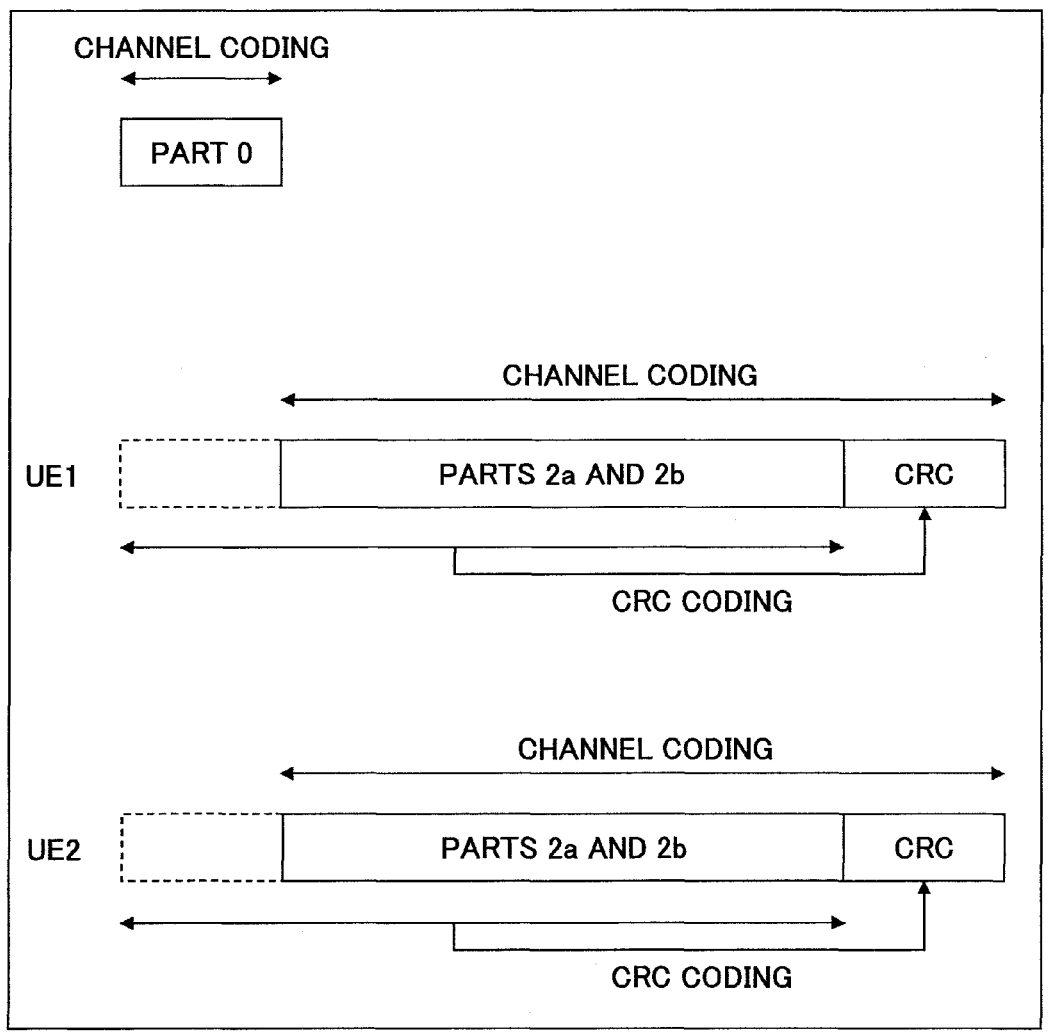
FIG. 10A is a drawing (1) illustrating error detection coding and channel coding of general control channels.

FIG. 10A illustrates a method where part 0 and parts 2a and 2b are error-detection-coded together but are channel-coded separately. In this case, each of communication terminals UE1 and UE2 performs error detection collectively on part 0 and parts 2a and 2b, and extracts an L1/L2 control channel for itself from parts 2a and 2b based on part 0.

Since the error detection (CRC) code for part 0 generally becomes large relative to the control bits of part 0, this method makes it possible to reduce the overhead of error detection coding.

Figure 10B:
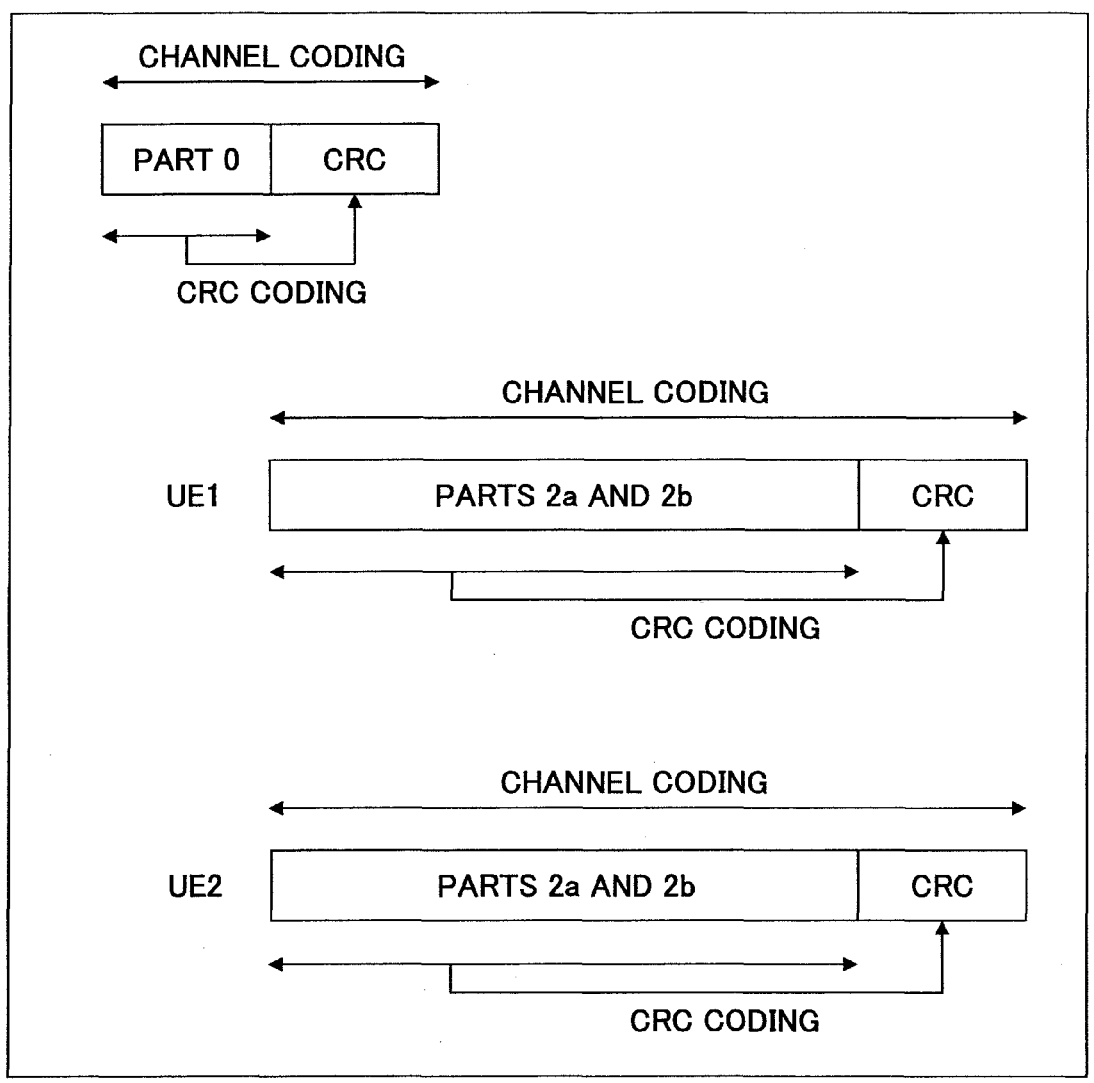
FIG. 10B is a drawing (2) illustrating error detection coding and channel coding of general control channels.

FIG. 10B illustrates a method where part 0 and parts 2a and 2b are error-detection-coded and channel-coded separately. With this method, the overhead becomes greater compared with the case of FIG. 10A. However, this method eliminates the need to process parts 2a and 2b when error detection of part 0 fails.

Figure 10C:
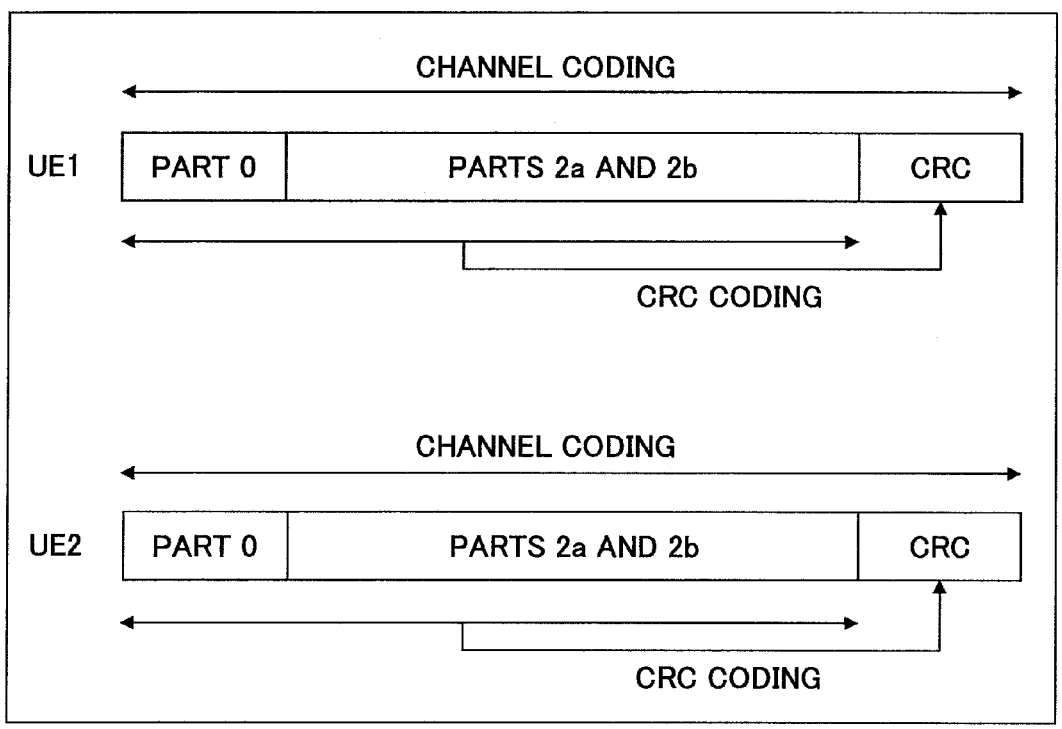
FIG. 10C is a drawing (3) illustrating error detection coding and channel coding of general control channels.

FIG. 10C illustrates a method where part 0 and parts 2a and 2b are error-detection-coded and channel-coded together. With this method, it is necessary to decode both part 0 and parts 2a and 2b to extract part 0 information. However, this method improves the efficiency of channel coding.

In the second embodiment, methods for error detection coding and channel coding of part 0 and parts 2a and 2b are described with reference to FIGS. 10A through 10C. However, the above methods may also be applied to a general control channel other than parts 2a and 2b.

Third Embodiment

Figure 12:
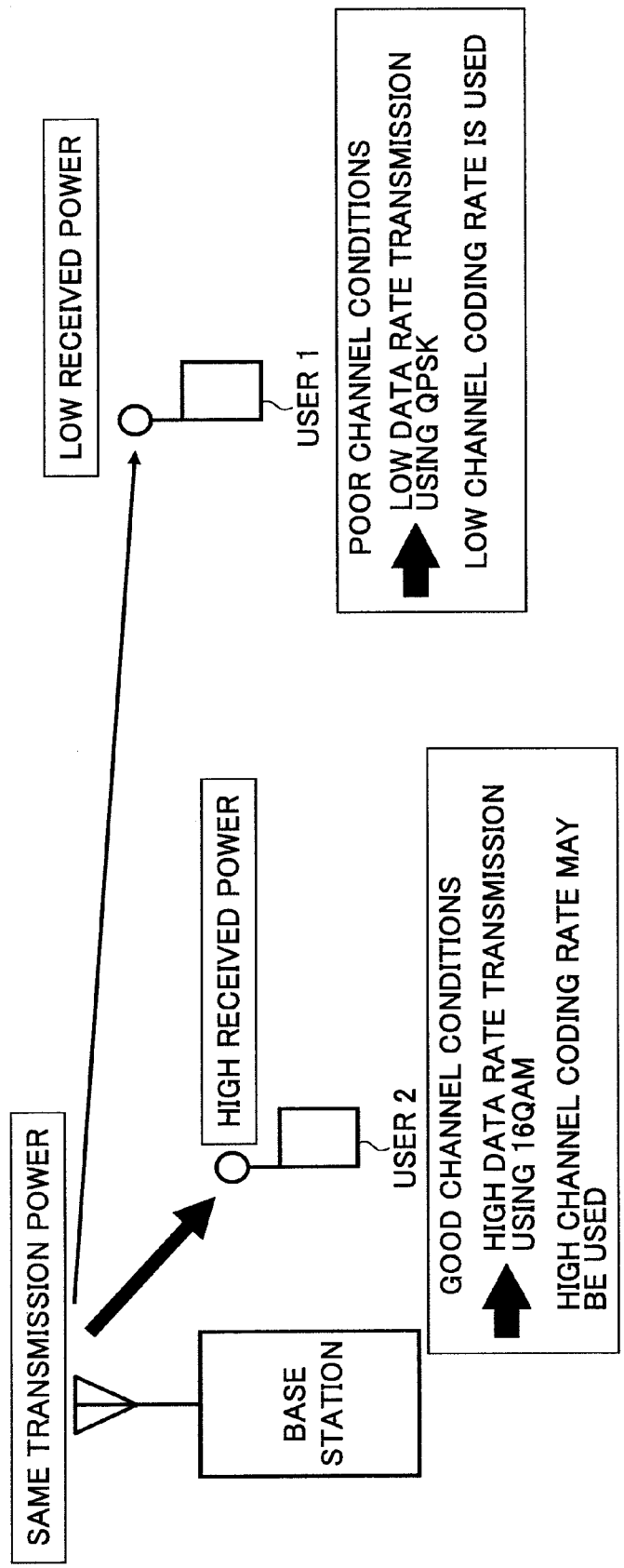
FIG. 12 is a drawing illustrating an example of adaptive modulation and coding (AMC)

To improve the received signal quality of control channels, it is preferable to perform link adaptation. In a third embodiment of the present invention, transmission power control (TPC) and adaptive modulation and coding (AMC) are used to perform link adaptation. FIG. 11 is a drawing illustrating an example of transmission power control where transmission power of downlink channels is controlled to achieve desired reception quality. Referring to FIG. 11, a high transmission power level is used to transmit a downlink channel to user 1 because user 1 is away from the base station and its channel conditions are expected to be poor. Meanwhile, channel conditions of user 2 close to the base station are expected to be good. In this case, using a high transmission power to transmit a downlink channel to user 2 may increase the received signal quality at user 2 but may also increase interference with other users. Because the channel conditions of user 2 are good, it is possible to achieve desired reception quality with a low transmission power level. Therefore, a downlink channel for user 2 is transmitted using a comparatively low transmission power level. When only transmission power control is employed, a fixed combination of a modulation scheme and a channel coding scheme known to the sending and receiving ends are used. Accordingly, in this case, it is not necessary to report modulation and channel coding schemes for demodulation of channels under the transmission power control to the users. FIG. 12 is a drawing illustrating an example of adaptive modulation and coding (AMC) where one or both of the modulation scheme and the coding scheme are adaptively changed according to channel conditions to achieve desired reception quality. Assuming that the transmission power of the base station is constant, it is expected that channel conditions of user 1 away from the base station are poor. In such a case, the modulation level and/or the channel coding rate is set at a small value. In the example shown in FIG. 12, QPSK is used as the modulation scheme for user 1 and therefore two bits of information are transmitted per symbol. On the other hand, the channel conditions of user 2 close to the base station are expected to be good and therefore, the modulation level and/or the channel coding rate is set at a large value. In FIG. 12, 16QAM is used as the modulation scheme for user 2 and therefore four bits of information are transmitted per symbol. This method makes it possible to achieve desired reception quality for a user with poor channel conditions by improving the reliability, and to achieve desired reception quality as well as increase the throughput for a user with good channel conditions. When adaptive modulation and coding is employed, modulation information including the modulation scheme, the coding scheme, and the number of symbols of a received channel is necessary to demodulate the channel. Therefore, it is necessary to report the modulation information to the receiving end. Also, with the above method, the number of bits transmitted per symbol varies depending on the channel conditions. In other words, a small number of symbols are necessary to transmit information when channel conditions are good, but a large number of symbols are necessary to transmit information when channel conditions are poor.

In the third embodiment of the present invention, transmission power control is performed for a general control channel to be decoded by users in general, and one or both of transmission power control and adaptive modulation and coding are performed for specific control channels to be decoded by selected users who are allocated resource blocks. The third embodiment may be implemented by any one of the three methods described below.

(1) TPC-TPC

In a first method, only transmission power control is performed for the general control channel and the specific control channels. In this method, a properly received channel can be demodulated without receiving modulation information including the modulation scheme, coding rate, etc., in advance because they are fixed. The general control channel is distributed across a frequency block and is therefore transmitted using the same transmission power throughout the entire frequency range. Meanwhile, a specific control channel for a user is mapped to resources within a resource block allocated to the user. Therefore, transmission power of specific control channels may be adjusted for respective users who are allocated resource blocks to improve the received signal quality of the users. Taking FIGS. 7A and 7B as an example, the general control channel may be transmitted with a transmission power level $P_0$, the specific control channel for user 1 (UE1) may be transmitted with a transmission power level $P_1$ suitable for user 1, the specific control channel for user 2 (UE2) may be transmitted with a transmission power level $P_2$ suitable for user 2, and the specific control channel for user 3 (UE3) may be transmitted with a transmission power level P3 suitable for user 3. In this case, shared data channels may be transmitted using the corresponding transmission power levels $P_1$, $P_2$, and P3 or a different transmission power level PD.

As described above, the general control channel is decoded by all users. However, the purpose of the general control channel is to report the presence of data and scheduling information for the data to users to which resource blocks are allocated. Therefore, the transmission power used to transmit the general control channel may be adjusted to achieve desired reception quality for the users who are allocated resource blocks. For example, in FIGS. 7A and 7B, if all users 1, 2, and 3 who are allocated resource blocks are located near the base station, the transmission power level $P_0$ for the general control channel may be set at a comparatively small value. In this case, a user other than users 1, 2, and 3 who is located, for example, at a cell edge may not be able to decode the general control channel properly. However, this does not cause any practical problem because no resource block is allocated to the user.

(2) TPC-AMC

In a second method, transmission power control is performed for the general control channel and adaptive modulation and coding is performed for the specific control channels. When AMC is employed, it is basically necessary to provide users with modulation information in advance. In this method, modulation information for the specific control channels is included in the general control channel. Therefore, each user receives, decodes, and demodulates the general control channel first, and determines whether data for the user are present. If data for the user are present, the user extracts scheduling information as well as modulation information including a modulation scheme, a coding scheme, and the number of symbols of the specific control channel. Then, the user demodulates the specific control channel according to the scheduling information and the modulation information, thereby obtains modulation information of a shared data channel, and demodulates the shared data channel based on the modulation information.

Control channels require lower throughput compared with shared data channels. Therefore, the number of combinations of modulation and coding schemes for AMC of the general control channel may be smaller than that used for the shared data channel. For example, for AMC of the general control channel, QPSK is statically used as the modulation scheme and the coding rate may be selected from ⅞, ¾, ½, and ¼.

The second method enables all users to receive the general control channel with a certain level of quality as well as to improve the reception quality of the specific control channels. This is achieved by mapping specific control channels to resource blocks providing good channel conditions for respective selected communication terminals and by using appropriate modulation schemes and/or coding schemes for the respective communication terminals. Thus, in this method, adaptive modulation and coding is applied to specific control channels to improve their reception quality.

When a very limited number of combinations of modulation schemes and channel coding rates are used, a receiving end may be configured to try all of the combinations to demodulate a specific control channel and to use properly demodulated information. This approach makes it possible to perform a certain level of AMC without reporting modulation information to users in advance.

(3) TPC-TPC/AMC

In a third method, transmission power control is performed for the general control channel, and both transmission power control and adaptive modulation and coding are performed for the specific control channels. As described above, when AMC is employed, it is basically necessary to provide users with modulation information in advance. Also, it is preferable to provide a large number of combinations of modulation schemes and channel coding rates to achieve desired reception quality even when the degree of fading is high. However, using a large number of combinations complicates the process of determining an appropriate combination, increases the amount of information needed to report the determined combination, and thereby increases the processing workload and overhead. In the third method, reception quality is maintained by a combination of TPC and AMC. In other words, it is not necessary to compensate for the entire fading solely by AMC. For example, a modulation scheme and a coding scheme that nearly achieve desired quality are selected and then transmission power is adjusted to fully achieve the desired quality under the selected modulation scheme and coding scheme. This method makes it possible to reduce the number of combinations of modulation schemes and channel coding schemes.

In all of the three methods described above, only transmission power control is performed for the general control channel. Therefore, the user can receive the general control channel with desired reception quality and also can easily obtain control information from the general control channel. Unlike AMC, transmission power control does not change the amount of information transmitted per symbol and therefore the general control channel can be easily transmitted using a fixed format. Also, because the general control channel is distributed across the entire frequency block or multiple resource blocks, high frequency diversity gain can be expected. This in turn makes it possible to achieve enough reception quality by simple transmission power control where a long-period average of the transmission power level is adjusted. However, performing only transmission power control for the general control channel is not an essential feature of the present invention. For example, the transport format of the general control channel may be changed at long intervals and reported via a broadcast channel.

Meanwhile, including AMC control information (modulation information) for specific control channels in the general control channel makes it possible to perform AMC for the specific control channels and thereby makes it possible to improve the transmission efficiency and quality of the specific control channels. While the number of symbols necessary for a general control channel is substantially constant, the number of symbols necessary for a specific control channel varies depending on the modulation scheme, the coding rate, the number of antennas, and so on. For example, assuming that the number of necessary symbols is N when the channel coding rate is ½ and the number of antennas is 1, the number of necessary symbols becomes 4N when the channel coding rate is ¼ and the number of antennas is 2. With this embodiment, it is possible to transmit a control channel using a simple fixed format as shown in FIGS. 7A and 7B even if the number of symbols necessary for the control channel changes. Although the number of symbols necessary for a specific control channel changes, the number of symbols necessary for a general control channel basically does not change. Therefore, it is possible to flexibly cope with the variation in the number of symbols by changing the proportion of the specific control channel to the shared data channel in a given resource block.

Fourth Embodiment

Transport formats of data channels are reported via the L1/L2 control channel. Therefore, the transmission format of the L1/L2 control channel must be known to user devices. The simplest method to achieve this is to use one fixed transport format for the L1/L2 control channel for all users in a cell. However, for efficient use of radio resources and for link adaptation, it is preferable to adaptively change even the transport format of the L1/L2 control channel from user to user. In this case, it is necessary to report a selected transport format to each user device. In a fourth embodiment of the present invention, the transport format of the L1/L2 control channel is adaptively changed.

Generally, the data size necessary to transmit information varies depending on the transport format used even if the number of information bits to be transmitted is constant. A transport format is specified by parameters including a combination of a modulation scheme and a channel coding scheme (MCS information). The MCS information may also be specified by a combination of a modulation scheme and a data size.

Figure 13:
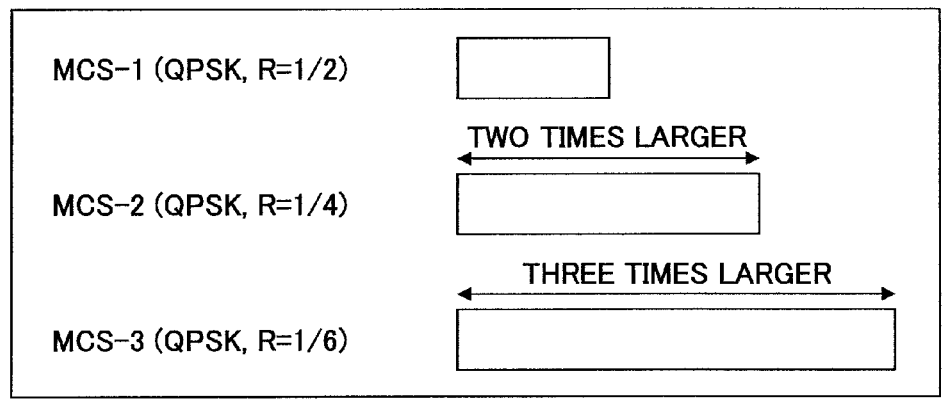
FIG. 13 is a drawing illustrating relationships between MCS levels and data sizes.

Referring to FIG. 13, the data size necessary to transmit information using MCS-2 (modulation scheme=QPSK, channel coding scheme R=¼) is twice as large as the data size necessary to transmit the same information using MCS-1 (modulation scheme=QPSK, channel coding scheme R=½). Also, the data size necessary to transmit information using MCS-3 (modulation scheme=QPSK, channel coding scheme R=⅙) is three times as large as the data size necessary to transmit the same information with MCS-1 (modulation scheme=QPSK, channel coding scheme R=½). Thus, when the MCS to be applied to the L1/L2 control channel changes, the data size of the L1/L2 control channel changes. If the MCS is unknown in a decoding process, it may be necessary to repeat the decoding process for up to the number of possible MCSs. Also, in the decoding process performed for each possible MCS, a user device needs information indicating the number of multiplexed users whose control information is multiplexed in the L1/L2 control channel (i.e., the number of information units) to determine whether control information for the user device is present (the user device can extract the control information for itself, if available, by decoding information units for up to the number of multiplexed users).

As described in the first embodiment with reference to FIGS. 9B and 9C, the number of multiplexed users in the L1/L2 control channel may be reported to user devices separately for uplink and downlink or may be reported as the total number of multiplexed users for uplink and downlink. The amount of radio resources necessary to report the number of multiplexed users and the processing workload at the user devices vary depending on which one of the two methods is used.

Before describing various methods according to the fourth embodiment, definitions of symbols (parameters) to be used in the descriptions are given.

$N_{MCS}$ indicates the number of MCSs provided for the L1/L2 control channel. Combinations of data modulation schemes and channel coding schemes used for the L1/L2 control channel are represented by MCS-1 through MCS-$N_{MCS}$.

$N_{L1L2(max)}$ (=$N'_U$+$N'_D$) indicates the maximum number of L1/L2 control channels that can be multiplexed in one TTI (when the most efficient MCS is used).

$N_{UE,D}(m)$ indicates the number of users using MCS-m in downlink (a smaller number (m) is assigned to an MCS with higher transmission efficiency).

$N_{UE,U}(m)$ indicates the number of users using MCS-m in uplink (a smaller number (m) is assigned to an MCS with higher transmission efficiency).

$N_D$ indicates the number of multiplexed L1/L2 control channels related to downlink transmission ($N'_D$ indicates the value of $N_D$ when an MCS with the highest transmission efficiency is used).

$N_U$ indicates the number of multiplexed L1/L2 control channels related to uplink transmission ($N'_U$ indicates the value of $N_U$ when an MCS with the highest transmission efficiency is used).

$N_{Dmax}$ indicates the maximum number of multiplexed L1/L2 control channels related to downlink transmission ($N_D \leq N_{Dmax}$).

$N_{Umax}$ indicates the maximum number of multiplexed L1/L2 control channels related to uplink transmission ($N_U \leq N_{Umax}$).

$N_{L1L2(max)}$ indicates the maximum number of multiplexed L1/L2 control channels in any subframe and ($N'_U$+$N'_D$) indicates the maximum number of multiplexed L1/L2 control channels in a specific subframe.

Figure 14A:
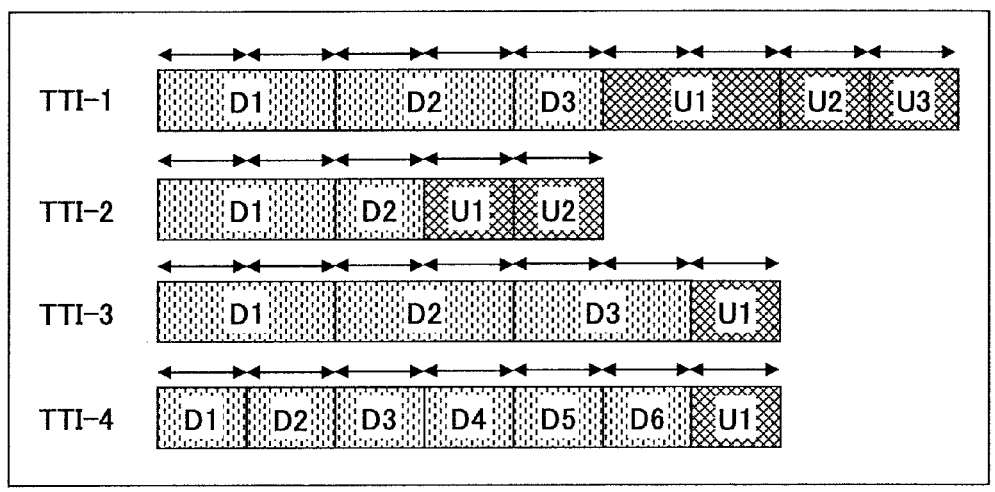
FIG. 14A is a drawing illustrating transmission of L1/L2 control channels in four TTIs with various multiplicities.
Figures 14B, 15:
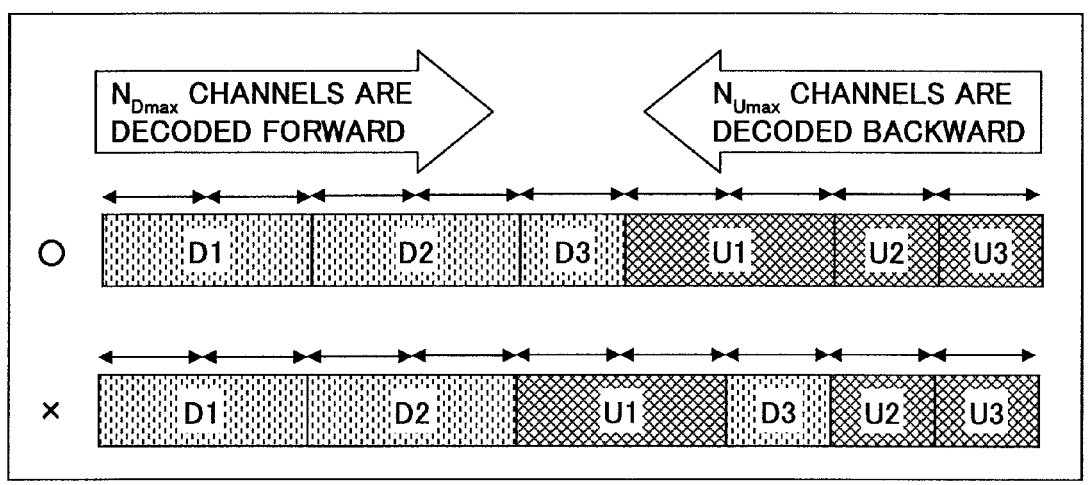
FIG. 14B is a table showing exemplary values of parameters related to multiplicity.
FIG. 15 is a drawing illustrating predetermined relative mapping positions of control information.

FIG. 14A is a drawing illustrating transmission of downlink L1/L2 control channels in four TTIs with various multiplicities. FIG. 14B shows exemplary values of the above defined parameters in association with FIG. 14A. In FIG. 14A, "D" indicates information related to downlink and "U" indicates information related to uplink. As shown in FIG. 14A, the data size of information varies according to the MCS applied. In FIGS. 14A and 14B, for brevity, only two types of MCSs are provided (the transmission efficiency of MCS-1 is higher than that of MCS-2). Supposing that MCS-1 is used for all users, information for nine users can be transmitted in a frequency band used in TTI-1. Regarding downlink, D3 uses MCS-1 with high transmission efficiency and D1 and D2 use MCS-2 with low transmission efficiency (in FIG. 14B, $N_{UE,D}$-MCS-1 is 1 and $N_{UE,D}$-MCS-2 is 2). As described above with reference to FIG. 13, the data size decreases as the efficiency of MCS increases. Regarding uplink, U2 and U3 use MCS-1 with high transmission efficiency and U1 uses MCS-2 with low transmission efficiency (in FIG. 14B, $N_{UE,U}$-MCS-1 is 2 and $N_{UE,D}$-MCS-2 is 1). In TTI-1, although up to five users can be multiplexed for downlink ($N'_D$=5), only three users are actually multiplexed ($N_D$=3). Also in TTI-1, although up to four users can be multiplexed for uplink ($N'_U$=4), only three users are actually multiplexed ($N_D$=3). Exemplary values of parameters for other TTIs are also shown in FIG. 14B.

Below, methods 1 through 7 for reporting the number of multiplexed users to user devices are described. In the descriptions below, it is assumed that the transport format (i.e., the MCS number) applied to the L1/L2 control channel is changed from user to user. Characteristics of the respective methods are shown in FIG. 17.

(Method 1)

In method 1, the numbers of multiplexed users for each MCS ($N_{UE,U}$(m) and $N_{UE,D}$(m)) are reported for each TTI to user devices. With this method, the number of multiplexed users is reported separately for uplink and downlink. Therefore, a user device can extract control information for itself (if available) by performing a decoding process for up to $N_{UE,U}$(m)+$N_{UE,D}$(m) times (the number of times may be called the number of blind detection steps). This method also makes it possible to freely set the value of MCS-m for each user and therefore can most efficiently transmit the L1/L2 control channel (enables the most efficient use of radio resources). Since the number of symbols necessary for the L1/L2 control channel is reported by part 0 information, the boundary between the L1/L2 control channel and a shared data channel can be changed for each TTI.

(Method 2)

Also in method 2, the MCS of the L1/L2 control channel is adjusted every TTI for each user. In this method, the numbers of multiplexed L1/L2 control channels for uplink and downlink ($N'_U$ and $N'_D$: values based on the most efficient MCS) are determined and reported separately for each TTI to user devices. Although the MCS is adjusted every TTI for each user, MCS numbers selected for respective user devices are not explicitly reported. Therefore, the number of blind detection steps is represented by $N_{MCS} \times (N'_U + N'_D)$.

With this method, although the number of blind detection steps becomes far greater than that in method 1, the number of bits necessary to represent the numbers of multiplexed L1/L2 control channels can be reduced. Thus, this method is preferable in terms of reducing the number of bits of part 0 information. Also, since the MCS is adjusted every TTI for each user, method 3 makes it possible to use radio resources as efficiently as in method 1.

(Method 3)

Also in method 3, the MCS of the L1/L2 control channel is adjusted every TTI. In this method, the total number of multiplexed L1/L2 control channels for uplink and downlink ($N'_U + N'_D$: a total number based on the most efficient MCS) is reported for each TTI to user devices. Although the MCS is adjusted every TTI for each user, MCS numbers selected for respective user devices are not explicitly reported. Therefore, the number of blind detection steps is represented by $2 \times N_{MCS} \times (N'_U + N'_D)$.

With this method, although the number of blind detection steps becomes even greater than that in method (two times larger than that in method 2), the number of bits of part 0 information can be further reduced. Also, since the MCS is adjusted every TTI for each user, method 3 makes it possible to use radio resources as efficiently as in method 1.

(Method 4)

In method 4, the MCS of each user is not adjusted every TTI, but is adjusted at longer intervals and reported via an upper layer (e.g., by L3 control information). Meanwhile, the number of multiplexed users is reported for each TTI separately for uplink and downlink. The MCS of each user is adjusted at longer intervals than in methods 1 through 3. Therefore, transmission power control is preferably employed to prevent decrease in reception quality due to instantaneous fading. In this method, the numbers of multiplexed L1/L2 control channels for uplink and downlink ($N'_U$ and $N'_D$: values based on the most efficient MCS) are determined separately and reported for each TTI to user devices. The number of blind detection steps, although it depends on the MCS, becomes less than or equal to $N'_U + N'_D$.

With this method, since the MCS of each user is reported only at long intervals, it is possible to make the number of bits of part 0 information smaller than that in method 1. Meanwhile, since the MCS is not updated frequently, the use efficiency of radio resources may become lower than that in method 1.

(Method 5)

Also in method 5, the MCS of each user is not adjusted every TTI, but is adjusted at longer intervals and reported via an upper layer (e.g., by L3 control information). Meanwhile, the total number of multiplexed users for uplink and downlink is reported for each TTI. As in method 4, since the MCS of each user is adjusted only at long intervals, transmission power control is preferably employed to prevent decrease in reception quality due to instantaneous fading. In this method, the total number of multiplexed L1/L2 control channels for uplink and downlink ($N'_U + N'_D$: a total number based on the most efficient MCS) is reported for each TTI to user devices. Therefore, the number of blind detection steps, although it depends on the MCS, becomes less than or equal to $2 \times (N'_U + N'_D)$.

Since the MCS is not updated frequently in this method, the use efficiency of radio resources is substantially the same as that in method 4. With method 5, since the number of multiplexed users is reported collectively for uplink and downlink, the number of blind detection steps increases, but the number of bits of part 0 information becomes smaller than that in method 4.

(Method 6)

Also in method 6, the MCS of each user is not adjusted every TTI, but is adjusted at longer intervals and reported via an upper layer (e.g., by L3 control information). In this method, the total maximum number of multiplexed L1/L2 control channels for uplink and downlink is reported for each TTI to user devices and the maximum numbers of multiplexed L1/L2 control channels determined separately for uplink and downlink ($N_{Umax}$ and $N_{Dmax}$) are reported, via an upper layer (e.g., via a broadcast channel (BCH)), to user devices at an interval longer than the TTI. Since the MCS of each user is adjusted only at long intervals, transmission power control is preferably employed to prevent decrease in reception quality due to instantaneous fading. The number of multiplexed L1/L2 control channels to be reported for each TTI is represented by a total maximum number ($N'_U + N'_D$) obtained based on the most efficient MCS.

In this method, relative mapping positions (arrangement of radio resources) of uplink control information and downlink control information are predetermined. For example, downlink control channels for respective users are first mapped in sequence on the frequency axis and then uplink control channels for respective users are mapped in sequence on the frequency axis. In the example shown in FIG. 15, a mapping scheme indicated by "○" is allowed but a mapping scheme indicated by "X" is prevented. Although any appropriate mapping scheme other than that shown in FIG. 15 may be used, it is necessary to determine and fix the mapping scheme in advance. Fixing the relative mapping positions in advance makes it possible to reduce the number of blind detection steps.

Figure 16:
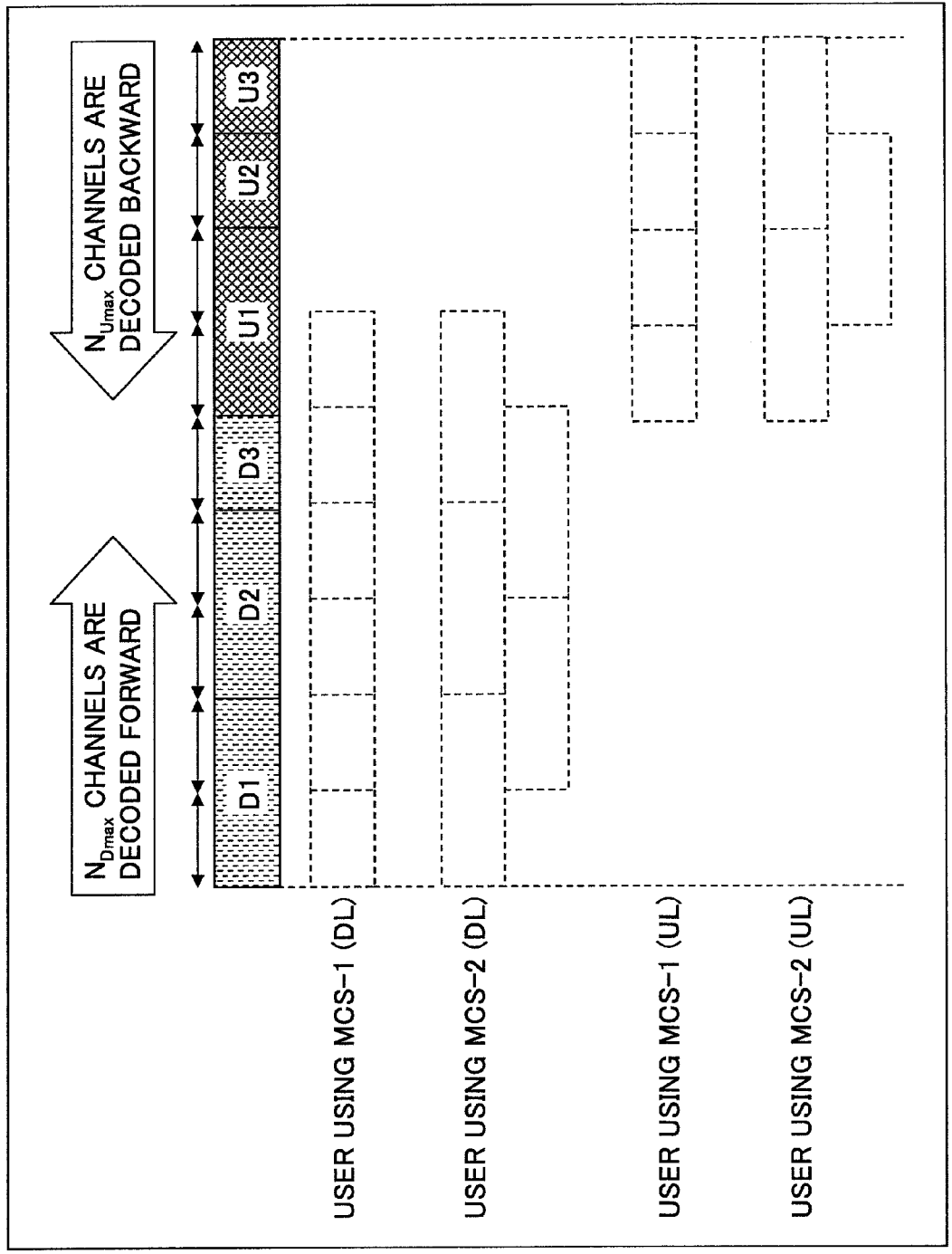
FIG. 16 is a drawing illustrating a case where the number of blind detection steps is reduced.

In FIG. 16, areas surrounded by dotted lines indicate information units to be decoded in blind detection in a case where $N_{Dmax}=6$, $N_{Umax}=4$, and $N_D+N_U=9$. The user device does not have to perform blind detection for areas not surrounded by dotted lines. Thus, determining the relative mapping positions of uplink and downlink control information in advance makes it possible to reduce the number of blind detection steps to be performed by the user device.

Since the MCS is not updated frequently in this method, the use efficiency of radio resources is substantially the same as that in method 4. With method 6, since the number of multiplexed users is reported collectively for uplink and downlink, the number of bits of part 0 information becomes smaller than that in method 4.

(Method 7)

In method 7, a fixed MCS is used for all users in a cell. In this method, the total maximum number of multiplexed L1/L2 control channels for uplink and downlink ($N'_U+N'_D$: a total number based on the most efficient MCS) is reported for each TTI to user devices and the maximum numbers of multiplexed L1/L2 control channels determined separately for uplink and downlink ($N_{Umax}$ and $N_{Dmax}$) are reported, via an upper layer (e.g., via a broadcast channel (BCH)), to user devices at an interval longer than the TTI.

As in method 6, it is possible to reduce the number of blind detection steps to be performed by the user device by determining the relative mapping positions of uplink and downlink control information in advance. With method 7, since the same fixed MCS is used for all users, the use efficiency of radio resources may become lower than other methods. However, since the number of multiplexed users is reported collectively for uplink and downlink, the number of bits of part 0 information becomes smaller than that in method 4.

Fifth Embodiment

As described above, when a MIMO scheme is employed, the number of control bits necessary for downlink data transmission information (downlink scheduling grant information) including precoding vectors, transport formats, and HARQ information may vary depending on the MIMO scheme selected. This is because the number of streams, the number of code words, and the number of frequency-selective precoding vectors change depending on the MIMO scheme.

Here, for the downlink scheduling grant information requiring a variable number of control bits, it is preferable to select a channel coding scheme that enables efficient transmission (which leads to higher coding gain), fast decoding (in the fastest case, with only one decoding process), and reduction of the number of blind detection steps (by using a fixed or known coding block size). Channel coding methods are outlined above with reference to FIG. 6. In a fifth embodiment of the present invention, channel coding methods are described in more detail.

Below, three channel coding methods for the downlink scheduling grant information are described.

(Method 1)

FIG. 18 is a drawing illustrating an example where a part of a control signal is coded using the same channel coding scheme for all users and another part of the control signal is coded using different channel coding schemes for respective users. In a first method, a control signal is divided into a basic part with a basic data size and an additional part. The basic data size is determined such that the basic part can contain all information necessary for the transmission of one stream. The same channel coding scheme is applied to users requiring only control information within the basic part. If the number of streams is greater than 1, an additional part is provided in addition to the basic part. The data size of the additional part may vary from user to user. Therefore, the additional part is coded using different coding schemes for respective users (of course, there is a case where the same channel coding scheme is applied to some of the users by chance). When receiving a control signal, the user device first decodes the basic part and thereby obtains control information. Then, if it is determined that control information for more than one stream is present for the user device, the user device decodes the additional part and thereby obtains all the control information for multiple streams. With this method, a user device provided with only one stream has to repeat the decoding process only once. Also, this method makes it possible to improve the coding efficiency even when the amount of control information varies from user to user.

(Method 2)

Figure 19A:
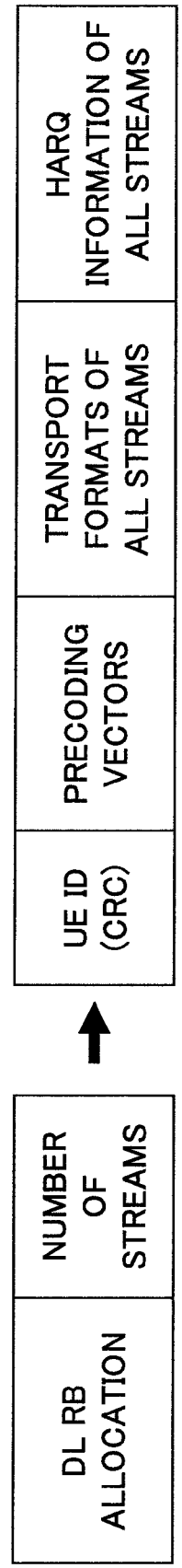
FIG. 19A is a drawing (2) illustrating an example where a part of a control signal is coded using the same channel coding scheme for all users and another part of the control signal is coded using different channel coding schemes for respective users.

FIG. 19A is a drawing illustrating another example where a part of a control signal is coded using the same channel coding scheme for all users and another part of the control signal is coded using different channel coding schemes for respective users. In a second method, the basic data size is fixed and is smaller than that in the first method. In the first method, the amount of control information necessary for the transmission of one stream may vary. In the second method, control information is divided into a fixed-length part and a variable-length part that are predetermined in the system. The fixed-length part may include downlink resource allocation information and the number of streams. The variable-length part may include precoding information, transport formats, and HARQ information for all streams. Like the first method, the second method also makes it possible to improve coding efficiency.

FIG. 19B is a drawing used co describe methods of decoding a downlink scheduling grant at the user device in a case where a part of a control signal is coded using the same channel coding scheme for all users and another part of the control signal is coded using different channel coding schemes for respective users.

Option 1: The basic part and the additional part are decoded separately.

In this case, the additional part is mapped to control resource blocks the indexes of which are predetermined.

In the example shown in FIG. 19B, the basic part is mapped to a first block and the additional part is mapped to a second block located next to the first block. As the second block, a resource block allocated to a shared data channel may be used.

Option 2: The fixed-length part and the variable-length part are decoded separately.

In the example shown in FIG. 19B, the basic part is mapped to the first block and the additional part is mapped to a predetermined resource block such as a control resource block or a part of resource blocks allocated to a shared data channel.

(Method 3)

FIG. 20 is a drawing used to describe a case where the channel coding scheme for a control signal is varied from user to user. In the third method, the channel coding scheme is basically determined for each user (although there is a possibility that the same channel coding scheme is used for all users because of similar communication conditions). All control information items including a variable amount of control information regarding MIMO are collectively channel-coded for each user. This method makes it possible to lengthen the unit of channel coding for each user device and thereby makes it possible to achieve high coding gain.

FIG. 21 is a table comparing the first through third methods.

FIG. 22 is a table showing exemplary data sizes of respective information items.

FIG. 23 is a table comparing the first through third methods in terms of the number of symbols. More specifically, FIG. 23 shows the number of symbols necessary for the downlink scheduling grant information for each method in a case where data sizes of precoding information, transport format information, and HARQ information are fixed to reduce the number of blind detection steps. In the example shown in FIG. 23, data sizes shown in FIG. 22 are used to calculate the number of symbols. In the first method, CRC information is attached only to the basic part (in other words, the CRC information is calculated based on both of the basic part and the additional part). QPSK and R=½ are used as the modulation scheme and the channel coding scheme (MCS) for the downlink scheduling grant information. The number of bits (B) of the precoding vector information and the number of code words $N_{codeword}$ are varied as parameters.

As shown in FIG. 23, when the number of control bits of the precoding information is small (case A), the overhead in the first method is slightly larger than that in the second method but the difference is ignorable. Meanwhile, the overhead in the third method is about 30% greater than that in the second method at the maximum when the frequency band is 5 MHz and is about 16% greater than that in the second method at the maximum when the frequency band is 20 MHz. When the number of control bits of the precoding information is large (case B), the overhead in the first and third methods becomes greater than that in the second method.

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-073734 filed on Mar. 20, 2007, the entire contents of which are hereby incorporated herein by reference.

The invention claimed is:

1. A base station used in a mobile communication system employing orthogonal frequency division multiplexing (OFDM) for downlink, comprising:
    a scheduler determining allocation of radio resources for each subframe such that one or more resource blocks are allocated to a selected one of user devices for communications;
    a control channel generating unit generating a control channel including common control information to be mapped to frequency components distributed across a system frequency band and specific control information to be mapped to the one or more resource blocks allocated to the selected one of the user devices; and
    a transmission signal generating unit generating a transmission signal by time-division-multiplexing the common control information and the specific control information according to scheduling information from the scheduler,
    wherein the common control information is transmitted every subframe as lower-layer control information and includes information units with a predetermined data size a number of which information units is less than or equal to a specified multiplicity, a format indicator representing one of preset options that indicates a number of symbols occupied by the common control information in a corresponding subframe, and information indicating a maximum number of the information units, the information indicating the maximum number of the information units being transmitted as a part of the common control information at a predetermined interval longer than or equal to one subframe.

2. The base station as claimed in claim 1, wherein the information indicating the maximum number of the information units is transmitted in a subframe preceding a timing at which a channel requiring the radio resources used for transmission of the lower-layer control information is transmitted.

3. The base station as claimed in claim 2, wherein the channel requiring the radio resources used for transmission of the lower-layer control information is one of a paging channel, a broadcast channel, and a random access channel response.

4. The base station as claimed in claim 1, wherein
    the common control information is mapped within three OFDM symbols in each subframe; and
    each of the information units of the common control information corresponding to one of the user devices is mapped to one OFDM symbol.

5. The base station as claimed in claim 1, wherein a broadcast channel and a shared data channel are mapped to fourth and later OFDM symbols in each subframe.

6. The base station as claimed in claim 1, wherein
    for each subframe, combinations of modulation schemes and channel coding schemes to be applied to the information units provided for the respective user devices in the common control information are selected from a preset number of the combinations; and
    the specified multiplicity indicates, for each of the combinations selected and separately for uplink and downlink, a number of the information units in the common control information to which the same combination is applied.

7. The base station as claimed in claim 1, wherein
for each subframe, combinations of modulation schemes and channel coding schemes to be applied to the information units provided for the respective user devices in the common control information are selected from a preset number of the combinations; and
the specified multiplicity indicates, separately for uplink and downlink, a number of the information units in the common control information in a case where one of the preset number of the combinations of modulation schemes and channel coding schemes that provides a highest transmission rate is applied to the common control information.

8. The base station as claimed in claim 1, wherein
for each subframe, combinations of modulation schemes and channel coding schemes to be applied to the information units provided for the respective user devices in the common control information are selected from a preset number of the combinations; and
the specified multiplicity indicates, collectively for uplink and downlink, a total number of the information units in the common control information in a case where one of the preset number of the combinations of modulation schemes and channel coding schemes that provides a highest transmission rate is applied to the common control information.

9. The base station as claimed in claim 1, wherein
the common control information is transmitted every subframe as the lower-layer control information; and
Modulation and Coding Scheme (MCS) information indicating a combination of a modulation scheme and a channel coding scheme to be applied to the common control information is transmitted as upper-layer control information.

10. The base station as claimed in claim 1, wherein
the common control information is transmitted every subframe as the lower-layer control information;
Modulation and Coding Scheme (MCS) information indicating a combination of a modulation scheme and a channel coding scheme to be applied to the common control information is transmitted as upper-layer control information;
the information indicating the maximum number of the information units in the common control information to be transmitted in a given subframe is reported separately for uplink and downlink via broadcast information;
information indicating a total maximum number of the information units in the communication control information to be transmitted in each subframe is reported collectively for uplink and downlink; and
relative positions of uplink control information and downlink control information in the common control information are predetermined.

11. A transmission method performed by a base station in a mobile communication system employing orthogonal frequency division multiplexing (OFDM for downlink, the method comprising the steps of:
determining, by a scheduler, allocation of radio resources for each subframe such that one or more resource blocks are allocated to a selected one of user devices for communications;
generating a control channel including common control information to be mapped to frequency components distributed across a system frequency band and specific control information to be mapped to the one or more resource blocks allocated to the selected one of the user devices; and
generating a transmission signal by time-division-multiplexing the common control information and the specific control information according to scheduling information from the scheduler,
wherein the common control information is transmitted every subframe as lower-layer control information and includes information units with a predetermined data size a number of which information units is less than or equal to a specified multiplicity, a format indicator representing one of preset options that indicates a number of symbols occupied by the common control information in a corresponding subframe, and information indicating a maximum number of the information units, the information indicating the maximum number of the information units being transmitted as a part of the common control information at a predetermined interval longer than or equal to one subframe.

12. A user device used in a mobile communication system employing orthogonal frequency division multiplexing (OFDM) for downlink, comprising:
a receiving unit receiving a signal that includes a control channel including common control information mapped to frequency components distributed across a system frequency band and specific control information mapped to one or more resource blocks allocated to a selected one of user devices;
a separating unit separating the control channel and other channels from the received signal; and
a control channel decoding unit decoding the common control information and the specific control information,
wherein the common control information is transmitted every subframe as lower-layer control information and includes information units with a predetermined data size, a format indicator, and information indicating a maximum number of the information units, the information indicating the maximum number of the information units being transmitted as a part of the common control information at a predetermined interval longer than or equal to one subframe; and
the control channel decoding unit analyzing the format indicator and the information indicating the maximum number of the information units in the common control information to identify one of preset options that indicates a number of symbols occupied by the common control information in a corresponding subframe, to determine whether control information for the user device is included in any one of the information units in the common control information by decoding the common control information using a predetermined decoding scheme for up to a number of times indicated by a specified multiplicity, to identify one or more resource blocks allocated to the user device based on the control information if the control information for the user device is included, and to demodulate the identified one or more resource blocks to extract a data channel.

13. A reception method performed by a user device in a mobile communication system employing orthogonal frequency division multiplexing (OFDM) for downlink, the method comprising the steps of:
receiving a signal that includes a control channel including common control information mapped to frequency components distributed across a system frequency band and specific control information mapped to one or more resource blocks allocated to a selected one of user devices;
separating the control channel and other channels from the received signal; and decoding the common control information and the specific control information, wherein the common control information is transmitted every subframe as lower-layer control information and includes information units with a predetermined data size, a format indicator, and information indicating a maximum number of the information units, the information indicating the maximum number of the information units being provided separately for uplink and downlink and transmitted as a part of the common control information at a predetermined interval longer than or equal to one subframe; and the decoding step includes the steps of analyzing the format indicator and the information indicating the maximum number of the information units in the common control information to identify one of preset options that indicates a number of symbols occupied by the common control information in a corresponding subframe, determining whether control information for the user device is included in any one of the information units in the common control information by decoding the common control information using a predetermined decoding scheme for up to a number of times indicated by a specified multiplicity, identifying one or more resource blocks allocated to the user device based on the control information if the control information for the user device is included, and demodulating the identified one or more resource blocks to extract a data channel.

* * * * *